READING APPARATUS

Filed Aug. 9, 1957 18 Sheets-Sheet 1

INVENTORS
ERVIN C. DOBBERSTEIN
JOHN W. BENNETT
WILLIAM C. PRESTON &
LOUIS K. SANDOR

BY Louis A Kline
Albert L. Sessler, Jr.
THEIR ATTORNEYS

INVENTORS
ERVIN C. DOBBERSTEIN
JOHN W. BENNETT
WILLIAM C. PRESTON &
LOUIS K. SANDOR

BY Louis A Kline
Albert L. Sessler, Jr.
THEIR ATTORNEYS

INVENTORS
ERVIN C. DOBBERSTEIN
JOHN W. BENNETT
WILLIAM C. PRESTON &
LOUIS K. SANDOR

BY Louis A. Kline
Albert L. Sessler, Jr.
THEIR ATTORNEYS

Feb. 14, 1961 E. C. DOBBERSTEIN ET AL 2,971,693

READING APPARATUS

Filed Aug. 9, 1957 18 Sheets-Sheet 4

INVENTORS
ERVIN C. DOBBERSTEIN
JOHN W. BENNETT
WILLIAM C. PRESTON &
LOUIS K. SANDOR

BY Louis A Kline
Albert L. Sessler, Jr.
THEIR ATTORNEYS

READING APPARATUS

Filed Aug. 9, 1957 18 Sheets-Sheet 5

INVENTORS
ERVIN C. DOBBERSTEIN
JOHN W. BENNETT
WILLIAM C. PRESTON &
LOUIS K. SANDOR

BY Louis A Kline
Albert L. Sessler, Jr.
THEIR ATTORNEYS

INVENTORS
ERVIN C. DOBBERSTEIN
JOHN W. BENNETT
WILLIAM C. PRESTON &
LOUIS K. SANDOR

BY Louis A. Kline
Albert L. Sessler, Jr.
THEIR ATTORNEYS

Feb. 14, 1961 E. C. DOBBERSTEIN ET AL 2,971,693

READING APPARATUS

Filed Aug. 9, 1957 18 Sheets-Sheet 7

INVENTORS
ERVIN C. DOBBERSTEIN
JOHN W. BENNETT
WILLIAM C. PRESTON &
LOUIS K. SANDOR

BY Louis A Kline
Albert L. Sessler, Jr.
THEIR ATTORNEYS

INVENTORS
ERVIN C. DOBBERSTEIN
JOHN W. BENNETT
WILLIAM C. PRESTON &
LOUIS K. SANDOR

BY Louis A Kline
Albert L. Sauber, Jr
THEIR ATTORNEYS

INVENTORS
ERVIN C. DOBBERSTEIN
JOHN W. BENNETT
WILLIAM C. PRESTON &
LOUIS K. SANDOR

BY Louis A Kline
Albert L. Sessler, Jr.
THEIR ATTORNEYS

INVENTORS
ERVIN C. DOBBERSTEIN
JOHN W. BENNETT
WILLIAM C. PRESTON &
LOUIS K. SANDOR

BY Louis A Kline
Albert L. Sessler, Jr.
THEIR ATTORNEYS

Feb. 14, 1961 E. C. DOBBERSTEIN ET AL 2,971,693

READING APPARATUS

Filed Aug. 9, 1957 18 Sheets-Sheet 11

INVENTORS
ERVIN C. DOBBERSTEIN
JOHN W. BENNETT
WILLIAM C. PRESTON &
LOUIS K. SANDOR

BY Louis A Kline
Albert L. Sessler, Jr.
THEIR ATTORNEYS

INVENTORS
ERVIN C. DOBBERSTEIN
JOHN W. BENNETT
WILLIAM C. PRESTON &
LOUIS K. SANDOR

BY Louis A Kline
Albert L. Sessler, Jr
THEIR ATTORNEYS

INVENTORS
ERVIN C. DOBBERSTEIN
JOHN W. BENNETT
WILLIAM C. PRESTON &
LOUIS K. SANDOR

BY Louis A Kline
Albert L. Sessler, Jr.
THEIR ATTORNEYS

INVENTORS
ERVIN C. DOBBERSTEIN
JOHN W. BENNETT
WILLIAM C. PRESTON &
LOUIS K. SANDOR

BY Louis A. Kline
Albert L. Sessler, Jr.
THEIR ATTORNEYS

Feb. 14, 1961 E. C. DOBBERSTEIN ET AL 2,971,693

READING APPARATUS

Filed Aug. 9, 1957 18 Sheets-Sheet 15

INVENTORS
ERVIN C. DOBBERSTEIN
JOHN W. BENNETT
WILLIAM C. PRESTON &
LOUIS K. SANDOR

BY Louis A. Kline
Albert L. Sessler, Jr.
THEIR ATTORNEYS

INVENTORS
ERVIN C. DOBBERSTEIN
JOHN W. BENNETT
WILLIAM C. PRESTON &
LOUIS K. SANDOR

BY Louis A Kline
Albert L. Sessler Jr
THEIR ATTORNEYS

INVENTORS
ERVIN C. DOBBERSTEIN
JOHN W. BENNETT
WILLIAM C. PRESTON &
LOUIS K. SANDOR
BY Louis A. Kline
Albert L. Sessler, Jr.
THEIR ATTORNEYS INVENTORS
ERVIN C. DOBBERSTEIN
JOHN W. BENNETT
WILLIAM C. PRESTON &
LOUIS K. SANDOR BY Louis A. Kline
Albert L. Sessler, Jr.
THEIR ATTORNEYS United States Patent Office 2,971,693

Patented Feb. 14, 1961

2,971,693

READING APPARATUS

Ervin C. Dobberstein, Dayton, John W. Bennett, Germantown, William C. Preston, Dayton, and Louis K. Sandor, Knollwood, Ohio, assignors to The National Cash Register Company, Dayton, Ohio, a corporation of Maryland Filed Aug. 9, 1957, Ser. No. 677,349

17 Claims. (Cl. 235—61.11)

This invention relates to a data-reading device suitable for use in a data-recording system, and more particularly relates to a data-reading device capable of sensing encoded perforations on a record member and transmitting signals corresponding to said perforations to a utilizing device.

The data-reading device or media reader of the present invention may be used in a system used at the point of merchandise sale for recording data pertaining to each sale, such as an identification of a clerk, an identification of a customer or an account, and a description of the merchandise and its sale price. The tape on which this data is recorded can be analyzed later by a computer or some other means to provide sales volume data, stock control data, or other statistical data which may be desired. A data-recording system of the above type is disclosed in the co-pending United States patent application Serial No. 622,591, filed November 16, 1956, by Richard L. Ditmer et al., inventors, and the media reader of the present invention is similar in some respects to the media reader disclosed in that application. For a detailed description of the other components and the operation of such a recording system, reference may be had to the above-mentioned application. It is obvious that the use of the media reader of the present invention in the above-described system is only one of many possible uses to which the novel media reader may be put.

The use of record members such as perforated tags in conjunction with a media reader for reading fixed information wherever possible to be recorded is advantageous in a recording system of the type described above. The fixed information is encoded on the record members in the form of a plurality of columns of perforations which can be read by the media reader and recorded on the recording tape. Use of the perforated record members greatly lessens the actual number of operations performed by the operator of such a system, since all that is necessary to effect the recording of this information is to insert the record member into the media reader. This simplifies the work of the operator, effects a considerable saving of time, and greatly lessens the chance of error in the recording of a transaction.

The media reader of this invention is designed to enable the use of record members having two groups or fields of data perforations, one above the other, with a data-recording system or other utilizing device, and to enable one of said fields to serve a dual function on different types of record members. For example, in the present invention, it is contemplated that, on a customer identification record member, the second data field will serve a store identification function, while, on a merchandise record member, the second field will serve to provide information relation to the price of the item to which the merchandise record member is attached. Two different sensing operations are provided in connection with this second field, and are associated with sequence control means, so that one of the sensing operations will be significant during a certain time in the predetermined sequence of steps making up a complete transaction (in the above example, during reading of the customer record member), while the other of the sensing operations will be significant at another time in the sequence (in the above example, during reading of a merchandise record member).

It is, therefore, an object of the invention to provide a reading device capable of fast, efficient, and reliable operation suitable for use in a data-recording system or with some other appropriate utilizing device.

Another object is to provide a reading device capable of selective performance of one of two available sensing functions in the same reading field, according to which of the predetermined steps in a sequential operation is being performed at that time.

A further object is to provide a reading device having sensing means which may be actuated at the beginning of a reading operation to perform one type of sensing, subsequently withdrawn to inactive position, and then re-actuated near the end of the same reading operation to perform another type of sensing.

Still another object is to provide a reading device capable of performing both simultaneous and serial sensing operations on a record member at different times, using the same sensing means.

An additional object is to provide a reading device having means performing an identification function on one type of record member and a reading function on another type of record member.

Another object is to provide a media reader having a novel type of tag-aligning means and operating mechanism therefor.

A further object is to provide a media reader having novel means for ejecting a record member upon completion of the reading of said member by the media reader.

Still a further object is to provide a media reader capable of distinguishing between record members bearing certain identification indicia and other record members, which do not bear such indicia, and rejecting record members not bearing the appropriate indicia.

With these and incidental objects in view, the invention includes certain novel features of construction and combinations of parts, a preferred form or embodiment of which will hereinafter be described with reference to the drawings which accompany and form a part of this specification.

Figure 24:
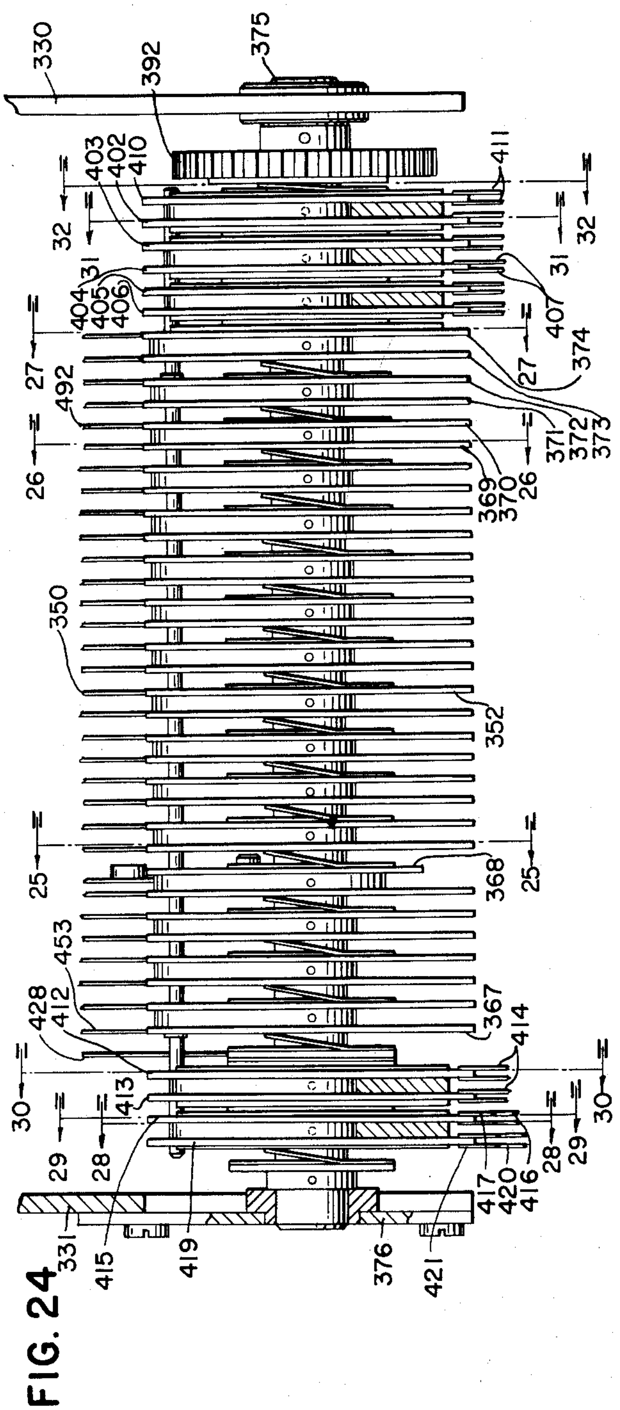
Fig. 24 shows the media reader cam line.

Figs. 25 to 32 inclusive are sectional views taken along corresponding lines on Fig. 24, showing various ones of the cams and switches mounted on the media reader cam line.

Figures 33, 33A, 34:
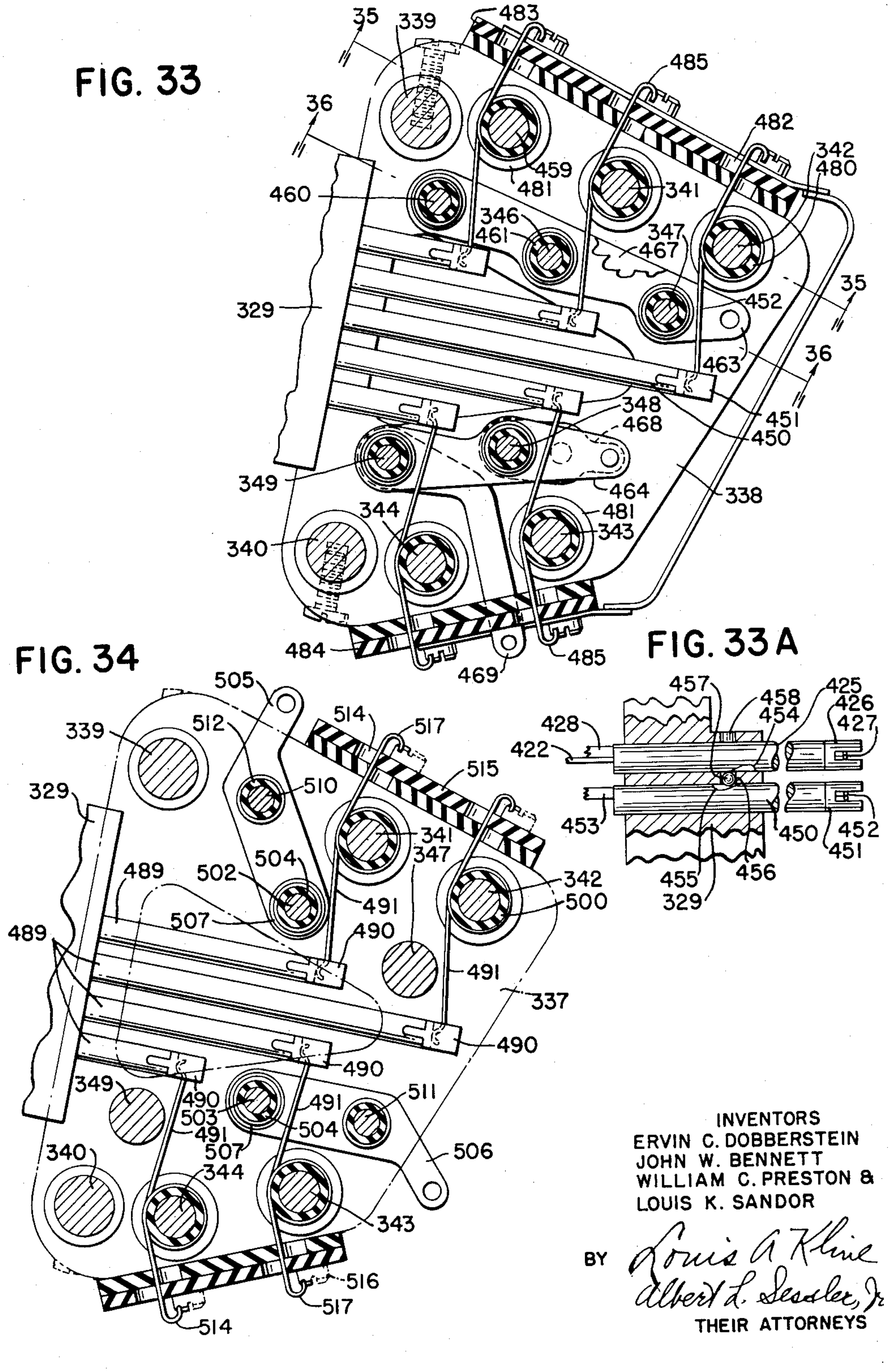
Figure 35:
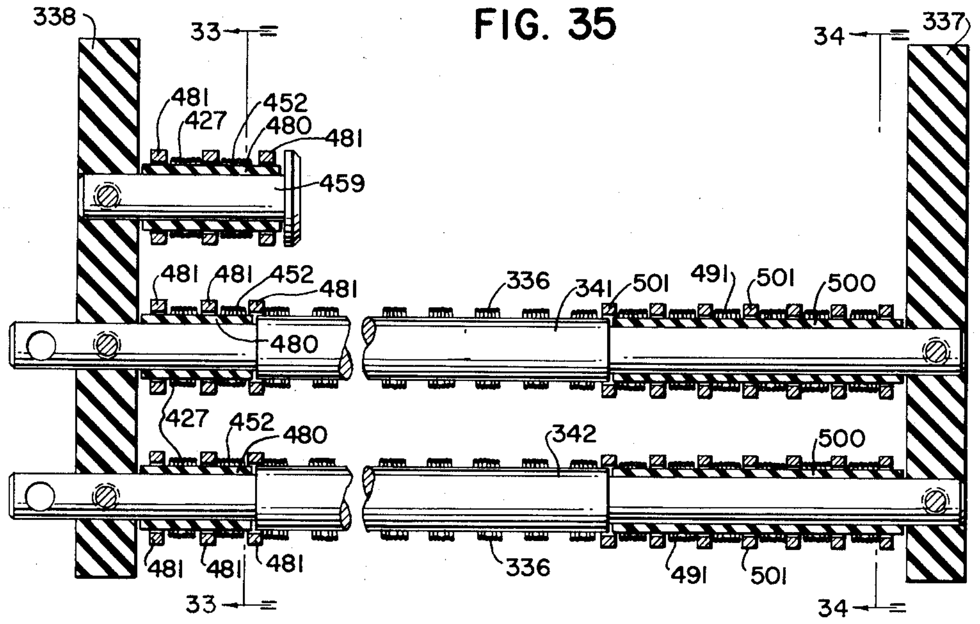

Fig. 33 is a sectional view taken on line 33—33 of Fig. 35 and showing the electrical contact means for the media identification section sensing mechanism.

Fig. 33A is a top detail view of a portion of the media identification section sensing means.

Fig. 34 is a sectional view taken on line 34—34 of Fig. 35 and showing the electrical contact means for the combination store identification and price field sensing mechanism.

Fig. 35 is a sectional view taken on line 35—35 of Fig. 33 and showing details of the electrical contact means for the media reader sensory unit.

Figure 36:
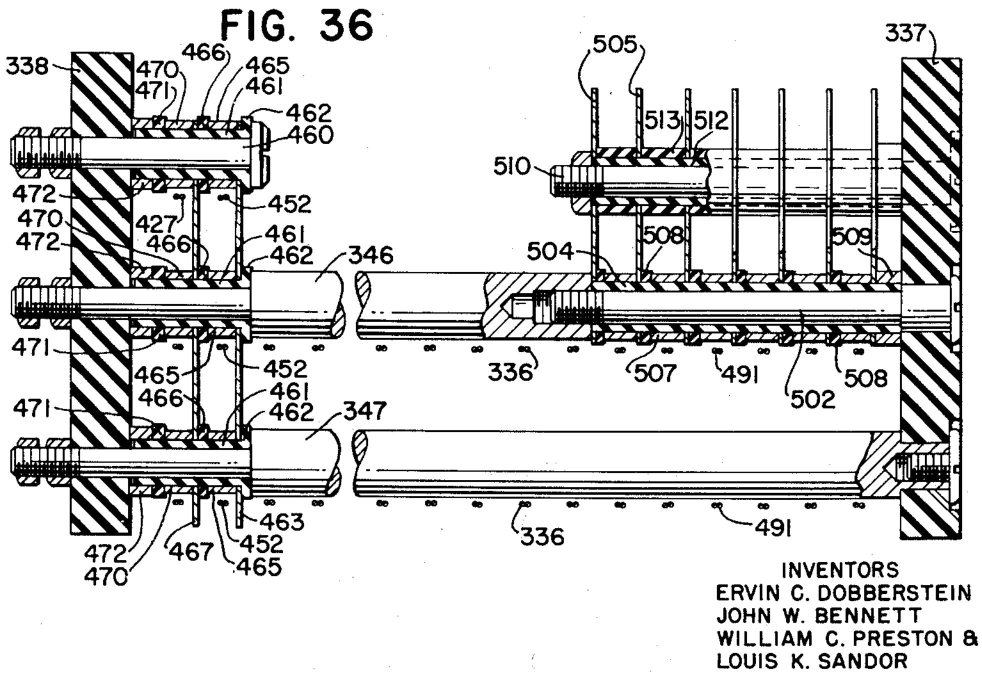

Fig. 36 is a sectional view taken on line 36—36 of Fig. 33 and also showing details of the electrical contact means of the media reader sensory unit.

Figure 37:
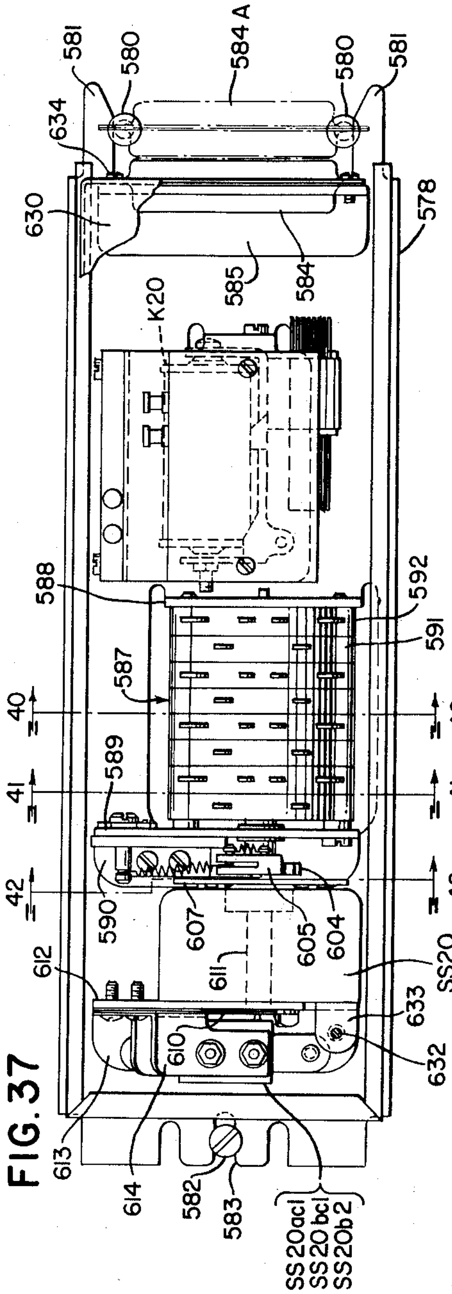

Fig. 37 is a top plan view of the media reader selector switch unit.

Figure 39:
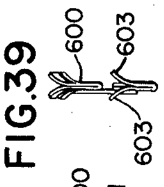
Figure 38:

Figs. 38 and 39 are detail views of one of the wipers used in the selector switch.

Figure 40:
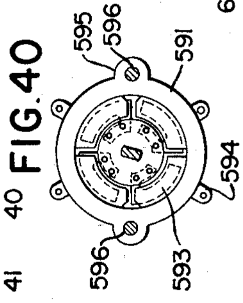
Figure 41:
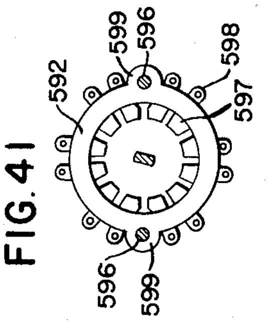

Figs. 40 and 41 are sectional views taken on lines 40—40 and 41—41, respectively, of Fig. 37.

Figure 42:
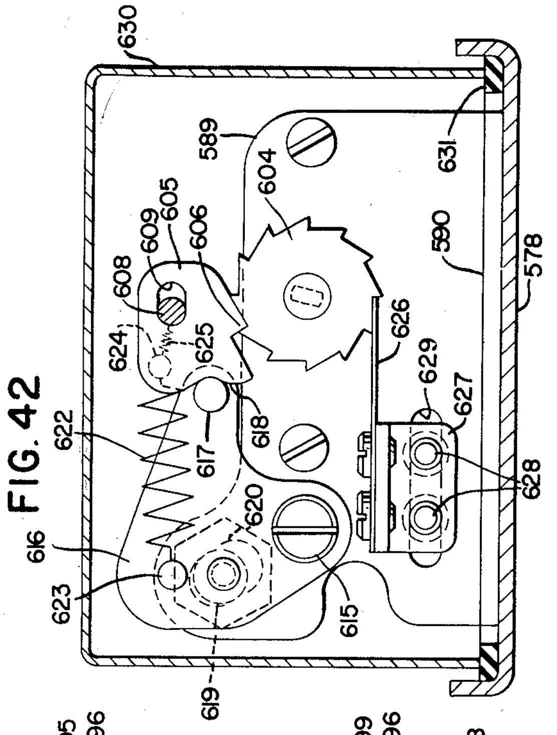

Fig. 42 is a sectional view taken on line 42—42 of Fig. 37, showing the switch-advancing means for the selector switch.

Figure 43:
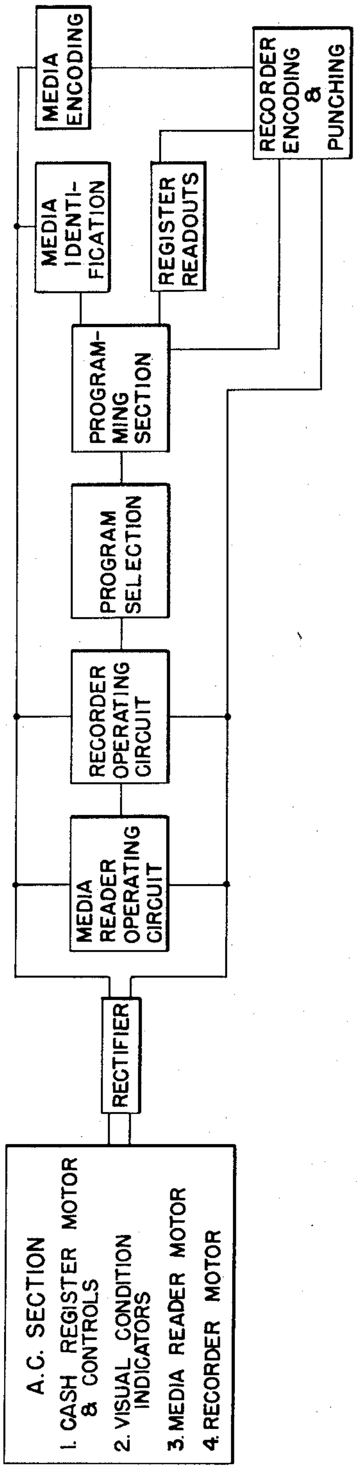

Fig. 43 is a schematic block diagram of a data-recording system embodying the media reader of the present invention.

Figure 44A:
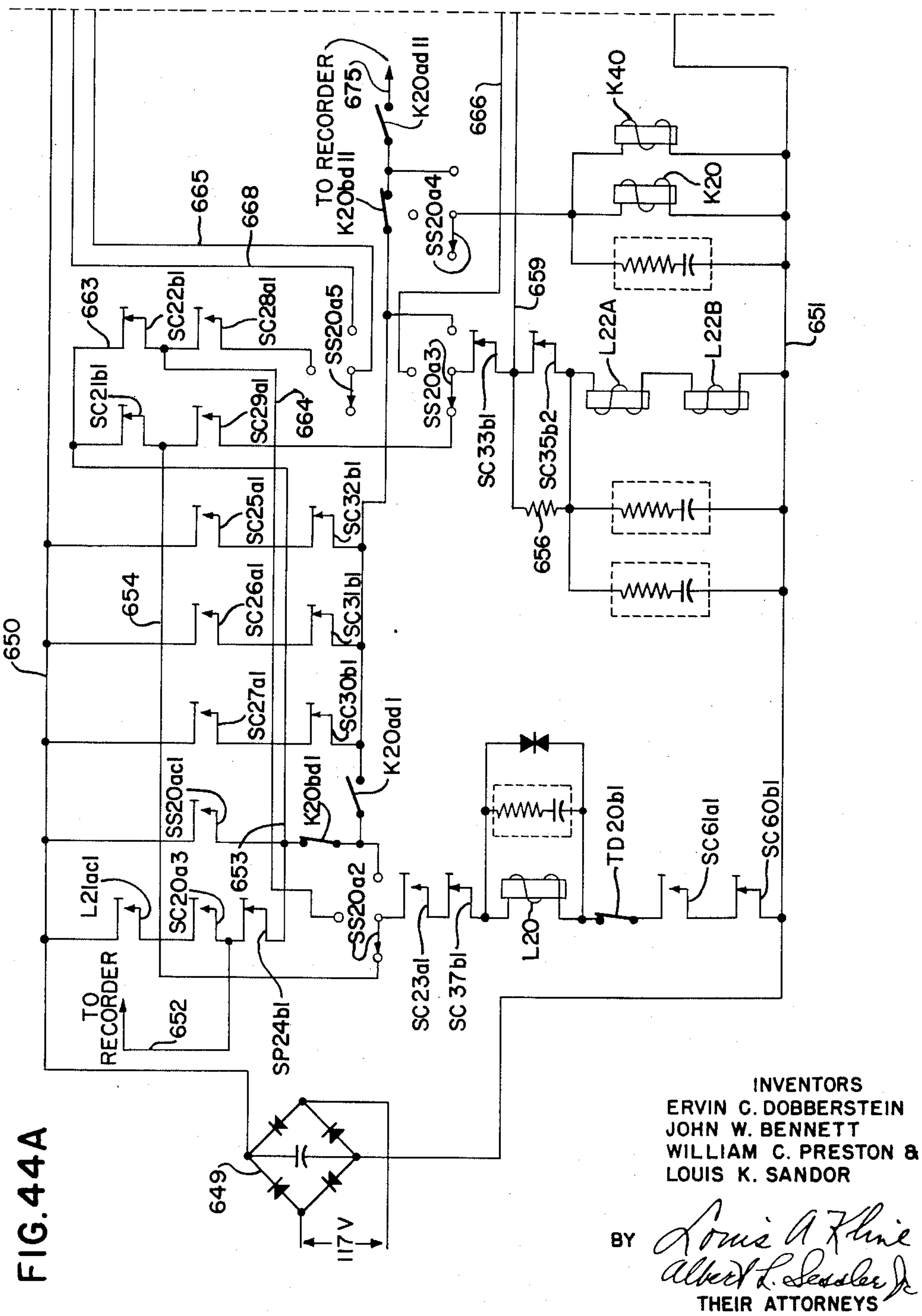
Figure 44B:
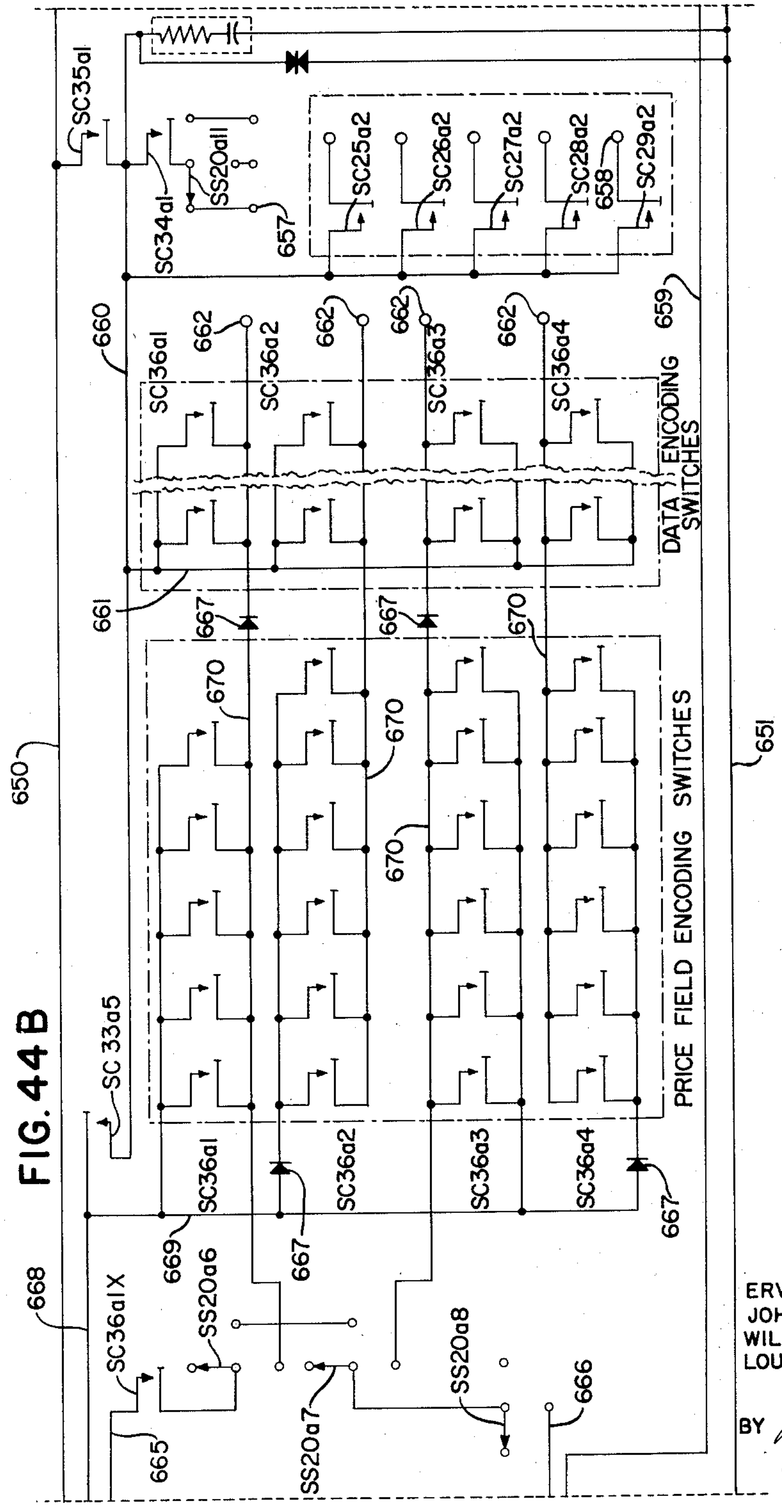
Figure 44C:
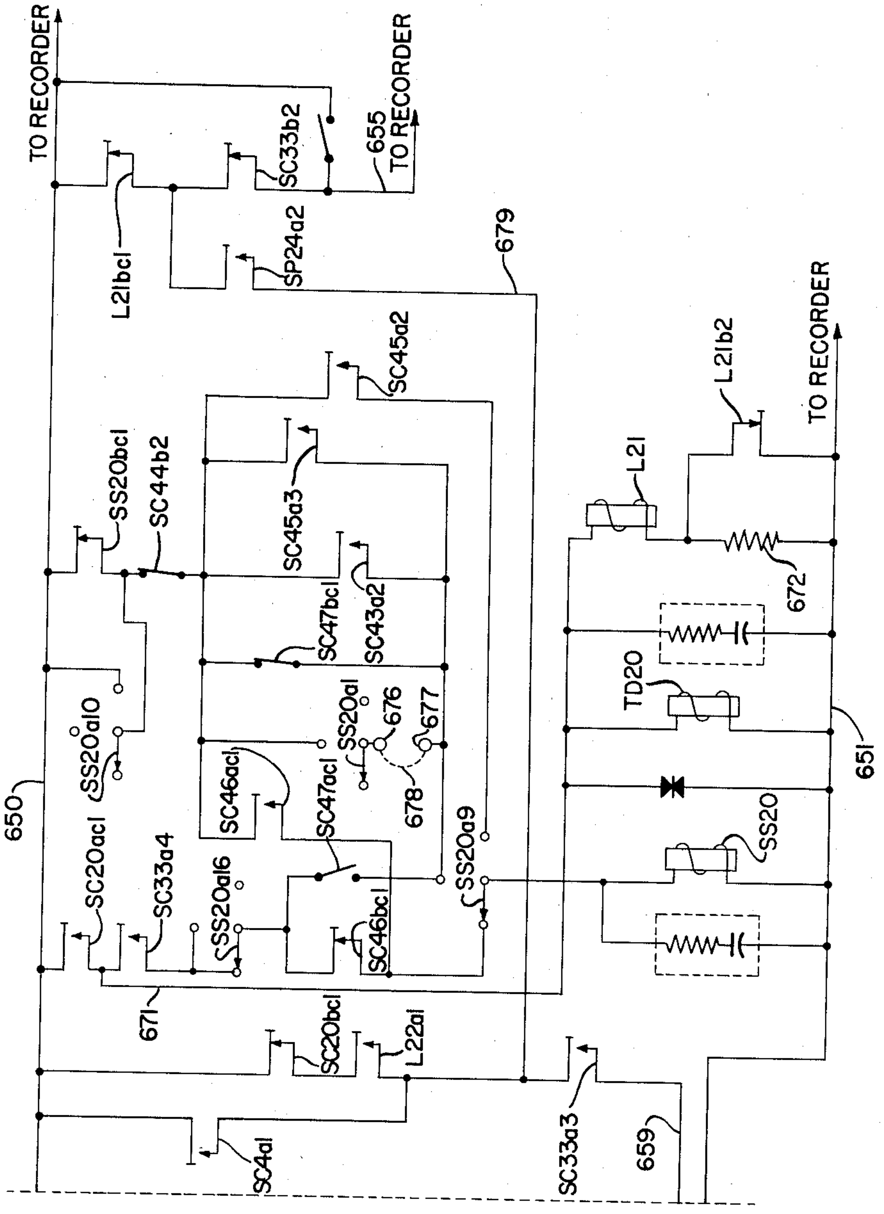

Figs. 44A, 44B, and 44C together constitute a circuit diagram of the media-reader-operating circuit shown in block form in Fig. 43.

GENERAL DESCRIPTION

The media reader of the present invention provides means for reading data from a record member, such as a tag, perforated according to a predetermined code, and further provides means for controlling a recorder or other utilizing device through electrical signals corresponding to the data read.

In the following description, the media reader of the present invention will be considered to be embodied in a data-recording system in which data related to sales of merchandise can be recorded quickly and accurately on a tape at the time the sale is made. With the data for each sale being thus recorded on the tape as the sale is made, the data for consecutive sales will appear sequentially along the tape in such manner that the tape can readily be used to control computers, or other data-processing equipment, to quickly produce stock control data, sales data, and statistical information or other reports which might be desired.

In order to have all of the information about the sale which would be needed to produce these various control data, statistics, or reports, it may be necessary to record clerk, customer account, or merchandise identification data as well as sales data for each sale. Accordingly, for each article sold, the tape will be punched with clerk number data, followed by customer or account number data, followed by merchandise identification data, followed in turn by a related set of data giving details pertaining to the nature and the amount of the sale. The punched segment of tape pertaining to each complete transaction, including clerk identification, customer identification, merchandise data, tax or other operation, and total, is considered as a "frame" of information on the tape and will normally be separated from other adjacent frames of information by End of Frame symbols.

Figure 1:
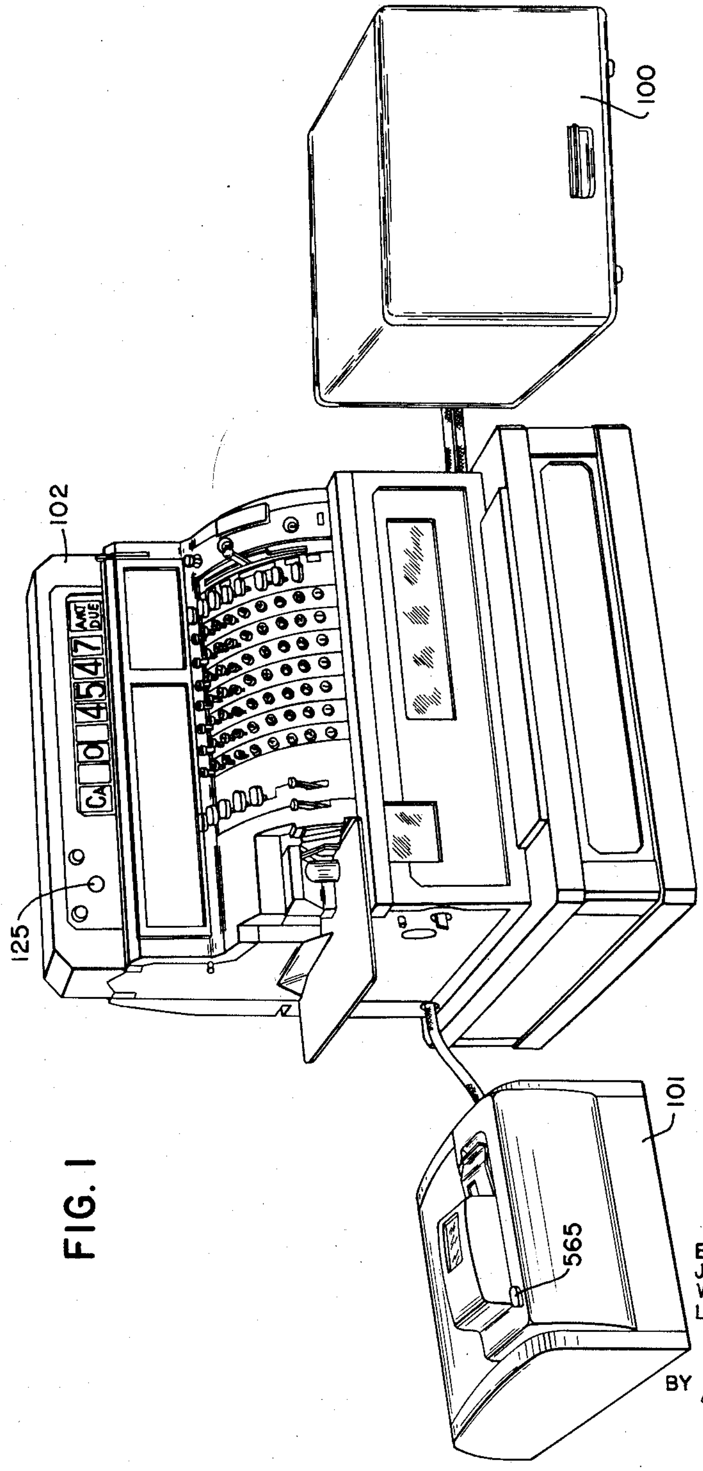
Fig. 1 is a front elevational view showing the media reader of the present invention embodied in a recording apparatus including a cash register and a recorder, and also showing the cables for connecting the three components of the apparatus together for joint operation.

Apparatus making up a system of the above type is shown in Fig. 1 and includes a recorder 100, which can produce punched tape; a media reader 101, which can control the recorder to cause clerk identification, customer or account identification, and merchandise description data to be punched on the tape; and a cash register 102, on which sales data can be set to control the recorder to cause sales data to be punched, on which tax, total, and other operations can also be set for registering and recording, and which on occasion can also control the recorder for the punching of clerk and customer identification and merchandise description data when tags or other record members adapted to be read by the media reader are not provided. The recorder, the media reader, and the cash register are connected by cables for joint operation, and, while they are shown as separate units in Fig. 1, all three units could, if desired, be contained in a single cabinet.

The novel media reader of the present invention is provided in the above system to control the recorder to supply the clerk number identification, the customer account number identification, and the merchandise description data. This data is read from a tag or other record member which has previously been perforated according to a predetermined code to represent the information which it is desired to read and record.

Figure 2:
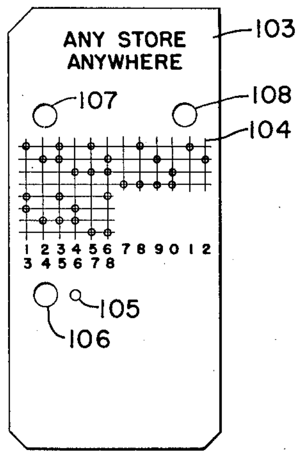
Fig. 2 is an enlarged facsimile of a typical clerk number tag to be read by the media reader.

Shown in Fig. 2 is a clerk number tag 103, on which a clerk identifying number is punched. This tag is retained in the possession of the clerk and is inserted into the media reader, as will be disclosed subsequently, whenever the clerk utilizes the recording system in the completion of a transaction, in order to cause a number identifying the clerk to be recorded on the tape.

The tag 103, as shown in Fig. 2, is of a size to accommodate twelve horizontally-spaced vertical columns 104. A total of weight vertically-spaced channels or perforating positions may be used in each of the twelve columns extending across the tag. A four-position code is employed, and this permits two sets or rows of twelve columns each to be used, one set being positioned immediately below and in alinement with the other, for a maximum of twenty-four separate data characters. Customarily, only eighteen of the twenty-four possible data character positions will be used in the clerk number tag, since this will provide sufficient capacity for most applications. As an example of the data which may be punched in the tag of Fig. 2, the eighteen columns shown are punched with a four-position code identifying the clerk, 123456789012345678. The digits punched in these columns are also printed on the tag for direct inspection. It will be realized that the size of the tag 103 and the number and location of data perforations thereon are illustrative only, and that a media reader could be constructed in accordance with the teachings of the present invention for reading a different tag having different data-storing capacity.

In addition to the clerk-identifying data which is punched and printed thereon, the tag may also have printed thereon the name and the location of the store, as shown in Fig. 2, and also, if desired, additional information, such as the clerk's name, the department of the store in which he or she is employed, etc. This latter information is not shown as printed on the tag 103 in Fig. 2.

The clerk number tag is also provided with a media identification perforation 105, positioned in alinement with one of five identification-sensing members in the media reader according to a predetermined arrangement to identify the tag as a clerk number tag, so that the media reader will accept it for reading at the proper time in the sequence of operation of registering and recording a transaction.

In addition to the data columns and the identification perforation, the clerk number tag 103 has three alining pin holes, 106, 107, and 108. When the tag 103 is properly positioned for reading, these holes will be alined with media reader alining pins, which will be shifted into engagement with said holes to retain the tag in proper alinement for reading of the data on said tag by the media reader.

Figure 3:
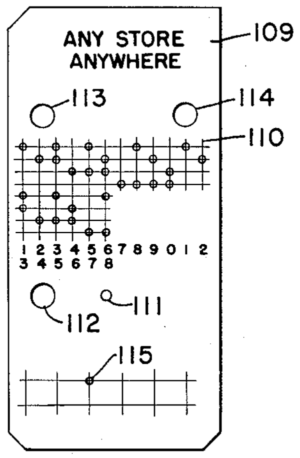
Fig. 3 is an enlarged facsimile of a typical customer number tag to be read by the media reader.

Shown in Fig. 3 is a customer number tag 109, on which a customer or account identification number, a media identification symbol, and a store identification symbol are punched. This tag is customarily retained in the possession of a customer and is given to the clerk for insertion into the media reader, as will be described subsequently, whenever the customer makes a non-cash purchase, in order to cause a number identifying the customer or the customer's account to be recorded.

As was the case with the clerk number tag 103, the customer number tag 109 has provisions for twelve columns 110, each of said columns having provision for a total of eight vertically-spaced channels or perforating positions, so that a total of twenty-four separate data characters, each represented by a four-position code, may be encoded on the tag. As was also true with the clerk number tag 103, customarily only eighteen of the twenty-four possible columns will be used in the customer number tag, since this will provide sufficient capacity for most applications. In the customer number tag 109 of Fig. 3, the eighteen columns shown are punched with a four-position code identifying the customer number or account number, 123456789012345678. The digits punched in these columns are also printed on the tag for direct inspection.

In Fig. 3, it will be seen that the name and the location of the store are also printed on the tag, and, if desired, other data, not shown in Fig. 3, may be printed on the tag, such as the customer's name.

The customer number tag is also provided with a media identification perforation 111, which is similar to the identification perforation 105 of the clerk number tag 103, except that it is located in a different position, in order that the customer number tag 109 may properly be identified, so that the media reader will accept it for reading at the proper time in the sequence of operation of registering and recording a transaction.

In addition to the data columns and the identification perforation, the customer number tag 109 has three alining pin holes, 112, 113, and 114. These holes serve exactly the same functions as that served by the alining pin holes 106, 107, and 108 of the clerk number tag 103.

An additional perforation, a store identification hole 115, is provided on the customer number tag 109. This hole may be located in any one of twelve different positions in a data field extending transversely across the lower end of the tag 109 as viewed in Fig. 3. This data field is also used for the encoding of price data on the merchandise tag and thus serves a dual function, as will be disclosed subsequently. In the event that several stores in the same business area have adopted a group charge account plan, a customer's tag 109 may be perforated in several different ones of the twelve available positions, corresponding to the different stores at which the customer has charge accounts. In Fig. 3, however, for the sake of simplicity, the tag 109 is shown perforated with only one store identification hole 115. Each of the different locations for a store identification hole will be reserved to a different store in a business area, and only a customer number tag which has a hole 115 in the location reserved to a particular store can be read by a media reader of that store, since, unless there is a store identification hole in the correct position on a tag, checking apparatus in the media reader will prevent the initiation of a reading operation.

Figure 4:
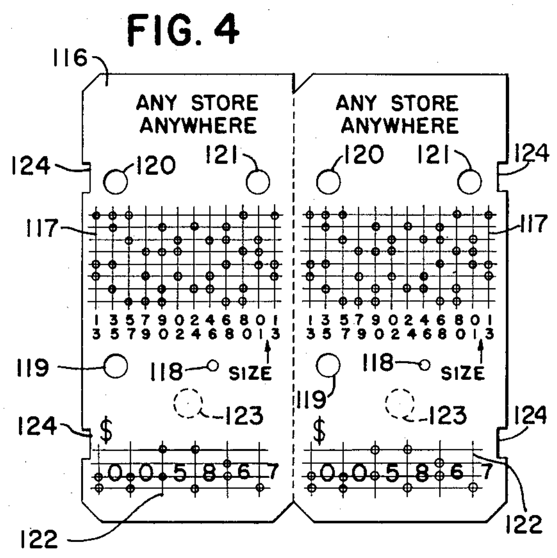
Fig. 4 is an enlarged facsimile of a typical multiple-part merchandise tag to be read by the media reader.

Shown in Fig. 4 is a two-part merchandise tag 116, on which pertinent merchandise-identifying data pertaining to an article is customarily punched at the Receiving Department of the store when the article is received. The tag is suitably attached to the article and remains with the article until the time of sale, at which time either it may be read and validated while retained on the article, or a portion of it may be detached and placed in the media reader for the reading and recording of information relating to the merchandise.

As in the cases of the clerk number tag and the customer number tag, each portion of the merchandise tag includes twelve horizontally-spaced vertical columns 117, each column having a total of eight vertically-spaced channels or perforating positions, which permits a maximum of twenty-four separate data characters to be encoded on the tag. In at least one form of the merchandise tag, all twenty-four of these characters are normally used, to provide information relating to the article to which the tag is attached, such as the name of the manufacturer, the color, the date of purchase, the season for which the article is suited, the size, etc. As shown in Fig. 4 all twenty-four available positions are utilized to provide this information, and digits corresponding to the encoded data are printed below the perforated area. A pre-printed word "Size" and a locating arrow are also printed on the tag, so that the digits relating to the size of the article may readily be identified by the clerk or the customer.

Each portion of the tag 116 is also provided with a media identification perforation 118, positioned in alinement with one of the five identification-sensing pins of the media reader for identification of the tag, as has been explained in connection with the clerk number tag 103 and the customer number tag 109. The hole 118 is, therefore, positioned to identify the tag 116 as a merchandise tag, and, if more than one digit length of merchandise tag is used by the particular store, as many as three different positions for the identification hole 118 may be provided to identify the particular digit length of merchandise tag being used.

Three alining pin holes, 119, 120, and 121, are also provided on each portion of the merchandise tag 116. These alining pin holes serve exactly the same function as that served by the alining pin holes in the clerk number tag 103 and the customer number tag 109.

An additional perforated area, constituting a price field, is provided on each of the portions of the merchandise tag 116 and includes six columns 122, each column including a total of four vertically-spaced channels or positions for perforation according to a four-position code. Therefore it will be seen that six data characters may be encoded in the price field. The price field on the merchandise tag 116 is coincident with the area available for store identification perforations on the customer number tag 109. As has been stated previously, this area serves a dual function and undergoes two different sensing operations of the media reader, as will be disclosed subsequently. The data encoded in the price field on the various portions of the tag 116 has printed adjacent thereto the digits corresponding to the individual data characters. In the illustrated tag of Fig. 4, these digits show that the price of the article in question is $58.67. It will be noted that, in order to utilize all six of the available positions, two zeros have been included and positioned in front of the 58.67. If desired, the punching of the zeros could simply be eliminated, so that only four of the available six columns would be utilized. Whether or not this is done customarily depends upon the type of punching mechanism employed for punching the price data, and upon the requirements of the recording system with which the media reader is used.

It will be noted that a validating area 123 is provided in a section of each part of the multiple-part merchandise tag 116. During the reading of each merchandise tag, a validating mechanism in the media reader can, if desired, cause an impression to be made in the validating area of the tag being read in a manner which will be described subsequently. This impression is made on the back of the portion of the merchandise tag 116 which is being read by the media reader. The merchandise tag will customarily be read without detachment of the portion actually being read from the remainder of the tag, and this portion, which is marked during reading with a validating mark, will be retained as an integral part of the multiple-part merchandise tag 116.

Then, in the event that the customer purchasing the article wishes for any reason to return said article, an examination of the merchandise tag 116 by the clerk when the return is being made will disclose the validating mark on the back of a portion of the tag and will give notice that the article has previously in fact been purchased at the store. The article, together with its attached merchandise tag 116, may then be returned for sale to its rack or counter after the clerk simply detaches the leftmost portion of the multiple-part merchandise tag to remove that part of the tag which bears the validating mark.

Cut-out portions 124 are provided along one of the vertical edges of each portion of the merchandise tag 116. The reason for these cut-out portions 124 is that the tags 116 will normally be fabricated and sent to the using store in strip form, each strip containing a number of tags. The tags may be then separated into the desired groups when they reach the store, and the cutouts 124 are provided to facilitate such separation.

In addition to the printing described above in the description of the merchandise tags 116, other printing, such as the name and the location of the store, may be provided on the tag, as shown in Fig. 4. In addition, printing of any other desired data, such as a slogan or an advertisement, may be provided, if desired, but is not shown in Fig. 4.

The manner in which the media reader of the present invention may be used to read tags of the type described above and shown in Figs. 2, 3, and 4, in cooperation with the other elements of a data-recording system such as that shown in Fig. 1, will now be described briefly.

The recorder 100, which is controlled by the media reader 101 and the cash register 102, is operable to produce a punched paper tape in a well-known manner. The recorder may be programmed to produce many different types of codes for the representation of data and symbols on the paper tape.

The control of the recorder by the media reader 101 and the cash register 102 is coordinated by programming means which can be set up to provide several punching sequences which may cause the recorder to be controlled by the media reader and the cash register jointly or by the cash register alone, as required to record the necessary data on the tape. Control of the recorder by the reader and the cash register is also coordinated by a replaceable sequence control means which determines the sequence of the recording of different classes of data, such as clerk number data, customer number data, and merchandise data. The sequence control means may be replaced by another, similar, means to vary the sequence of recording of different classes of data as required. In the use of the system, a main power switch 125 (Fig. 1), located on the indicator cover of the cash register 102, is closed to supply operating power to the three components of the recording system. This is done at the beginning of a day's business.

In completing each transaction during a business day, the clerk will customarily first depress an appropriate key on the cash register, descriptive of the type of transaction, and will then insert his clerk number tag into the media reader for reading and recording. Insertion of the tag causes initiation of a reading operation by the media reader and the recording of the information read, and also causes the tag to be gripped and held in the reader until all information on said tag has been read, after which it is released. Means which will be described subsequently are provided to prevent the reading of the wrong tag by inadvertence or mistake.

After the clerk number tag has been read, the clerk will, unless the transaction is a cash sale, insert the customer number tag, which will be supplied by the customer, into the media reader for reading and recording. In the event of a cash sale, customer number information is not necessary and may be omitted. The customer number tag is read, and the information is recorded, in the same manner as that which has been described for the clerk number tag.

Following the reading of a customer number tag, or following the reading of a clerk number tag in the event of a cash sale, a merchandise tag is inserted into the media reader for reading and recording. The merchandise tag may be read while it is still attached to the article to which it pertains, or it may be detached therefrom for reading and recording, if desired. The merchandise tag is read, and the information is recorded, in the same manner as that which has been described for the clerk number tag and the customer number tag.

During the time the data is being read from the merchandise tag and recorded, the clerk can operate the keys on the keyboard of the cash register to set up the amount of the sale and other pertinent sales information related to the data being read from the tag, but the cash register will not operate until all data has been read from the tag by the media reader and recorded by the recorder on the tape, after which the cash register is automatically released and operates. During this operation of the cash register, the data set up on the cash register keyboard may be transmitted to the recorder in accordance with the selected program and punched on the tape immediately following the data which has been read from the merchandise tag by the media reader and transmitted to the recorder.

Interlocking devices are provided in the cash register, the media reader, and the recorder to enforce proper operating sequences. Interlocks pertaining to the media reader will be described subsequently in this application, and the other interlocks are described in detail in the previously-mentioned United States patent application, Serial No. 622,591.

Provision is made for entering clerk number, customer number, and merchandise data into the recording system by use of the cash register keyboard in the event that tags are not used in a particular application. In the event that a customer number tag or a clerk number tag is lost or mutilated beyond use, the operator reads the data from the mutilated tag, or, if there is no tag, the information may be available from memory, from an information sheet, or from some other source. This information is entered into the recording system through the cash register keyboard, and by use of an appropriate transaction key on the cash register. Depression of the appropriate key in the data-entering operation conditions the electrical circuits so that the cash register can be operated without operation of the media reader. Interlocks and interconnections are provided, which, upon depression of the clerk number key of the cash register or the customer number key of said register, disable the media reader. These controls also lock the transaction keys of the cash register against operation when a tag has been positioned in the media reader for reading. An interlock is also provided which disables the media reader when merchandise description data is entered through the cash register keyboard, and vice versa. For a detailed description of the construction of the recorder 100 and the cash register 102 and the manner in which these machines function in the operation of a data-recording system such as that described above, reference may be had to the previously-mentioned United States patent application, Serial No. 622,591.

*Media reader*

The media reader is shown in Fig. 1 and in Figs. 5 to 42 inclusive and is operable to read data from record members, such as the tags 103, 109, and 116, and to control a recorder to reproduce this data on recording tape. The media reader can also control the cash register 102 for proper coordination of these two elements of the recording system.

The media reader of the instant embodiment has the capacity for reading an identification column of five positions, a first data field of twenty-four characters, and a second data field having six columns of four positions each. The first data field comprises twelve columns, each column having eight vertically-spaced channels or positions, each of the twenty-four characters being represented by a four-position code, as previously described. The second data field serves a dual function, being used for data in one type of tag, and being used for identification purposes in another type of tag, as will be described subsequently. It will be obvious from the following description that the capacity of the media reader, as to the number of columns and as to the number of positions per column which may be read, is merely exemplary, and that the capacity can be varied without departing from the invention.

The media reader contains various side frames, supporting members, and cross bars, on which the various components are supported, and these frames, bars, and supporting members will be referred to when the various components are described in detail.

*Tag-receiving means*

Figures 14, 15, 16:
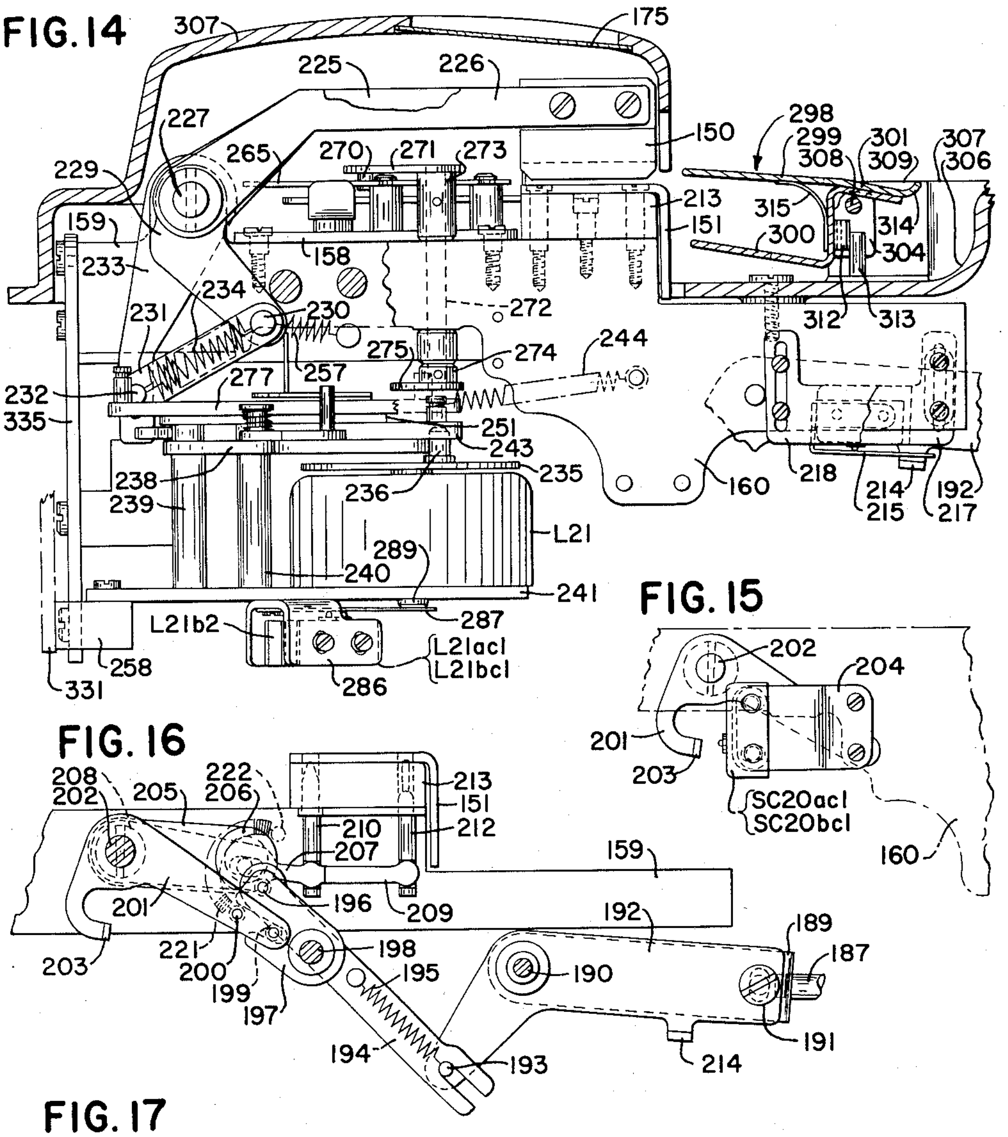
Fig. 14 is a detail view showing the tag-clamping means, the tag-ejecting means, the operating means for operating the clamping and ejecting means, and the tag storage means.
Fig. 15 is a detail view showing a switch operated in conjunction with the operation of the alining pins.
Fig. 16 is a detail view of the alining pin mechanism.

The media reader cabinet is slotted at the reading station, as best shown in Fig. 14, to provide an aperture for the insertion of a tag into the machine for reading. The tag is slipped into a space defined at the top by a clamping block 150, at the bottom by a plate 151, and at the inside edge by two ears 152 and 153 (Figs. 8 and 9), bent up from two operators 154 and 155, respectively.

A window 175 (Figs. 14 and 22) in the media reader housing 307 cooperates with a recess 176 and a guide 177 in the clamping block 150 to facilitate proper positioning of the tag in the media reader. The upper alining hole of the tag to be inserted may be alined with a line 178, machined in the upper plate 299 of a tag receptacle 298, and the tag may then be slid into the media reader until one of the alining holes in the tag registers with the guide 177. The tag is then properly positioned for reading.

Figure 9:
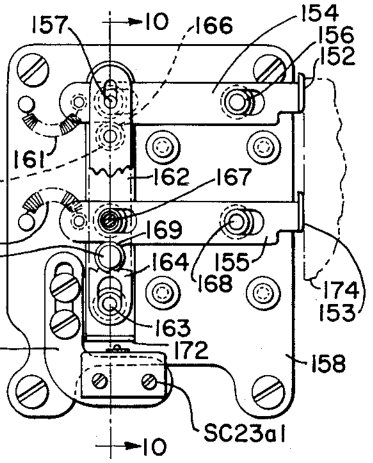
Fig. 9 is a detail view showing the operating mechanism for the media insert switch.

The operator 154 is slidably mounted on two studs 156 and 157, fixed to a base member 158, secured to two machine cross members 159 and 160, which are secured in turn to right and left support frames 334 and 335 (Fig. 21), and is urged to the right, as viewed in Fig. 9, by a constant-force spring 161. A member 162 (Figs. 9 and 10) is mounted for sliding movement in a path at right angles to the paths of movement of the operators 154 and 155 by means of slots in said member, which receive the stud 157 and another stud 163 fixed to the base member 158. Alined with, but spaced apart from, the member 162 is a further member 164, also mounted by means of slots therein for sliding movement on the studs 157 and 163.

Figure 10:
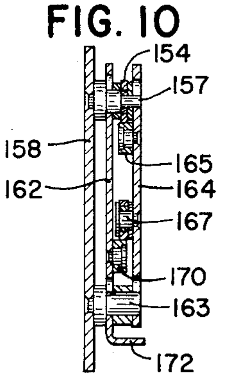
Fig. 10 is a sectional view taken on line 10—10 of Fig. 9.

A roller 165 on the member 164 coacts with a cam surface 166 on the operator 154, so that movement to the left, as viewed in Fig. 9, of the operator 154 against the force of the spring 161 results in downward movement, as viewed in Figs. 9 and 10, of the member 164. Fixed to the member 164 is a stud 167, which, together with a stud 168 on the base member 158, forms a mounting for the operator 155, which is mounted for sliding movement thereby. Integral with the operator 155 is a cam surface 169, arranged to coact with a roller 170 on the member 162 to shift said member 162 downwardly, as viewed in Figs. 9 and 10, when the operator 155 is shifted to the left, as viewed in Fig. 9, against the force of a constant-force spring 171.

An upturned end 172 on the member 162 is positioned to coact with an actuator on a snap-action switch comprising contacts SC23*a*1, fixed to the base member 158 by means of a bracket 173, when the member 162 partakes of the full extent of its permissible downward movement, as viewed in Figs. 9 and 10.

Insertion of a tag, such as tag 174 (Fig. 9), will be effective to operate the contacts SC23*a*1 only when the tag is correctly inserted against both of the ears 152 and 153, so as to shift both of the operators 154 and 155 to the left (Fig. 9). When the operator 154 is shifted to the left, it will be seen that the member 164 is carried downwardly by the action of the surface 166 on the roller 165, thereby carrying the stud 167 and the left end of the operator 155 downwardly, as viewed in Fig. 9. This carries the member 162 a certain distance downwardly, due to the coaction of the surface 169 on the operator 155 with the roller 170 on the member 162, but does not carry the member 162 far enough downwardly to cause the end 172 thereon to operate the actuator of the snap-action switch comprising the contacts SC23*a*1. Now, if the operator 155 is also shifted to the left by contact of the tag 174 with the ear 153, the surface 169 on said operator will be shifted to the left and will cam the roller 170 an additional distance downwardly to cause further downward movement (Figs. 9 and 10) of the member 162 sufficient to cause the end 172 thereon to coact with the actuator to operate the contacts SC23*a*1.

Movement of either one of the ears 152 or 153 alone to the left by the tag 174 does not move the member 162 downwardly sufficiently to cause the contacts SC23*a*1 to be operated, but, when both ears are moved to the left by correct insertion of the tag 174, the contacts SC23*a*1 will be operated as described above.

*Tag-alining means*

Means are provided to aline and retain the inserted tag in proper position to be read by the media reader.

Figure 21:
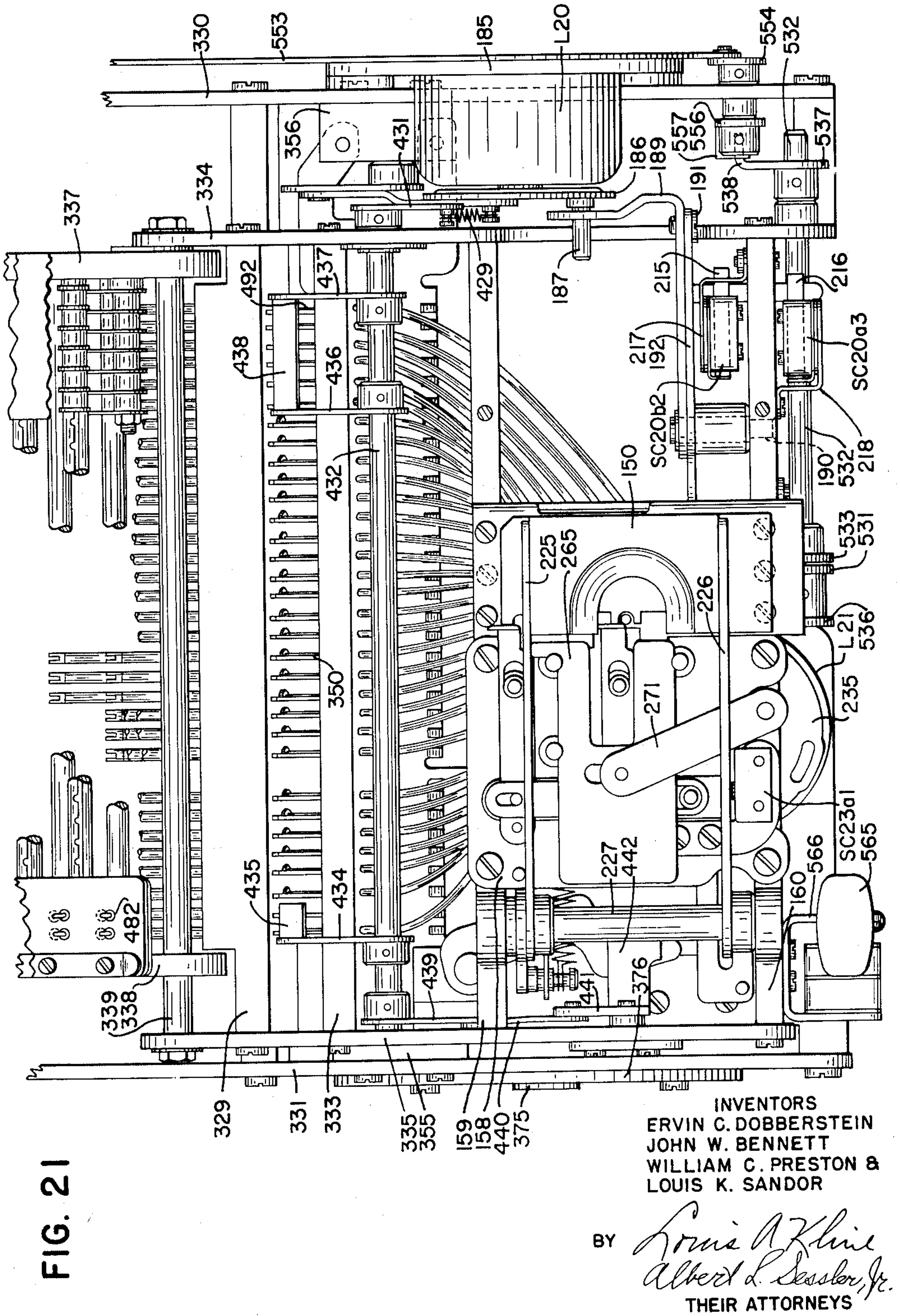
Fig. 21 is a partial top plan view of the reader, with certain parts broken away to show other parts more clearly.

An alining pin solenoid L20 (Figs. 19 and 21) is fixed to a frame member 185 of the media reader and is provided with an armature 186, having fixed thereto a pin 187. The pin 187 rides in a slot 188 of an arm 189, which has a right-angle bend, as best seen in Fig. 21, and which is pivoted on a stud 190 (Fig. 16) fixed in the cross member 160. Also pivoted on the stud 190, and adjustably fixed to the arm 189 by a screw 191 to operate in unison with said arm, is a lever 192, having a stud 193 fixed to its free end.

A link 194 (Figs. 7 and 16) is slotted at one end to receive the stud 193, which is yieldingly held at the inner end of the slot by a spring 195, connected between the stud and said link. At its other end, the link 194 is pivotally connected by a pin 196 to an arm 197 on a shaft 198, journalled in the cross member 160. A slot in the arm 197 is arranged to coact with two studs 199 and 200 fixed in an arm 201 pinned to a shaft 202 journaled in the cross members 159 and 160 and extending therebetween. An ear 203 (Figs. 15 and 16) on the arm 201 is arranged to coact with the actuator of a snap-action switch comprising the contacts SC20*ac*1 and SC20*bc*1, said switch being mounted by means of a bracket 204 on the cross member 160.

Also pinned to the shaft 202 is an arm 205 (Figs. 7 and 16), having at its free end an eccentric connection 206 to a further arm 207 free on the shaft 202. A sleeve 208 connects an additional arm 209 to the arm 207 for movement in unison therewith. Slightly-enlarged portions on the arms 207 and 209 cooperate with cut-away portions in the stems of three alining pins 210, 211, and 212, which are slidably mounted in a block 213 secured to the cross members 159 and 160.

The lever 192 is provided with an integral bent-over projection 214, which is arranged to coact with actuating blades 215 and 216 (Figs. 14 and 21) for operating two snap-action switches comprising contacts SC20*b*2 and SC20*a*3, respectively. These snap-action switches are mounted on the cross member 160 by means of brackets 217 and 218, respectively.

Operation of the contacts SC23*a*1 by proper insertion of a tag in the manner previously described causes the alining pin solenoid L20 (Figs. 19 and 21) to be energized, as will be described subsequently. Energization of the solenoid L20 causes the pin 187 on the armature 186 of said solenoid to be rocked clockwise, as viewed in Fig. 19, and upward, as viewed in Fig. 16. This rocks the lever 192 counter-clockwise, as viewed in Fig. 16, causing the link 194 to be carried downwardly and to the right due to the connection between said lever and said link comprising the stud 193 and the spring 195. The arm 197 is rocked clockwise, as viewed in Fig. 16, by this movement of the link 194, causing the arm 201 to be rocked counter-clockwise. It will be recalled that the arm 201 and the arm 205 are both pinned to the shaft 202, that the arm 207 is connected to the arm 205 for unitary movement therewith, and that the arm 209 is connected by means of the sleeve 208 to the arm 207. Therefore all of these elements will be rocked counter-clockwise, as viewed in Fig. 16, in response to clockwise movement of the arm 197. Since the alining pins 210, 211, and 212 are operatively connected to the arms 207 and 209, counter-clockwise movement of said arms will cause the alining pins to move upwardly in the block 213 and through the plate 151, which is positioned and secured immediately above the block 213, to seek, and extend through, the alining pin holes on the tag which has been inserted into the media reader for reading.

The various elements of the operating mechanism for the alining pins 210, 211, and 212 are so arranged that, when the alining pin solenoid L20 is energized, the force applied to the alining pins 210, 211, and 212 to urge them upwardly is initially relatively light, said force becoming heavy only when the alining pins have moved upwardly through a portion of their total permissible travel. This is accomplished by means of the relative positioning of the centers of the stud 193, the pin 196, and the shaft 198. It will be seen from an examination of Fig. 16 that at the beginning of movement of the link 194, the centers of the stud 193, the pin 196, and the shaft 198 are almost directly in line, one with another. The component of the force exerted by the spring 195 on the link 194 which is available for the shifting of the alining pins 210, 211, and 212 through the alining-pin-operating linkage is therefore relatively quite small, and a relatively small force will be applied to the alining pins. For this reason, if the inserted tag is not positioned properly, and the alining pin holes in the tag are not properly alined with the points at which the alining pins extend through the block 213 and the plate 151, the alining pins will contact the material of the tag rather than the alining pin holes. Since only a relatively small force is applied to the alining pins at this time, they will not be able to penetrate the material of the tag and will be held in unoperated position until the tag has been shifted so that the alining pin holes in the tag are in proper alinement with the alining pins. Said pins will then be able to move through the holes in the tag, and, as their distance of travel increases, the relative positions of the centers of the stud 193, the pin 196, and the shaft 198 change, so that an increasingly larger component of the force exerted by the spring 195 is applied to the alining pins 210, 211, and 212 to shift said alining pins in an upward direction, as viewed in Fig. 16. The alining pins will thereby be enabled to complete their upward movement to aline the inserted tag and retain it in proper position. The pins 210, 211, and 212 will remain in their operated, tag-retaining, positions so long as the solenoid L20 is held energized. At the time of deenergization of the solenoid L20, the various parts of the alining pin mechanism will be returned to the positions in which they are shown in Figs. 7, 16, 19, and 21 by a constant-force spring 221, connected between the stud 200 and a stud 222 on the cross member 160, acting in conjunction with a reset spring 219 (Fig. 19), acting through a link 220, connected to the armature 186 of the solenoid L20, as will be described subsequently. Movement of the parts in a return direction is limited by the coaction of the stud 200 on the arm 201 with the slot in the arm 197.

During the movement of the alining pin mechanism which takes place during energization and deenerization of the solenoid L20, the ear 203 on the arm 201 coacts with the actuator of the snap-action switch comprising contacts SC20*ac*1 and SC20*bc*1 to operate said contacts, so that, as the alining pins 210, 211, and 212 are shifted into their operated positions, the contacts SC20*ac*1 are closed and the contacts SC20*bc*1 are opened. Conversely, when the alining pins 210, 211, and 212 are returned to the positions in which they are shown in Fig. 16, upon deenergization of the solenoid L20, the contacts SC20*ac*1 are opened and the contacts SC20*bc*1 are closed. Similarly, during movement of the alining pins 210, 211, and 212 into their operated position, the projection 214 on the lever 192 operates the actuators 215 and 216 of the snap-action switches comprising the contacts SC20*b*2 and SC20*a*3, respectively, causing the contacts SC20*b*2 to be opened and the contacts SC20*a*3 to be closed. Conversely, as the alining pins 210, 211, and 212 are moved from their operated positions back to the positions in which they are shown in Fig. 16, the contacts SC20*b*2 are closed and the contacts SC20*a*3 are opened.

*Tag-clamping means*

Figures 6, 7:
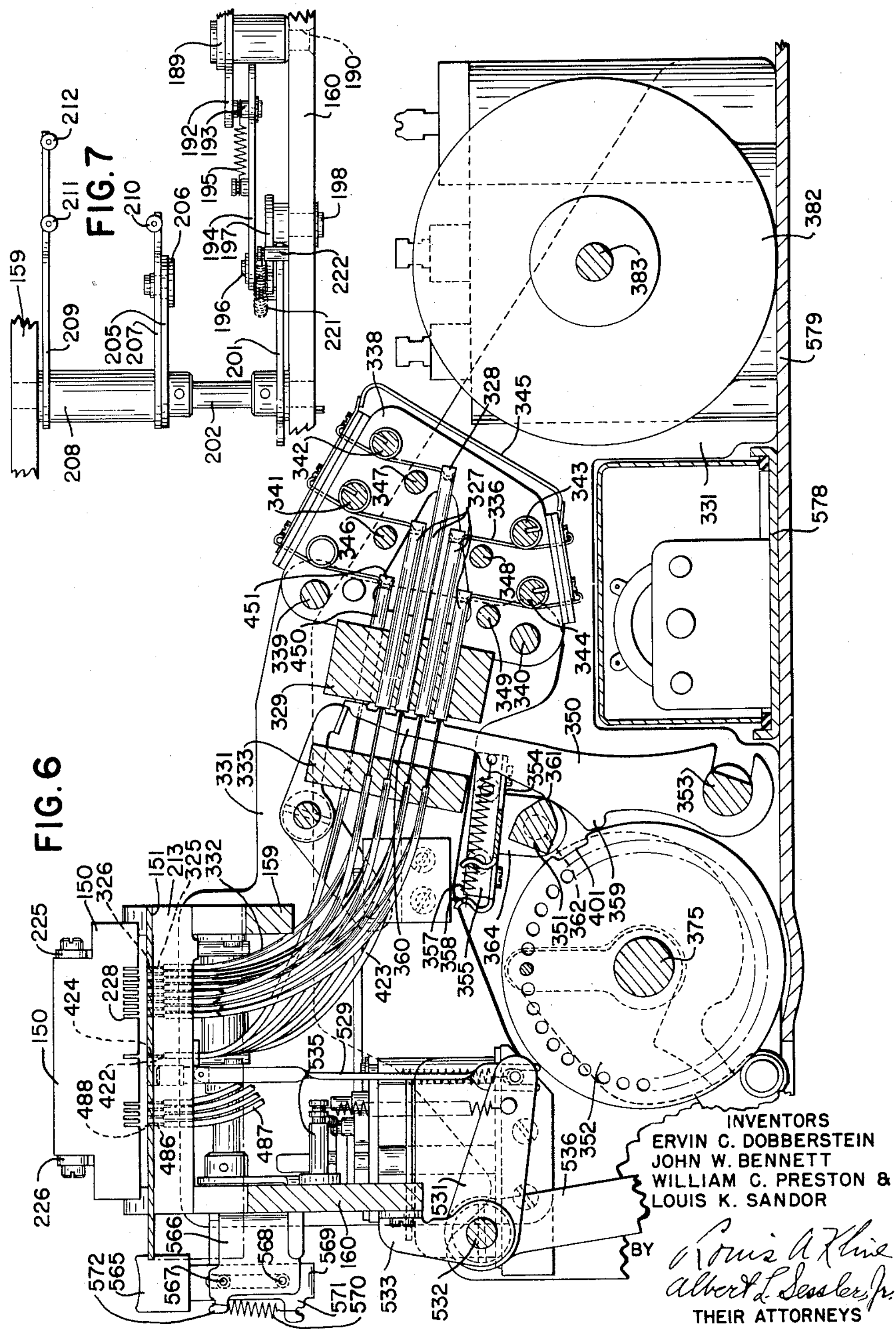
Fig. 6 is a vertical section through the media reader.
Fig. 7 is a top detail view showing various parts of the alining pin mechanism.

Means are provided to clamp a tag which has been inserted into the media reader in reading position to retain said tag against shifting out of its proper reading position. The clamping block 150 (Figs. 6, 14 and 21) is secured between two legs 225 and 226, which are pinned to a shaft 227, extending between and journaled in the cross members 159 and 160. The clamping block 150 is grooved, as at 228 (Fig. 6), to provide clearance for the sensing wires of the sensory mechanism of the media reader, and is positioned to be movable from the position in which it is shown in Figs. 6 and 14 downwardly, so as to clamp an inserted tag tightly against the plate 151, which is secured to the top surface of the block 213.

The leg 225 is provided with a downward extension 229 (Fig. 14), in the lower end of which is fixed a stud 230. A link 231 is mounted on the stud 230 and is slotted at its other end to receive a stud 232 on an arm 233 free on the shaft 227. A double spring 234 is connected to the studs 230 and 232 and thus urges the arm 233 and the extension 229 together, the link 231 acting to hold the two elements in spaced-apart relation.

Operation of the clamping means is accomplished through mechanism associated with a clamping pin solenoid L21 (Figs. 8, 11, 14, and 21), as will now be described.

The clamping pin solenoid L21 is provided with an armature 235, having thereon an operating pin 236. Interposed in the path of movement of the pin 236 is an operating surface 237 of a plate 238, slotted for sliding movement on the reduced portions of two studs 239 and 240, fixed to a supporting member 241, on which the solenoid L21 also is mounted. The supporting member 141 is secured to a block 258, which in turn is secured to the left side frame 331 and the left support frame 335, as may be seen in Fig. 14. The plate 238 is normally urged to the right, as viewed in Fig. 11, by a constant-force spring 242, connected between said plate and the machine framework.

Figures 8, 11:
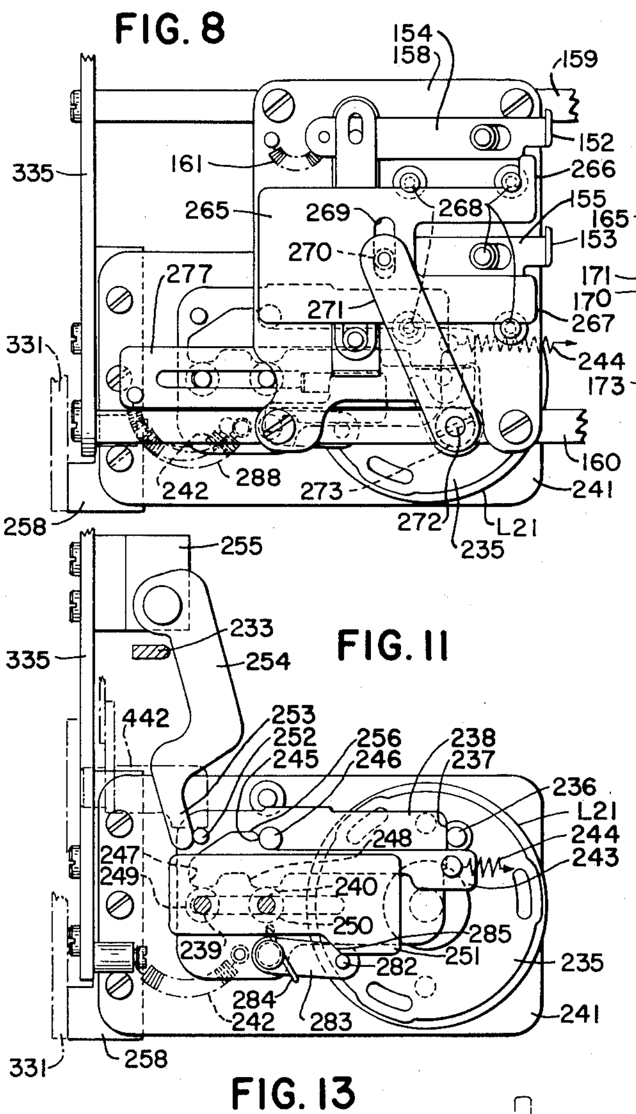
Fig. 8 is a detail view showing the tag-ejecting means and operating mechanism therefor.
Fig. 11 is a detail view showing the solenoid-operated mechanism for operating the tag-clamping means and the tag-ejecting means.

Immediately above and resting on the plate 238 is an operator 243, which is urged to the right, as viewed in Fig. 11, by a spring 244. Movement of the operator 243 to the right is limited by a surface 245 on said operator, which coacts with a stud 246, fixed in the plate 238. Two projections, 247 and 248, on the operator 243 coact, in a manner to be described subsequently, with washers 249 and 250, which rest on the plate 238 around the reduced portions of the studs 239 and 240. A retaining plate 151 is provided with holes for the reception of the reduced portions of the studs 239 and 240 and rests upon the upper surface of the operator 243 and the washers 249 and 250. A stud 152, fixed on the plate 238, is positioned to coact with a finger 253 on an arm 254 pivotally mounted on a bracket 255 secured to the left support frame 335.

As will be described subsequently, the solenoid L21 is energized following energization of the solenoid L20. Energization of the solenoid L21 causes the armature 235 and the pin 236 to be rotated counter-clockwise, as viewed in Fig. 11, which in turn causes the plate 238 to be shifted to the left, against the force of the springs 242 and 244, due to the coaction of the pin 236 with the surface 237 on the plate 238. This is effective to rock the arm 254 clockwise by reason of the coaction of the stud 252 on the plate 238 with the finger 253 on the arm 254. As may be seen in Fig. 11, clockwise movement of the arm 254 causes it to coact with one edge of the arm 233 (Figs. 11 and 14, which, it will be recalled, forms part of the operating mechanism for the clamping block 150 (Fig. 14). Clockwise movement of the arm 254 (Fig. 11), therefore, causes movement of the arm 233 clockwise, as viewed in Fig. 14. This movement is transmitted through the double spring 234 to the clamping block assembly, which comprises the arms 225 and 226, the arm 225 having the extension 229, which is connected to the double spring 234, and the block 150. Therefore, during energization of the solenoid L21, as the plate 238 moves to the left, as viewed in Fig. 11, the clamping block 150 will be shifted downwardly, as viewed in Fig. 14, to contact the inserted tag and hold it tightly against the plate 151. It will also be seen that, as energization of the solenoid L21 continues, so as to shift the pin 236 to the fullest extent of its counter-clockwise movement, as viewed in Fig. 11, the plate 238 and the arm 254 will shift the arm 233 in a manner to cause further tensioning of the spring 234. This applies additional force to the clamping block 150 in its clamping action on the inserted tag.

During movement of the plate 238 to the left under the influence of the pin 236 when the solenoid L21 is energized, the stud 246 will carry the operator 243 leftward with said plate against the force of the spring 244, as shown in Fig. 11. As the operator 243 moves to the left, its projections 247 and 248 move out of engagement with the washers 249 and 250 on the studs 239 and 240, and the force of the spring 244, working in conjunction with the coaction between the surface 245 and the stud 246, causes the left end of the operator 243 to be shifted downwardly to position the projection 248 between the washers 249 and 250. With the operator 243 in the position described above, the stud 246, as the plate 238 continues to move to the left, as viewed in Fig. 11, will move into coacting relationship with a surface 256 on the operator 243 adjacent the surface 245. Coaction of the stud 246 and the surface 256 will serve to retain the operator 243 in its shifted position during continued energization of the solenoid L21. Therefore, so long as the solenoid L21 remains energized, the plate 238 will be held shifted to the left, as viewed in Fig. 11, the operator 243 will be held in its shifted position, and the clamping block 150 will be held downwardly, as viewed in Fig. 14, in clamping relation to the inserted tag.

When the solenoid L21 is deenergized, thus removing the force which acts through the pin 236 to hold the plate 238 to the left, as viewed in Fig. 11, a combination of forces acts to shift the plate 238 back to the position in which it is shown in Fig. 11. A spring 257 (Fig. 14) is connected between the extension 229 of the leg 225 and the cross member 159 and is placed in tension by the shifting of the clamping block 150 into clamping position. Hence this spring acts to restore the clamping block assembly to the position in which it is shown in Fig. 14 once the solenoid L21 has been deenergized. Also the spring 242 tends to shift the plate 238 to the right, as viewed in Fig. 11. In addition, once the stud 246 on the plate 238 has moved to the right, past the surface 256 on the operator 243, the spring 244 urges the left end of said operator upwardly, so as to position the surface 245 in coacting relation with the stud 246 and to move the projection 248 out from between the washers 249 and 250. The spring 244 is then free to exert its influence to urge the operator 243 to the right, and, since the surface 245 is in coacting relation with the stud 246 on the plate 238, said plate is also urged to the right by the spring 244. Return of the plate 238 to the position shown in Fig. 11 is thus accomplished rapidly under a combination of forces acting thereon, once the solenoid L21 has been deenergized. This frees the clamping block 150 on the legs 225 and 226 to return to the position in which it is shown in Fig. 14, under the influence of the spring 257, thereby removing the clamping action from the tag which has been inserted into the media reader for reading, so that said tag may be ejected from the media reader by means which will now be described.

*Tag-ejecting means*

Means are provided for ejecting a tag from the media reader upon completion of the reading operation. This means includes a tag ejection plate 265 (Figs. 8, 13, and 21), having two operating surfaces 266 and 267 for coaction with the edge of the tag which is to be ejected, and being mounted for sliding movement by means of four studs 268 on the base member 158. The plate 265 is provided with a slot 269, which receives a stud 270 fixed in one end of a link 271 secured at its other end by means of a hub 273 to a vertically-positioned shaft 272 (Figs. 8, 13, and 14). The shaft 272 is journaled in a vertical bore in the cross member 160, on the upper surface of which the hub 273 rests. At its lower end, the shaft 272 has fixed thereto a bifurcated arm 275 by means of a hub 274. The bifurcated portion of the arm 275 loosely embraces a stud 276 (Fig. 13), which is fixed in an operating member 277 provided with a slot 278 for slidable mounting on the studs 239 and 240. The operating member 277 rests on top of the retaining plate 251, as viewed in Fig. 14, and is urged to the right, as viewed in Figs. 13 and 14, by means of a constant-force spring 288. Also secured to the operating member 277 are an actuator 279 and a detent 280. The actuator 279 is arranged to coact with a snap-action switch comprising the contacts SC37*ac*1 (Fig. 12), which switch is mounted, by means of a bracket 281, on the cross member 160. The detent 280 is provided with a hook-shaped portion arranged to coact at certain times with a stud 282 fixed in an arm 283 pivotally mounted on the plate 238 and normally urged counter-clockwise, as viewed in Figs. 11 and 13, by a spring 284. A camming surface 285 (Fig. 11) on the retaining plate 251 is also arranged to coact with the stud 282 at certain times during the operation of the ejecting means.

Figure 12:
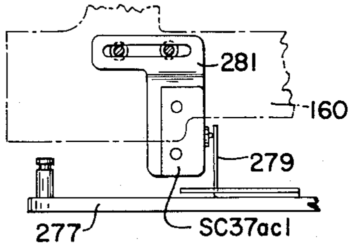
Fig. 12 is a detail view showing the operating mechanism for the non-repeat switch.
Figure 13:
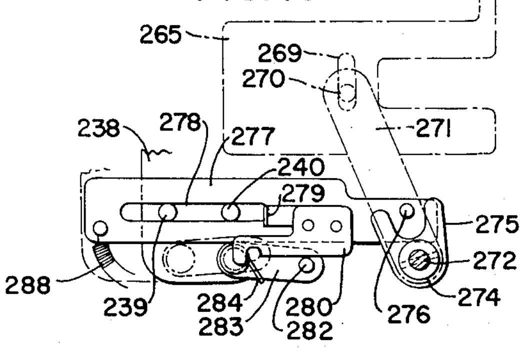
Fig. 13 is a detail view showing the operating mechanism for the tag-ejecting means.

The operating member 277 is shown in Figs. 8 and 13 in its normal position, its movement to the left under the influence of the spring 288, which is connected to said member 277 and to the under side of the cross member 160, being limited by the contact of the actuator 279 with the switch comprising contacts SC37*ac*1 (Fig. 12). Energization of the solenoid L21, as previously described, causes the plate 238 to be shifted to the left, carrying the arm 283 and the stud 282 with it. As the plate 238 reaches the leftmost limit of its movement, as viewed in Figs. 8, 11, and 13, the stud 282 is moved to a position opposite the hook-shaped portion of the detent 280 and is shifted into said hook-shaped portion by the spring 284. This operatively connects the operating member 277 to the plate 238 for unitary movement therewith.

At the conclusion of a reading operation, when the solenoid L21 is deenergized, the plate 238 will be moved to the right by a combination of forces, as has been previously described. Since the operating member 277 is coupled to the plate 238, it will move in unison with said plate to the right, as viewed in Figs. 8 and 13. The stud 276 on the member 277, after some extent of free movement, will contact an inner edge of the bifurcated portion of the arm 275 and will carry said arm clockwise as the plate 238 and the member 277 continue their movement to the right. Since the arm 275 is fixed to the shaft 272, which is in turn fixed to the link 271, said shaft and said link will also move clockwise, as viewed in Figs. 8 and 13. Due to the connection comprising the stud 270 and the slot 269 between the link 271 and the tag-ejecting plate 265, said plate will be shifted to the right, so that the operating surfaces 266 and 267 on said plate strike the corresponding edge of the tag which has been read and eject said tag from its position between the clamping block 160 and the plate 151 into a tag storage receptacle, which will be described subsequently.

During the movement to the right, as viewed in Figs. 8, 11, and 13, of the plate 238 and the operating member 277 following deenergization of the solenoid L21, the stud 282 will gradually be shifted downwardly by the camming surface 285 (Fig. 11) on the retaining plate 251 against the force of the spring 284 and out of the hook-shaped portion of the detent 280 to disconnect the operating member 277 from the plate 238. These two elements will not be disconnected until sufficient movement has taken place to enable the ejecting plate 265 to complete its function of ejecting the tag from its reading position, but will take place before the completion of the rightward movement of the plate 238. Upon disconnection of the member 277 from the plate 238, said member 277 will be returned to the leftward position, in which it is shown in Figs. 8 and 13, under the influence of the spring 288, so that it is properly positioned for the commencement of the next following ejecting operation.

Means which will be described subsequently are provided to prevent operation of the ejecting means in the event that any of the sensing pins of the sensory section have not been retracted from sensing position. This prevents damage which might otherwise occur if an ejecting operation took place when any of the sensing pins were engaged with holes in the tag.

As may be seen in Fig. 14, the solenoid L21 also controls the condition of a first snap-action switch, comprising the contacts L21*ac*1 and L21*bc*1, and a second snap-action switch, comprising the contacts L21*b*2. These switches are secured by means of a bracket 286 to the supporting member 241, and said supporting member is apertured to permit an operating member 289 from the solenoid L21 to extend therethrough and cooperate with an actuator 287 to control the condition of the contacts L21*ac*1, L21*bc*1, and L21*b*2, according to whether the solenoid L21 is energized or deenergized. With the solenoid L21 in the deenergized condition, as shown in Fig. 14, the operating member 289 of said solenoid will not contact the actuator 287, and the contacts L21*bc*1 and L21*b*2 will be closed and the contacts L21*ac*1 will be open. Upon energization of said solenoid, the operating member 289 shifts downwardly, as viewed in Fig. 14, to contact the actuator 287, which in turn operates the switches comprising the contacts L21*ac*1, L21*bc*1, and L21*b*2 to close the contacts L21*ac*1 and simultaneously to open the contacts L21*bc*1 and L21*b*2.

*Tag storage means*

Means are provided for capturing and storing tags which have been inserted into the media reader, read, and ejected from the reading position by the ejecting plate 265. This tag storage means takes the form of a movable receptacle and is generally designated by the reference character 298 (Figs. 14 and 22).

The receptacle 298 comprises an upper plate 299 and a lower plate 300, which are secured together, as by spot welding at 301, to form a receptacle which is open on three sides. The plates 299 and 300 are cut away at 302 and 303, respectively, to facilitate grasping by the fingers of the operator of the tags which have been collected in the receptacle 298. Two fillets 315 extend across the junction of the plates 299 and 300 to prevent tags from becoming stuck between these two plates. Bent-over ears 304 and 305, formed integral with the lower plate 300, form means for mounting the receptacle 298 in a recessed portion 306 of the housing 307 of the media reader. The ears 304 and 305 are apertured to receive a shaft 308 for rotatably mounting the receptacle 298 in the recessed portion 306 of the housing 307. The shaft 308 is journaled at one end in a bore extending part of the way through a bracket 309, secured to the housing 307, and is journaled at the other end in a bore 310 in the housing 307. A clip 311, fitted onto a reduced portion of the shaft 308, retains said shaft against sidewise movement longitudinal of its axis.

Figure 22:
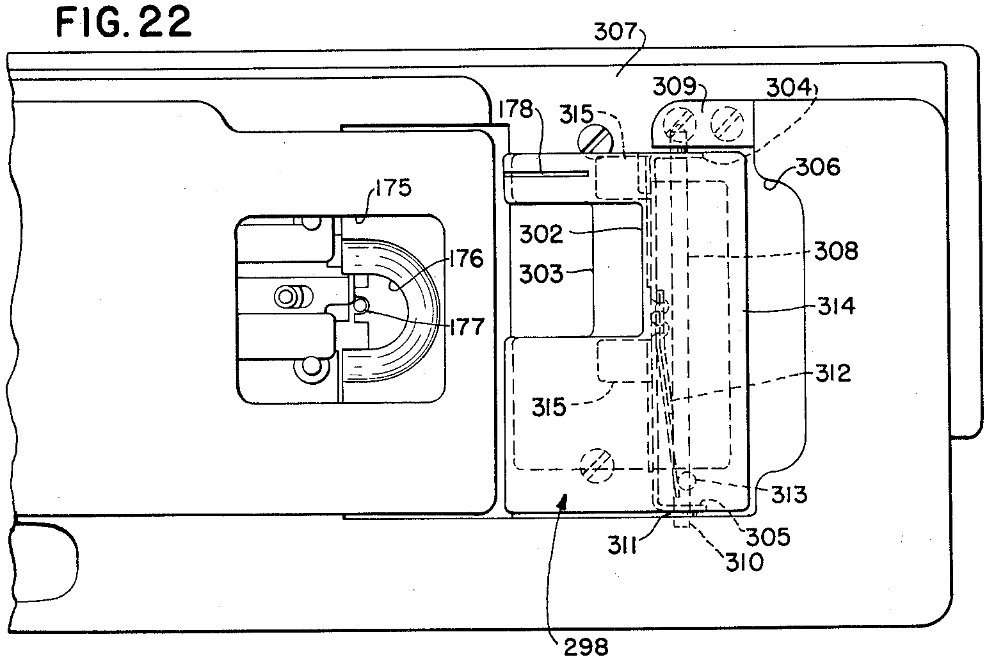
Fig. 22 is a top plan view of a portion of the media reader housing, showing the housing for the tag-receiving and -reading portion of the media reader, and the shiftable tag storage means positioned adjacent the tag-receiving means to capture and store ejected tags.

The receptacle 298 is normally held in the position in which it is shown in Figs. 14 and 22, and in which it is capable of capturing tags ejected from reading position by the ejecting plate 265, by means of a spring 312, secured to the back of the lower plate 300, which spring cooperates with a stud 313, fixed in the housing 307. When a tag is inserted between the block 150 and the plate 151, the operator's hand will shift the receptacle slightly counter-clockwise, against the force of the spring 312, which will return the receptacle 298 to the position in which it is shown in Fig. 14 when the operator's hand is removed. The ends of the plates 299 and 300 adjacent their area of joinder are shaped to form a handle 314, which may be pushed by a finger or thumb of the operator to rotate the receptacle 298 clockwise, as viewed in Fig. 14, about the shaft 308 to bring said receptacle to a position in which the tags accumulated therein may be readily grasped by the operator, through the cut-away portions 302 and 303 in the plates 299 and 300, and removed from said receptacle. Upon release of the handle 314 by the operator, the force of gravity will return the receptacle 298 to the position in which it is shown in Fig. 14. Additional tags ejected after a reading operation will then be captured by the receptacle and stored therein until such time as it is desired once more to rock the receptacle 298 clockwise, as viewed in Fig. 14, and remove the accumulated tags.

SENSORY SECTION

The sensing means operates to read the data from the tag or other record member while it is held stationary in reading position in the media reader by the clamping and alining means previously described. The sensing means in the present embodiment is capable of sensing up to five different types of tags or other record members.

As has been previously stated, sensing means are provided for reading up to twenty-four data characters in a first section of the tag. Each of these data characters may be represented by perforations in any one or more of four positions. Additional sensing means are provided for sensing a five-position media identification area, located below the first section on the tag. Further sensing means, located below the identification area, serve a dual function in performing one or both of two sensing operations during each reading operation on a lower data section comprising six columns of four positions each, located below the media identification area. This lower field provides store identification information in the reading of customer or account number tags and normally provides price data in the reading of merchandise tags, as will be described subsequently.

The sensing means employed in the reading of the twenty-four data characters of the first section will now be described. These sensing means differ in some particulars from the sensing means used in connection with the media identification area and those used in connection with the lower data field, both of which will be described subsequently. Two sets of four sensing pins 325 are shown in Fig. 6. The set of four sensing pins shown to the right is for sensing one of the data characters encoded in the upper row of data characters on the tag, and the set of four sensing pins shown to the left is for sensing one of the data characters in the lower row. These two sets of sensing pins are arranged in equally-spaced relation on a straight line, are of a similar construction, and fan out as partially shown in Figs. 6 and 21 to proper switching positions. Each sensing pin 325 is in the form of a Bowden wire which has its forward end operating in its respective hole 326 (Figs. 5 and 6) in the plate 151, and has its rear end connected to an enlarged contact control rod, such as those designated 327 in Fig. 6. Each of the rods 327 has a tip 328 of non-conducting material, and each rod 327 is supported and guided for longitudinal movement in a cross bar 329, which is secured to the right and left side frames 330 and 331 and to the right and left support frames 334 and 335 (Fig. 21).

Intermediate its ends, each one of the sensing pins 325 (Fig. 6) is mounted for movement through the block 213, which in turn is mounted between and on the cross members 159 and 160, through a sheath 332, and through a further supporting cross bar 333, mounted between the right and left supporting frames 334 and 335, respectively, the sheath 332 having its forward end extending into the block 213 and its rear end extending into the cross bar 333.

Each sensing pin 325 is urged to the left (Fig. 6) by its individual spring, such as the spring 336, which forms a part of the contact means for converting the sensed data into electrical signals by which the recorder can be controlled to duplicate the data on the tag.

The contact means is common to the sensing pins for all twenty-four of the data positions on the tag and is shown most clearly in Figs. 6, 21, 35, and 36. The contact means is mounted between end frames 337 and 338, which are supported on the supporting frames 334 and 335 by means of two cross rods 339 and 340.

Supported between the end frames 337 and 338 are four input buses 341, 342, 343, and 344 (Fig. 6), one for each possible data-representing perforation in a data position, which buses are electrically connected by a strap 345.

As is clear from Fig. 6, one end of each of the springs 336 is connected to its related input bus. One spring is secured to each bus for each data-representing column on the tag; that is, there is a row of twenty-four springs secured to the bus 341, each one of which will urge its related sensing pin to the left, to enable the top row of pins to sense the top row of perforations in the tag. Similarly, twenty-four springs are mounted on each of the three other buses 342, 343, and 344 to urge their related sensing pins to the left.

Mounted to the left, as viewed in Fig. 6, of each row of springs relating to the data character positions, and common thereto, is an output bus, the output buses 346, 347, 348, and 349 being related to the top to bottom hole positions, respectively.

The springs 336 are positioned to engage their related output buses to selectively complete circuits from the common input buses to various ones of the output buses. Hence, the springs serve two functions; that is, to supply the force to move the sensing pins to the left, and also to serve as contacts in the circuits controlled by the sensing means. It may be noted in Figs. 35 and 36 that each of the springs 336 is actually two springs functioning as one for engaging the output buses, so as to insure a good electrical connection between the buses and the springs.

The four output buses 346, 347, 348, and 349 are connected to four terminals in a diode digit encoding board (not shown), which is mounted in the recorder 100. These terminals can be selectively connected to other terminals in the board to select the tape punches to be operated according to the code employed and the data which is read. For a detailed description of the manner in which similar output buses of a media reader may be connected to control the punching operations of a recorder, reference may be had to the United States patent application Serial No. 622,591, cited above.

In the normal, retracted position of the sensing pins 325, their front ends will be slightly below the outer surface of the plate 151, and the tips 328 of the enlarged rods 327, which tips are notched to receive the springs 336, will hold the springs out of engagement with their related output buses.

As each column of sensing pins is released to sense the tag, those sensing pins which are in positions where there are holes in the tag will be allowed to move to the left to allow their related springs to engage the output buses and complete circuits from the input buses to the output buses, while those sensing pins which are in positions where there are no perforations will be prevented from moving to the left and will keep their related springs from engaging the output buses.

The movement of the sensing pins from their retracted position to their sensing position is controlled by a series of arms 350 (Figs. 6, 21, and 24), one for each of the twenty-four data-representing positions. The movement of the arms is controlled by a disabling bar 351, which is common to all of the arms, and by individual cams 352 of a cam line. The arms 350 are pivotally mounted on a cross rod 353 and are guided laterally by a comb plate 354 secured to two blocks 355 and 356, said blocks being mounted on the side frames 331 and 330, respectively. The arms 350 are urged counter-clockwise, as viewed in Fig. 6, by individual springs 357, which are connected to the arms 350 and to upwardly-extending ears 358 on the comb plate 354.

Each arm 350 is formed with a cam-engaging projection 359 and with an upwardly-extending finger 360, which engages the enlarged rods 327 of the four sensing pins for its related data-representing position. The finger 360 of the arm 350 extends along one side of the sensing pins of the column, as seen most clearly in Figs. 6 and 21. Each of the arms 350 is also provided with a surface 361 for engagement by the disabling bar 351 to maintain the sensing pins 325 in their right-hand position, except during the reading of a tag or other record member.

The disabling bar 351 extends the length of the cam line and is provided with trunnions 362 and 363 at opposite ends thereof, which trunnions bear in extensions 364 and 365 of the blocks 355 and 356 (Figs. 6 and 23), respectively, secured to the frames 331 and 330. Secured on the trunnion 363, adjacent the right-hand end of the disabling bar 351, is an arm 366 (Fig. 19), which is urged clockwise by the spring 219, and which is pivotally connected to the link 220.

Figures 19, 20:
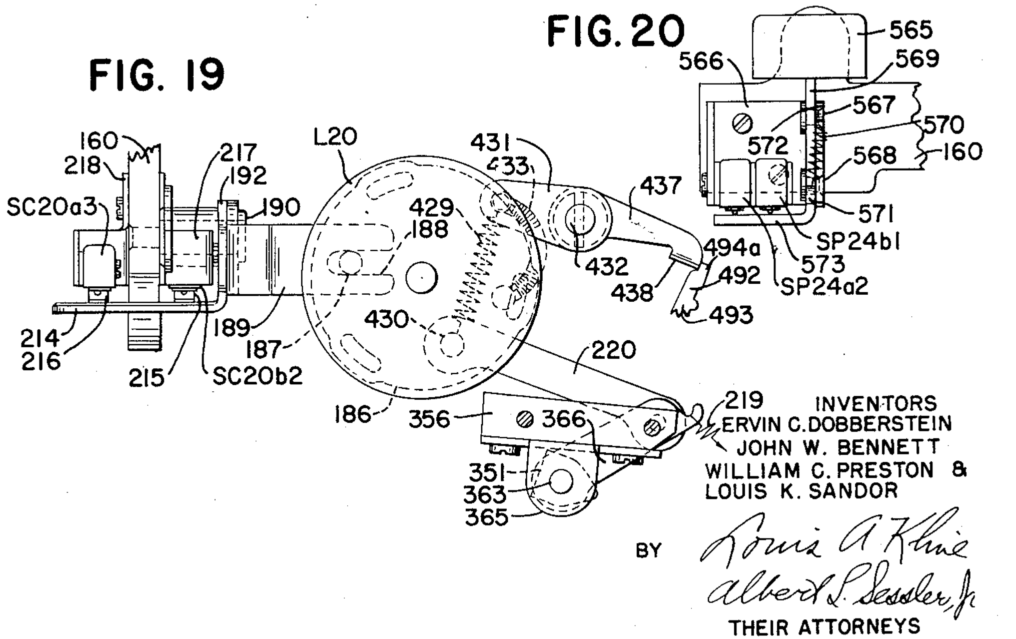
Fig. 19 is a detail view showing part of the operating mechanism controlled by the alining pin solenoid.
Fig. 20 is a detail view of certain switches controlled by a manually-operated key.

It will be recalled that energization of the solenoid at the beginning of a reading operation causes clockwise rotation of the armature 186, as viewed in Fig. 19. This movement is transmitted by the link 220 and the arm 366 to the disabling bar 351, to rock said bar counter-clockwise against the force of the spring 219, thereby freeing the arms 350 (Fig. 6) to the control of the cams 352 on the cam line.

At the completion of a reading operation, the solenoid L20 is deenergized, and the disabling bar 351 is then rocked clockwise by the spring 219 (Fig. 19) to the position in which it is shown in the figures of the drawings, in which it is effective to block movement to the left of any of the cam arms. This blocking function is essential, since, as will be described subsequently, the resetting operation of the cam line normally follows completion of the reading of a tag or other record member. As the cam line moves through the completion of its revolution back to "home" position, in preparation for the next reading operation, certain of the arms would be permitted by their corresponding cams to move to the left, if not otherwise blocked against such movement, and this could cause erroneous reading and recording to take place. However, this is prevented by the disabling bar 351, which retains the arms 350, as well as the other cam arms associated with the cam line, against leftward movement, as has been previously described.

The cam line (Figs. 6, 21, and 24 to 32 inclusive) contains thirty-two cams, including twenty-four cams 352 for controlling the operation of the sensing means for the data-representing positions, one cam 367 (Fig. 24) for controlling signal means responsive to operation of the sensing means for the media identification section, one cam 368 (Figs. 18 and 24) for controlling the operation of a validation means, and six cams 369 to 374 inclusive for controlling the operation of the sensing means for the combined price field and store identification section. Mounted on the same shaft 375 as the cams described above, for rotation therewith, are ten rotary switches, which cooperate with corresponding wipers for providing additional controls for the media reader. The shaft 375 is mounted in the right side frame 330 (Figs. 21 and 24) and in a plate 376 (Figs. 21 and 24) removably secured to the left side frame 331. The removable plate 376 is provided to permit ready removal of the cam line for inspection or adjustment.

The driving motor 382 (Figs. 6 and 23) operates whenever the media reader is operable, and, through a shaft 383 (Fig. 6), a clutch 384 (Fig. 23), and gears 385 to 392 inclusive (Fig. 23), drives the cam line through one thirty-sixth of a clockwise revolution (Fig. 23) each time the clutch 384, which is a single-revolution clutch, is tripped. Hence the clutch 384 will cycle thirty-six times for each complete operation of the media reader, each complete operation normally including a reading operation and a reset operation. Said clutch is tripped by a pair of clutch solenoids L22A and L22B, which, when energized, remove a blocking member 393 from in front of a tooth 394 on the clutch to allow the clutch to make a single revolution. Movement of the blocking member 393 by energization of the solenoids L22A and L22B also causes the end of said member to coact with a pin 395, fixed in the end of a switch blade 396, to close contacts L22*a*1 for a purpose which will be disclosed in the description of the circuit diagram. The circuits for energizing the solenoids L22A and L22B will also be fully explained when the circuit diagram of Figs. 44A to 44C inclusive is described.

Secured to the clutch 384 for rotation therewith are two plates 397 and 398 (Fig. 23), of laminated plastic material, each plate having a strip of conducting material extending part of the way around the periphery of said plate on one side. Wipers 399, mounted on the media reader framework, cooperate with a conducting strip on the plate 397 to form the contacts SC35*a*1, which are closed from five degrees to one hundred and thirty degrees of revolution of the clutch, and wipers 400, mounted on the media reader framework, cooperate with a conducting strip on the plate 398 to form the contacts SC35*b*2, which are closed from two hundred and fifty degrees to ten degrees of revolution of the clutch. The manner in which these contacts function in the operation of the recording system will be explained fully when the circuit diagram is described.

Each of the cams 352 on the cam line is formed with a notch 401 (Fig. 6), of such a length as to be opposite the projection 359 on the related arm 350 in only one of the positions of the cam line, and said cams are so proportioned that, while the projection 359 is riding on the periphery of the cam, the arm will be in position to maintain the sensing pins ineffective, but, when the notch 401 is opposite the projection 359, the arm can rock counter-clockwise to move the finger 360 to the left to free the sensing pins for movement to the left to sense the perforations of its related column or data position, and close the required ones of the electrical contacts made up by the springs 336 and the input and output buses.

Figure 5:
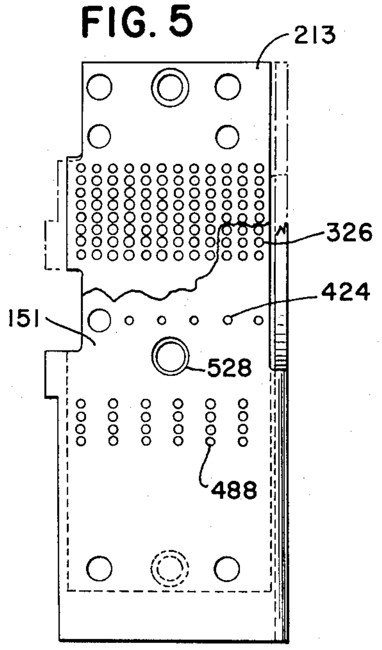
Fig. 5 is a top plan view, partially broken away to show various parts more clearly, of the plate upon which record members are positioned to be read by the media reader, and the block which supports said plates, and also showing the apertures in said plate and said block for the various sensing wires, alining pins, and validating means.

The notches 401 on the cams 352 are arranged spirally about the shaft 375, so that, in different positions of the cam line, different ones of the arms 350 will be allowed to free the corresponding sensing pins. In the instant embodiment, when the clutch 384 (Fig. 23) cycles for the first time in the tag-reading operation, no reading of the tags takes place, since this is simply a preparatory operation of the media reader to provide time for the various components of the media reader to assume their correct positions for the reading of the tag. When the clutch cycles a second time, a symbol representing the position of the perforation in the media identification area of the tag may be recorded. This area has a total of five channels, and the sensing means for it will be described subsequently. When the clutch cycles a third time, the upper four channels of the first column at the left of the first data section of the tag may be sensed. This is the first data-representing position, having four channels, and, as the clutch cycles further in the reading operation, the subsequent data-representing positions will be read one after another from left to right. The twelve upper data-representing positions of the twenty-four-position data section, as seen in Fig. 5, have their corresponding sensing wires arranged to be read prior to the second, or lower, set of twelve data-representing positions in the twenty-four-position data area.

While in the instant embodiment the notches 401 are so arranged about the shaft 375 that the tag is read sequentially in the twenty-four-position data-representing area, from left to right through the first twelve positions, and subsequently from left to right through the second twelve positions, it is obvious that, by proper location of the notches on the various cams, the various data positions in this data-representing area or section could be read in some other sequence if desired.

The media reader can be controlled to read the twenty-four data characters of the first section alone or together with the six characters of the store identification and price field section, or certain combinations of these two sections, as will be described subsequently, in addition to performing an initial sensing operation on the media identification area and the combined store identification and price field area. This control is effected by the various cams on the media reader cam line and by "end of tag" contacts. In the present embodiment, it is contemplated that there will be five different sets of "end-of-tag" contacts, one for each of the clerk and customer tags and one each for three different digit lengths of merchandise tags. The "end-of-tag" contacts SC21*b*1, SC22*b*1, SC30*b*1, SC31*b*1, and SC32*b*1, respectively, are formed by the five rotary switch plates 402, 403, 404, 405, and 406 (Figs. 24 and 31), mounted on the shaft 375, in cooperation with corresponding sets of wipers 407. Each of the "end-of-tag" switch plates comprises a laminated plastic plate 408, having inlaid on both sides thereof a strip 409 of conducting material. The strips of conducting material on each side are connected by a bridge, also of conducting material, inlaid on the periphery of the plastic plate. One of the two wipers 407 cooperating with each of the plates serves as an input, while the other serves as an output. It will be seen that, so long as the conducting strip on the plate is in contacting relation with the wipers, current will pass from the input wiper to the output wiper. However, when the plate is rotated to the point where the non-conducting plastic material contacts one or both of the two wipers, the electrical connection therebetween will be broken.

An additional rotary switch plate 410 (Figs. 24 and 32) is mounted on the shaft 375 on the right-hand side of the cam line, as viewed in Fig. 24, and cooperates with a corresponding set of wipers 411. The plate 410 and the cooperating wipers 411 form the contacts SC23*a*5, which are utilized in the control of reading of data from the combined store identification and price field area, as will be described subsequently.

Four additional rotary switch plates are fixed on the shaft 375 to the left of the cam line (Fig. 24). Two of these plates, 412 and 413 (Figs. 24 and 30), cooperate with wipers 414 to provide contacts SC33*a*3 and SC33*a*4, which contacts are open in "home" and No. 1 positions of the media reader cam line, but which are closed in all other positions of said cam line. The construction of these "open in home" contacts is identical with the construction of the "end-of-tag" contacts, previously described, with the exception that the plates 412 and 413 are designed to remain fixed in relation to the media reader cam line, while the five "end-of-tag" plates are designed to be adjustable to different positions about the media reader cam line, as is the price field control switch plate 410.

A third plate 415 (Figs. 24 and 29) is fixed in relation to the media reader cam line and is designed to cooperate with two sets of wipers 416 and 417 to provide a set of contacts SC33*b*1, which are closed in "home" and No. 1 positions of the media reader cam line, but which are open in all other positions of said cam line. The construction of this plate is similar to that of the plates previously described, in that the plate comprises a plastic laminated member having inlaid thereon two metal strips 418 (Fig. 29) on opposite sides of the plate. However, in this instance, the metal conducting strips are not connected across the periphery of the plate but are electrically separated. One of the wipers 416 on one side of the plate acts as an input, while the other wiper 417 on the same side of the plate acts as an output in this case. It will therefore be seen that the contacts SC33*b*1 will be closed only when both of the wipers 416 and 417 are in contact with the metal strip 418 of the plate 415 during a certain portion of the rotation of said plate.

A fourth plate 419 (Figs. 24 and 28), on the left side of the media reader cam line, is similar in construction to the plate 415 and is designed to provide special symbol contacts SC34*a*1 in cooperation with the wipers 420 and 421. The plate 419, unlike the plate 415, which is fixed with respect to the media reader cam line, is adjustable about the cam line, so that its relative positioning with respect to the position of the media reader cam line may be adjusted as desired.

The manner in which all of the rotary switch plates and the cams of the cam line are mounted on the shaft 375 (Figs. 6 and 24) is the same as that disclosed in the previously-cited United States patent application, Serial No. 622,591, and therefore will not be described in detail herein. For a detailed description of this mounting means, reference may be had to the above-cited application.

The sensing means employed in the reading of the media identification area, which is normally a horizontal area extending transversely of the tags as viewed in Figs. 2, 3, and 4, is positioned at the left side of the sensory section, as viewed in Figs. 21, 35, and 36. Each of five linearly arranged sensing pins 422, composing the identification area sensing means, is mounted for longitudinal movement in a sheath 423, extending between the block 213 and the support bar 333, in the same manner as the sensing pins for reading the twenty-four data-representing positions on the tag or record member. Each of the pins 422 has its forward end operating in its respective hole 424 in the plate 151 (Figs. 5 and 6). The rear end of each sensing pin 422 is connected to an enlarged control rod 425 (Fig. 33A), having a tip 426 of non-conducting material, each of the rods 425 being supported and guided for longitudinal movement in the cross bar 329. Each sensing pin 422 of the identification area is urged to the left, as viewed in Fig. 6, by a spring 427 (Figs. 33A and 35), which presses against the tip 426 at the end of the rod 425 connected to the pin 422. The spring 427 also forms part of the contact means for converting the sensed data into electrical signals for controlling the recording system according to the type of tag inserted into the media reader.

Figure 17:
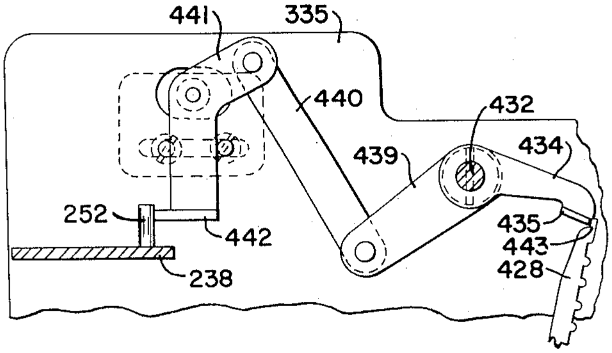
Fig. 17 is a detail view showing the interlock between the tag-clamping and tag-ejecting operating mechanism and the mechanism for controlling the functioning of certain of the sensing pins.

After the disabling bar 351 has been moved to its non-blocking position by energization of the solenoid L20, the movement of the sensing pins 422 of the identification section from their retracted position to their sensing position is controlled by an arm 428 (Figs. 17 and 33A), identical in shape with the cam arms 350, pivotally mounted on the cross rod 353, and urged counter-clockwise, as viewed in Fig. 17, by a spring (not shown) connected between said arm and the comb plate 354.

The arm 428 is controlled by mechanism which is in turn controlled by the solenoid L20 (Fig. 19). A spring 429 is connected at one end to a stud 430, which also serves to pivotally connect the link 220 to the armature 186. At its other end, said spring is connected to an arm 431 (Figs. 19 and 21), secured to a shaft 432, journaled in the frames 334 and 335. The arm 431 is normally urged clockwise, as viewed in Fig. 19, by a constant-force spring 433, connected between said arm and the right support frame 334. Also secured to the shaft 432 is an arm 434 (Fig. 21), having a bent-over ear 435, arranged to coact with a tip 443 at the upper end of the arm 428 (Fig. 17) to retain said arm in its retracted position against the force of the spring urging it to the left, as viewed in Fig. 17. In addition, two arms 436 and 437, yoked together by a bail 438 (Figs.

19 and 21), are secured to the shaft 432 for unitary movement therewith. The bail 438 is arranged to coact with tips on the cam arms which control the sensing pins for the combined store identification and price field section, as will be described subsequently. Also secured to the shaft 432 is an arm 439 (Fig. 17), which is connected by means of a link 440 to a bell crank 441, pivotally mounted on the frame 335. A bent-over ear 442 (Figs. 11 and 17) on the bell crank 441 is so arranged that, when the solenoid L21 is in its unoperated condition, the stud 252 on the plate 238 is positioned in blocking relation to said ear.

As may be seen in Fig. 19, when the solenoid L20 is energized, thus rotating its armature 186 clockwise, the arm 431 will be urged counter-clockwise by the action of the spring 429. However, the arm 431, the shaft 432, and the arms 434, 436, 437, and 439, all of which are fixed together for unitary movement, will be initially retained against counter-clockwise movement, as viewed in Figs. 17 and 19, through the link 440 and the bell crank 441, by blocking of the ear 442 by the stud 252. Energization of the solenoid L21 will normally take place following energization of the solenoid L20 and will cause the plate 238 and the stud 252 to be shifted to the left, as viewed in Fig. 11, thus moving said stud out of blocking relation to the ear 442 and freeing the arm 431, the shaft 432, and the arms 434, 436, 437, and 439 for counter-clockwise movement by the spring 429. The spring 433 will oppose this action but is not strong enough to prevent it. The ear 435 on the arm 434 and the bail 438 on the arms 436 and 437 are both lifted out of engagement with the tips at the upper ends of the cam arms which control the sensing pins for the media identification section and the combined store identification and price field section to permit said pins to move upwardly, as viewed in Fig. 6, through corresponding holes in the plate 151 to sense for perforations in the tag which has been inserted into the media reader for reading.

At the end of a tag-reading operation, the solenoid L20 (Fig. 19) is deenergized, which permits the arm 431, together with the shaft 432 and the arms 434, 436, and 437, to be shifted clockwise, as seen in Fig. 19, by the spring 433. This returns the arms 434, 436, and 437 to their normal positions. Since the disabling bar 351 will simultaneously shift all of the cam arms back to their retracted positions, the ear 435 and the bail 438 are once more effective to retain the cam arms for the media identification section and the combination store identification and price field section in retracted position.

The above-described mechanism also provides a safety means which prevents ejection of a tag in the event that all of the sensing pins for any of the reading sections have not been properly and fully retracted. In the event that one of the sensing pins has not been fully retracted, its corresponding cam arm cannot be moved fully to the right, to its retracted position, as seen in Fig. 6, by the disabling bar 351. The disabling bar is thus prevented from attaining its full extent of restoring movement and thus is ineffective to fully restore the cam arms for the media identification section and the combination store identification and price field section to their fully-retracted position. The arms on the shaft 432 will therefore be prevented from completing a full clockwise movement, since the ear 435 and the bail 438 will strike the top surface of the corresponding cam arms, rather than moving into coacting relationship with the tips on said arms.

In the event that the arm 439 (Fig. 17) is prevented from partaking of its full clockwise movement subsequent to deenergization of the solenoid L20, as has been previously described, the bent-over ear 442 on the bell crank 441 will be in a position to the left of that in which it is shown in Fig. 17, and, in such leftward position, it will be effective to block return movement to the right of the stud 252 and the plate 238 (Fig. 11) due to engagement of the hooked end portion, which may be seen in Figs. 11 and 21, of the ear 442 with the stud 252.

Since operation of the ejecting plate 265 (Figs. 8 and 13) is caused by movement to the right of the plate 238, prevention of such movement will prevent operation of the ejecting means. This interlock feature between the sensing means and the ejecting means prevents possible damage to the machine, since, if the ejecting means were permitted to operate even though all of the sensing pins had not been brought fully back to their retracted position, the extended sensing pins would very probably be damaged.

Supported and guided for longitudinal movement in the cross bar 329 adjacent each of the rods 425 is a companion rod 450 (Figs. 33 and 33A), having a tip 451, of non-conducting material. Each of the rods 450 is urged to the left, as viewed in Fig. 33, by the cooperation of a spring 452 with the tip 451 at the end of the rod 450. The spring 452 also forms a part of the contact means which may be used for the recording of a media identification symbol or for various other purposes, as will be described subsequently.

Each of the rods 450 is jointly controlled by its companion rod 425 and by a cam arm 453 (Figs. 24 and 33A), identical in shape with the cam arm 428 and cooperating with the cam 367 on the shaft 375 (Fig. 24). A cutout portion 454 (Fig. 33A) is provided on each of the rods 425 and cooperates with a cutout portion 455 on the corresponding one of the rods 450. The rods 425 and 450 are so positioned in the cross bar 329 that communication between the cutout portions 454 and 455 is furnished by a bore 456, in which rides a ball 457, of a diameter larger than the length of the bore. An extension 458 of the bore 456 facilitates placement of the ball 457 in the bore 456 during assembly.

It will be seen that, so long as the rod 425 remains in the retracted position in which it is shown in Fig. 33A, its cutout portion 454 is not directly opposite the bore 456, and the ball 457 will, therefore, protrude from said bore into the cutout portion 455 of the rod 450 and retain said rod against movement to the left, as viewed in Fig. 33A.

Full sensing movement to the left, as viewed in Fig. 33A, of any of the rods 425 whose sensing pin 422 passes through a perforation in the media identification section of the tag being read, positions the cut-out portion 454 of the rod 425 directly opposite the bore 456 in the bar 329. Then, at a predetermined time in the tag-reading operation, when the arm 453 is permitted by its cam 367 to move to the left, as viewed in Fig. 33A, the rod 450 will be shifted to the left by its spring 452 (Fig. 33). With the cut-out portion 454 directly opposite the bore 456, the ball 457 does not retain the rod 450 against movement, since said ball may be cammed by a surface on the cut-out portion 455 out of its blocking position and into the space provided by the cut-out portion 454. The rod 450 is thus permitted to move to the left, as viewed in Fig. 33A, under the influence of its spring 452. The arm 453 and the rod 450 are subsequently caused to return to the position in which they are shown in Fig. 33A by continued rotation of the cam 367, which controls the arm 453.

The contact means for the media identification section of the sensing means is shown in Figs. 21, 33, 35, and 36 and is mounted in the same framework as the contact means for the previously-described data section but is electrically isolated therefrom. Those portions of the input buses 341 to 344 inclusive, and the output buses 346 to 349 inclusive, which lie opposite the rods 425 and 450 are reduced in cross-sectional areas, as shown in Figs. 33, 35, and 36. Additional members 459 and 460, mounted in the left end frame 338, are provided for the media identification section, which, it will be recalled, has five sensing pins rather than four, as is the case with the previously-described data section. Positioned on the reduced portion of each of the output buses 346 to 349 inclusive and the member 460 is a sleeve 461, of insulating material, having a lip 462 at its end adjacent the shoulder on each of the input buses between the reduced portion and the non-reduced portion. A first common plate 463 is mounted on the sleeves 461 of the buses 346 and 347 and the member 460, and a second common plate 464 is mounted on the sleeves 461 of the two buses 348 and 349 adjacent the lip 462. A collar 465 is mounted on each of the sleeves 461 next to, and in electrical contact with, the plates 463 and 464. Adjacent the collar 465 on each of the sleeves 461 are placed washers 466 to electrically isolate the collars 465 from a third common plate 467, mounted on the sleeves of the buses 460, 346, and 347, and to isolate the collars 465 associated with the buses 348 and 349 from two plates 468 and 469, mounted on the sleeves for the buses 348 and 349, respectively. On the opposite side of the plates 467, 468, and 469, and in electrical contact therewith, are additional collars 470, mounted on each of the sleeves 461. Adjacent the collars 470 on each of the sleeves 461 are insulating washers 471, which insulate the collars 470 from spacing collars 472, extending between the washers 471 and the left end frame 338. The common plates 463 and 464 are electrically connected together to form an input bus for the collars 465. The plates 467, 468, and 469 are not electrically connected together but have separate inputs.

Positioned on the reduced portion of each of the buses 341 to 344 inclusive and the member 459 is a sleeve 480 (Figs. 33 and 35), of insulating material. The springs 427 and 452 for each of the five sensing rods 425 and their companion rods 450, respectively, are mounted on the sleeves 480 and are spaced apart by insulating washers 481, one of which is positioned on each sleeve 480 between two of the springs 427 and 452, another of which is positioned at the end of the sleeve adjacent the frame 338, and a third of which is positioned on the end of the sleeve 480 away from the frame 338.

Each of the springs 427 and 452 is provided at one end with a hook formation for engagement with a corresponding slot in the insulating tips 426 and 451 attached to each of the rods 425 and 450. The central portions of the springs 427 and 452 are coiled about the sleeves 480, and the other ends of said springs extend through apertures 482 (Figs. 21 and 33) in laminated plates 483 and 484, and are bent to form output terminals 485 for connection to the recording system circuit, for control of the recorder in the manner fully described in the previously-mentioned United States patent application Serial No. 622,591.

In the normal, retracted position of the sensing pins of the media identification section, the corresponding rods 425 and 450 will hold the springs 427 and 452, respectively, out of engagement with the collars 470 and 465. As the sensing pins of the identification section are released to sense the tag, the sensing pin which is in a position where there is a hole in the tag will be allowed to move to the left, as viewed in Fig. 33A, to allow its corresponding spring 427 to engage its collar 470, connected to one of the input plates 467, 468, or 469, and complete a circuit to the output terminal 485 on said spring. The companion rod 450 to the selected rod 425 will move leftward, as viewed in Fig. 33*A*, at a time determined by the setting of the cam 367, which controls the arm 453, which in turn controls the movement of the rod 450. This will allow the corresponding spring 452 (Figs. 35 and 36) to engage the collar 465 connected to the input bus 463 or 464 and complete a circuit to the output terminal 485 on the spring 452.

The rods 425 and 450 controlled by sensing pins which are in positions where there are no perforations will be prevented from moving to the left and will keep their related springs from engaging their corresponding collars.

The sensing means employed in the reading of the combination store identification and price field section is positioned at the right side of the sensory section, as viewed in Fig. 21, and comprises sensing means for reading six columns, each containing four channels. In each column, each of four sensing pins 486 (Fig. 6) is mounted for movement in a sheath 487 extending between the block 213 and the supporting bar 333 in the same manner as the sensing pins for reading the first data section and the identification section. The forward end of each sensing pin 386 operates in its respective hole 488 (Fig. 5), and the rear end of each sensing pin 486 is connected to an enlarged control rod 489 (Fig. 34), having a tip 490 of non-conducting material, each of the rods 489 being guided and supported for longitudinal movement in the cross bar 329. Each sensing pin 486 of the store identification and price field section is urged to the left by a spring 491 (Fig. 34), which presses against the tip 490 at the end of the rod 489 connected to the pin 486. The spring 491 also forms part of the contact means for converting the sensed data into electrical signals representing price data in one instance, and forms part of a store identification checking circuit in another instance.

The movement of the sensing pins 486 from their retracted position to their sensing position is controlled by a series of arms 492 (Figs. 19, 21, and 24), one for each of the six columns in this section. The movement of these arms is controlled by the disabling bar 351 (Fig. 6), by the bail 438 on the arms 436 and 437 (Fig. 21), and by the individual cams 369 to 374 (Figs. 24, 26, and 27) on the cam line. The arms 492 are pivotally mounted on the cross rod 353 and are guided laterally by the comb plate 354. Said arms, like the other cam arms in the sensory section, are urged from retracted position toward the sensing position by individual springs similar to the springs 357 for the arms 350, shown in Fig. 6.

Each of the arms 492 is formed with a cam-engaging projection (not shown), which is similar to the projection 359 on the arm 350, shown in Fig. 6, and the arms 492 are also formed with upwardly-extending fingers 493 (Fig. 19), which engage the enlarged rods 489 of the four sensing pins for the related column. In addition, each of the arms 492 is provided with an upwardly-extending tip 494*a* (Fig. 19) at its upper end, for engagement with the bail 438, which, it will be recalled, is mounted on the arms 436 and 437.

It will be recalled that energization of the solenoid L20 at the beginning of a reading operation causes counter-clockwise movement of the disabling bar 351, as viewed in Fig. 19. It will further be recalled that energization of the solenoid L20 is also effective to cause counter-clockwise movement, as viewed in Fig. 19, of the arms 436 and 437, bearing the bail 438, as soon as the solenoid L21 has been energized. Counter-clockwise movement of the disabling bar 351 and the bail 438 frees the cam arms 492 of the combination store identification and price field section to the control of the cams 369 to 374 inclusive (Figs. 24, 26, and 27) on the cam line.

Figure 27:
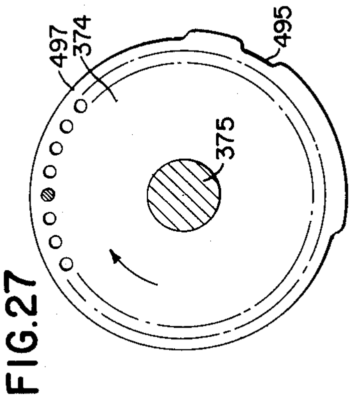
Figure 26:
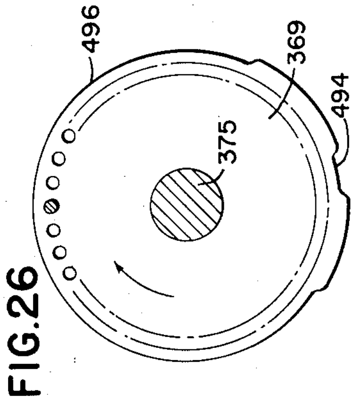
Figure 25:
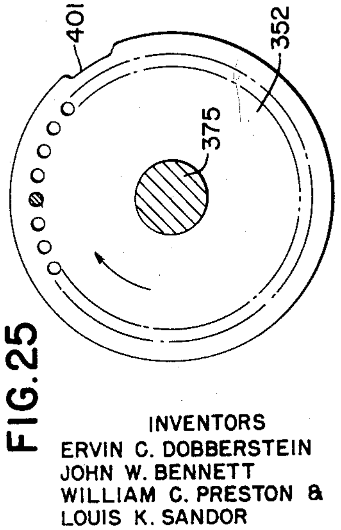
Figure 28:
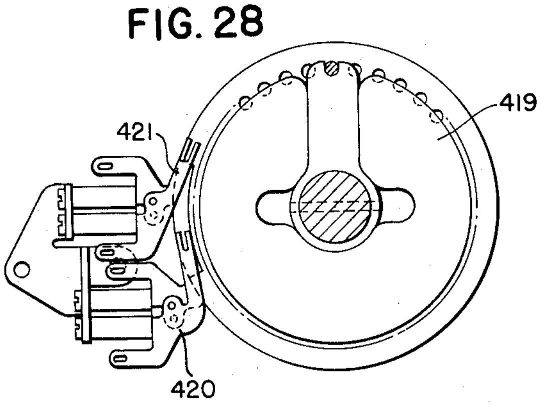
Figure 29:
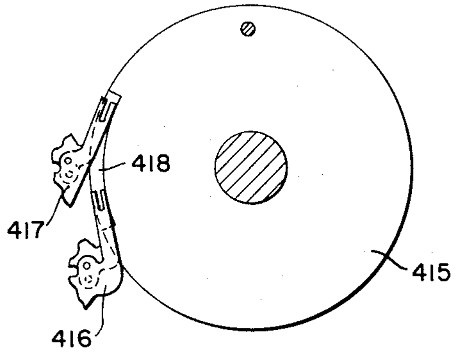
Figure 30:
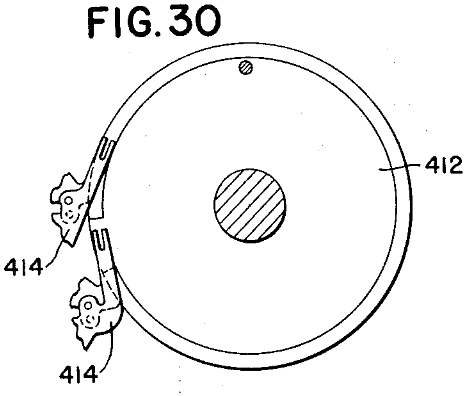
Figure 31:
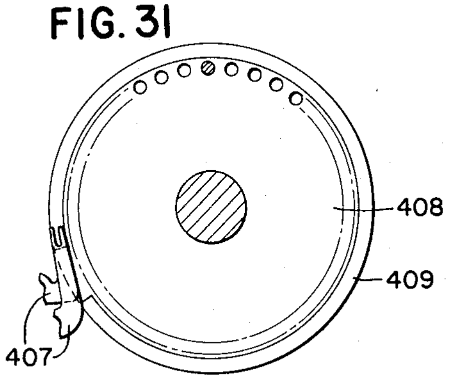
Figure 32:
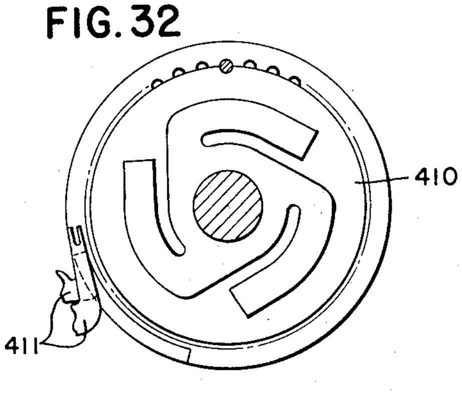

The cam 369 and the cam 374 of the combination store identification and price field section are shown in Figs. 26 and 27, respectively. The cams 370 and 371 are identical in shape to the cam 369, and the cams 372 and 373 are identical in shape to the cam 374. It will be noted that these cams are somewhat similar to the cams 352 (Fig. 25) of the first data section and have notches 494 and 495, respectively, similar to the notches 401 of the cams 352, but are formed with additional dwell portions 496 and 497 along a major part of their peripheries. The cams 369 to 374 are so arranged on the cam shaft 375 that each is offset ten degrees with respect to the next following cam, their notches 494 and 495 thus defining a spiral configuration. In addition, their arrangement on the cam line must be such that dwell portions 496 and 497 of all of the cams 369 to 374 are positioned opposite the cam-following projections on their corresponding cam arms 492 when the cam line is in "home" position, for reasons which will be made clear subsequently. With the above limitations, the cams 369 to 374 inclusive may be shifted as a group on the cam line, so that reading of the price field may take place following reading of a predetermined number, which may be all or less than all of the twenty-four data character positions of the first data section. Configuration of the cams 369 to 374 is necessarily such that the price field will be read last in the serial operation of the media reader, and that no segment of the first data section may be read subsequently to the reading of the price field in a reading operation. In the present description, it will be assumed that the cams 369 to 374 inclusive have been so arranged on the cam line that reading of the price field follows reading of all twenty-four positions of the first data section.

Since the cams 369 to 374 inclusive all have dwell portions positioned opposite the cam-following projections on the cam arms 492 in "home" position, at the time said cam arms are freed to the control of said cams, the cam arms 492 will be urged forward by their respective springs to permit the sensing pins 486 to sense for perforations in the tag. This sensing operation is performed simultaneously with the sensing operation performed by the media identification section sensing pins 422.

Subsequently, as the cam line rotates step by step in a tag-reading operation, the cams 369 to 374 inclusive will be rotated clockwise correspondingly, as viewed in Figs. 26 and 27. This movement will eventually bring high portions on the cams 369 to 374 inclusive into contact with the cam-following projections on the arms 492. Said arms are thereby shifted to a retracted position and carry their corresponding sensing pins 486 into retracted position. The design of the cams 369 to 374 inclusive is such that, after all of the arms 492 have been shifted to their retracted position, the notch 494 on the cam 369 will be presented opposite the cam-following projection on the corresponding arm 492 and will permit said arm once more to move forward into operating position, thus releasing its sensing pins 486 for sensing action. As has been stated, the notches 494 and 495 of all of the cams 369 to 374 inclusive are arranged in spiral configuration, so that, as the cam line continues to rotate, the arms 492 corresponding to said cams will one after another be permitted to come forward and then will be retracted by their successive cams to cause a second complete sensing operation of the combination store identification and price field section to take place during a merchandise-tag-reading operation of the media reader. It will be noted that, in the first of these two sensing operations during the reading of a merchandise tag, all of the sensing pins 486 are released simultaneously for sensing, while in the second operation the sensing pins 486 are released column by column in a serial manner. The second sensing operation of the combination store identification and price field section does not take place during the reading of a clerk or customer tag, since in these operations the end-of-tag contacts will cause conclusion of the reading operation and initiation of a reset operation immediately following the completion of the reading of the desired information in the first data section. Similarly, the second sensing operation of the combination store identification and price field section may not take place during the reading of some merchandise tags, depending upon their predetermined digit length. In the above cases, the cam line will complete its full rotation back to "home" position during a reset operation, but the disabling bar 351 will retain the cam arms 492 against release, thus preventing sensing movement of the pins 486, as has been described previously.

Means are provided in the media-reader-operating circuit, which will be subsequently described in detail, to cause the first of the above sensing operations to be effective during the reading of a customer tag in the registering and recording of a transaction, and to cause the second of the above sensing operations to be effective during the reading of a merchandise tag in the registering and recording of a transaction.

The contact means for the combination store identification and price field section of the sensing means is shown in Figs. 21, 34, and 36 and is mounted in the same framework as the contact means for the media identification section and the first data section, but is electrically isolated therefrom. Those portions of the input buses 341 to 344 inclusive which lie opposite the rods 489 for this section are reduced in cross-sectional area, as shown in Figs. 34 and 35. Positioned on the reduced portion of each of the input buses 341 to 344 are sleeves 500, of insulating material. The springs 491 for corresponding ones of the rods 489 are mounted on the sleeves 500 and are separated by washers 501, of insulating material.

As may be seen in Figs. 34 and 36, the output buses 347 and 349 extend completely across the framework of the sensory section and are secured in the right end frame 337. The output buses 346 and 348, on the other hand, terminate short of the end frame 337 and are connected thereto by rods 502 and 503, of reduced cross-section. Positioned on each of the rods 502 and 503 is a sleeve 504, of insulating material, which extends between the ends of the buses 346 and 347 and the right end frame 337. A series of output terminal plates 505 is mounted on the sleeve 504 for the rod 502, while a similar series of output terminal plates 506 is mounted on the sleeve 504 for the rod 503. A total of seven such plates 505 and a total of seven such plates 506 are provided on the respective rods 502 and 503. As may be seen in Fig. 36, the left endmost one of the plates 505 is positioned in electrical contact with the output bus 346. Similarly, the left endmost one of the plates 506 is positioned in electrical contact with the output bus 348. Each one of the remaining six plates 505 and six plates 506 is positioned adjacent to, and in electrical contact with, one side of a collar 507, mounted on the sleeves 504 for the rods 502 and 503. The collars 507 are electrically isolated at their other side from adjacent plates 505 and 506 by means of washers 508, of insulating material. A spacing member 509 retains each of the above-described assemblies in properly-spaced relationship and spaced from the right end frame 337. The plates 505 and 506 are retained against rotational movement about the sleeves 504 by means of rods 510 and 511, secured in the right end frame 337 and extending through holes in the plates 505 and 506. An insulating sleeve 512 and spacing collars 513 are provided on each of the rods 510 and 511 to retain the plates 505 and 506 in proper spaced-apart electrically-isolated relationship.

The protruding ends of the plates 505 and 506 connected to the collars 507 for the six columns of this section furnish output terminals for the switching contacts, while the ends of the plates 505 and 506 connected to the buses 346 and 348 furnish means to tie in desired ones of the other plates 505 and 506, and their corresponding contacts, to the output buses 346 and 348. Normally, all but one of the plates associated with one of the buses 346 and 348 will be tied together, and all of the plates associated with the other of said buses will be tied together. The one plate 505 or 506 not tied in with its corresponding plates will be the plate corresponding to the contacts selected for store identification purposes. Since, in the disclosed embodiment, the store identification symbol will be taken from either the first channel or the third channel, there is no need to provide the above-described electrically-isolated construction on the buses 347 and 349, corresponding to the second and fourth channels. However, if desired, all four channels in this section could be constructed to permit their use for store identification purposes. The manner in which the contacts of the combination store identification and price field section operate to perform their desired functions will be fully described in the explanation of the circuit diagram of Figs. 44A to 44C inclusive.

Each of the springs 491 is provided at one end with a hook formation for engagement with a corresponding slot in the insulating tips 490 attached to each of the rods 489. The central portions of the springs 491 are coiled about the sleeves 500, and the other ends of said springs extend through apertures 514 (Fig. 34) in laminated plates 515 and 516 and are bent to form input terminals 517 for connection to the recording system circuit, for control of the recorder in one instance, and for forming part of a store identification circuit in another instance, as will be completely described in the explanation of the circuit diagram, Figs. 44A to 44C inclusive.

In the normal, retracted position of the sensing pins 486 of the combination store identification and price field section, the corresponding rods 489 will hold the springs 491 out of engagement with the buses 347 and 349, and out of engagement with the collars 507 on the rods 502 and 503. As the sensing pins of this section are released to sense the tag, the sensing pins which are in a position where there is a hole in the tag will be allowed to move to the left, as viewed in Fig. 34, to allow their corresponding springs 491 to engage the bus 347 or 349, or one of the collars, as the case may be, and complete a circuit therethrough. The rods 489 controlled by sensing pins 486 which are in positions where there are no perforations will be prevented from moving to the left and will keep their related springs from engaging their corresponding collars or buses.

*Validation means*

Means are provided in the media reader for embossing each merchandise tag read to denote that the tag and the article to which it is attached have been purchased from the establishment using the recording system.

The embossing is effected by small prongs (not shown) fixed to the face of a validating hammer 525 (Fig. 18), which is supported and guided for vertical movement in a bore 527 in the block 213. Shoulders 526 in the bore 527 in the block 213 limit the downward movement of the hammer 525. An aperture 528 (Figs. 5 and 18) in the plate 151 permits movement of the hammer 525 through said plate for the embossing of a tag positioned on said plate for reading.

Movement is imparted to the hammer 525 through an extension 529, to which said hammer is pivotally connected, and which is bifurcated at its opposite end to receive a stud 530 fixed in an arm 531 pinned to a shaft 532, which is journaled in the right support frame 334 and in a bracket 533 (Figs. 6, 18, and 21) secured to the cross member 160. The arm 531 is urged counter-clockwise, as viewed in Fig. 18, by a spring 534, connected between said arm and a stud 535 fixed to the cross member 160.

Also pinned to the shaft 532, and urged counter-clockwise by the spring 534, are a cam follower 536 and a blocking arm 537, having at its end a bent-over ear 524. The cam follower 536 has thereon a surface 538 and a roller 539, which are normally urged by the spring 534 into contact with the corresponding surfaces of two members 540 and 541 secured together to form the cam 368 fixed to the shaft 375. The members 540 and 541 are connected for unitary movement by the shaft 375 and by a rod 542, the member 540 being pinned to the shaft 375 and performing the function of a supporting arm for the member 541, in addition to performing a camming function. A stud 543 in the member 541 acts to hold a retaining spring 544 of the cam line against shifting into a position in which it might interfere with the surface 538 or the roller 539.

Figure 18:
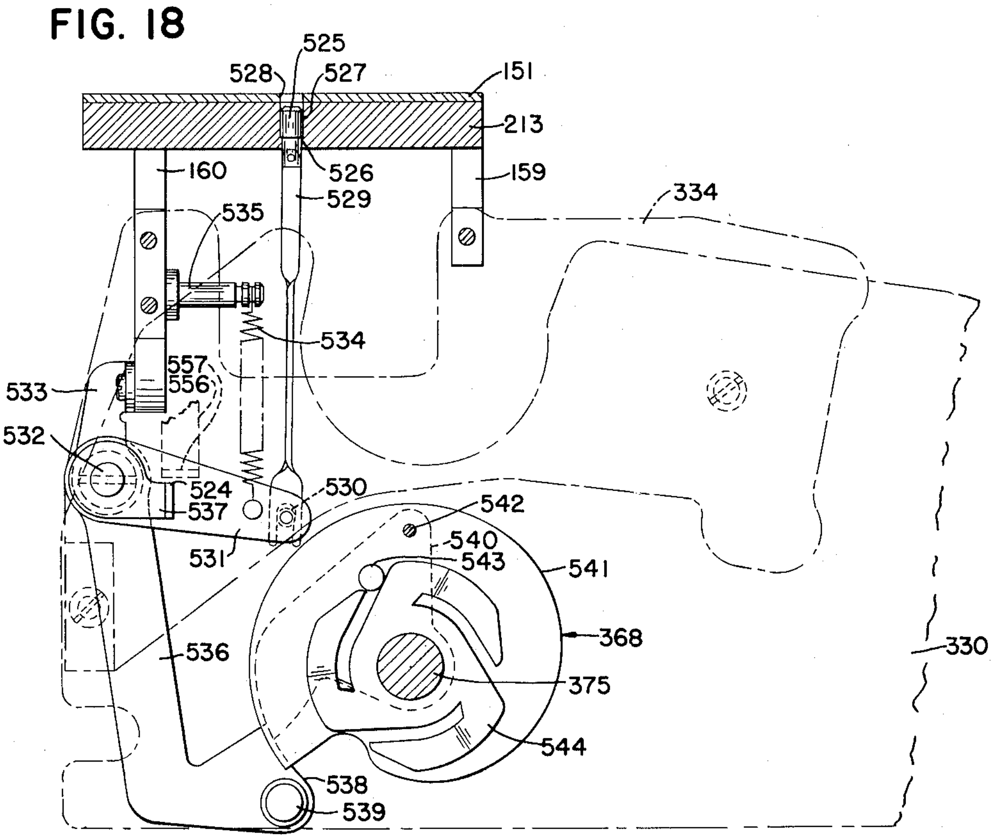
Fig. 18 is a detail view of the tag-validating means.

At a predetermined point in a reading operation, a shoulder on the peripheral surface of the cam member 540 will move clockwise past the edge of the surface 538 of the cam follower 536, thereby permitting said cam follower to move abruptly counter-clockwise, as viewed in Fig. 18, under the influence of the spring 534. Such movement causes the stud 530 on the arm 531 to strike the upper edge of the bifurcated portion on the extension 529 and to carry said extension and the hammer 525, attached thereto, upwardly, as viewed in Fig. 18, thus causing the prongs on said hammer to emboss an appropriate mark on the merchandise tag being read. This embossing will also take place on clerk and customer tags but will be without significance in these cases.

Following an embossing operation, the arm 531 is shifted to the position in which it is shown in Fig. 18 by cooperation of the roller 539 on the follower 536 with the periphery of the member 541. The force of gravity is sufficient to return the extension 529 and the hammer 525 to the position in which they are shown in Fig. 18. It will be noted that the shoulders 526 in the bore 527 in the block 213 retain the hammer 525 and the extension 529 in a position in which, as shown in Fig. 18, there is a space between the stud 530 and the extension 529 to permit a small amount of lost motion between these elements at the commencement of a validating operation. This permits a relatively sharp, sudden blow to be given to the extension 529 and the hammer 525 by the stud 530, to improve the quality of the embossing on the tag.

Figure 23:
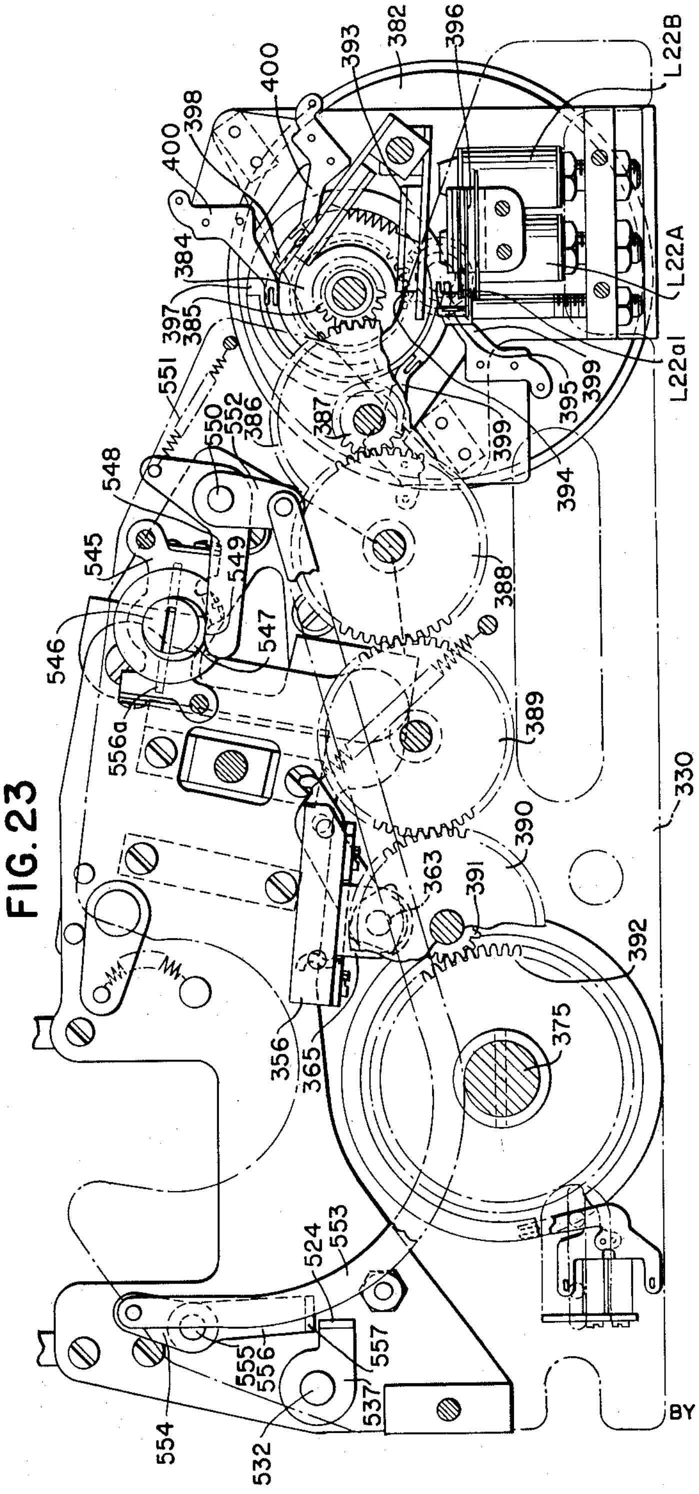
Fig. 23 is a side elevational view showing the motor, the clutch, and the gear train for driving the media reader cam line, and also showing a portion of the locking means and connecting linkage for the tag validation mechanism.

Means are provided to lock the validating means against operation. Mounted on the right side frame 330 is a lock housing 545 (Fig. 23). A lock cylinder 546 is rotatably mounted in said housing and has fixed thereto an eccentric 547. An arm 548 is provided with a surface 549, which is positioned to coact with the eccentric 547. Said arm 548 is pinned to a shaft 550 and is normally urged clockwise, as viewed in Fig. 23, by a spring 551. The shaft 550 is journaled in the right side frame 330 and also has fixed thereto an arm 552, to the free end of which is pivotally connected a link 553. At the other end of the link 553 is pivotally connected an arm 554 pinned to a shaft 555 mounted in the right side frame 330. Also pinned to the shaft 555, on the other side of the frame 330, is an arm 556, having at its lower end a bent-over ear 557, positioned to be shiftable into the path of movement of the surface 524 of the arm 537, which, it will be recalled, is fixed to the shaft 532.

A key **556*a* (Fig. 23), which will turn the lock cylinder 546, is provided and will normally be retained by a person supervising the operation of the recording system. By turning the lock cylinder in one direction or another with the key, it is possible to selectively lock or unlock the validating means. It will be seen that, with the lock cylinder 546 in the position in which it is shown in Fig. 23, the ear 557 on the arm 556 is in the path of movement of the surface 524 on the arm 537, and the arm 537, the shaft 532, and the arm 531 (Fig. 18) are all thereby blocked against counter-clockwise movement under the influence of the spring 534, so that said spring is rendered ineffective to shift the arm 531 and the stud 530 thereon in a movement to operate the extension 529 and the hammer 525, even when the shoulder on the surface of the member 540 moves past the surface 538 on the cam follower 536**.

To unlock the validating means, the key **556*a* is inserted into the lock cylinder 546, and the two are turned one hundred and eighty degrees in either direction, depending upon the design of the lock cylinder and the housing. This rotates the eccentric 547, which is fixed to the cylinder 546, and permits the spring 551 to rock the arm 548, the shaft 550, and the arm 552 to shift the link 553 to the right, as viewed in Fig. 23. This rocks the arm 554, the shaft 555, and the arm 556 counter-clockwise, as viewed in Fig. 23, thereby shifting the ear 557 on the arm 556 out of the path of movement of the surface 524 on the arm 537, and thus unlocking the validation means. The arm 531 is now free to move upwardly under the influence of the spring 534 when the shoulder on the surface of the member 540 moves past the surface 538 on the follower 536**, to effect a validating operation.

To lock the validation means, it is simply necessary to turn the key 556*a* in a direction opposite to that in which it was turned to unlock said means, which causes an operation the reverse of that described above to take place.

*Manual switching means*

Manually-operable means are provided for controlling certain electrical contacts, which in turn control tag release and homing functions of the media reader, as will be described subsequently.

A depressible key or push button 565 (Figs. 1, 6, 20, and 21) is slidably mounted on a bracket 566 by means of studs 567 and 568, fixed in the bracket 566, which studs cooperate with a vertically-elongated slot in the stem 569 of the key 565. The key 565 is normally urged to an undepressed position by a spring 570, which is connected between a projection 571 on the key stem 569 and a projection 572 on the bracket 566 (Fig. 6). The stem 569 of the key 565 terminates in a bent-over surface 573.

Also secured to the bracket 566, which is fixed to the cross member 160, are a pair of snap-action switches comprising the contacts SP24*a*2 and SP24*b*1, respectively. The actuating members of these switches are held in retracted position by the surface 573 on the key stem 569 when the key 565 is not depressed. Depression of the key 565 shifts the surface 573 downwardly (Fig. 20), thereby permitting the actuating members of said switches to move downwardly to open the contacts SP24*b*1 and close the contacts SP24*a*2. The key 565, on being released by the operator, is urged upwardly to its undepressed position by the spring 570, thereby causing the surface 573 to coact with the actuating members of said switches to close the contacts SP24*b*1 and open the contacts SP24*a*2. The functions performed by the contacts SP24*a*2 and SP24*b*1 will be fully explained when the circuit diagram of Figs. 44A to 44C inclusive is described.

*Selector switch unit*

Means for controlling the sequence of operation of the recording system are mounted in a unit which is carried in the media reader and which may readily be removed from the media reader for replacement by another similar means, which will control the recording system for a different sequence of operation.

A base 578 (Figs. 6, 37, and 42) supports the components of the selector switch unit. In operative position, the base 578 rests upon the base plate 579 (Fig. 6) of the media reader. Positioning studs 580 (Fig. 37) in the base plate 579 cooperate with fingers 581 on the base 578 to insure correct placement of the base 578 on the base plate 579, and a screw 582, cooperating with a slot 583 in the base 578 and threadedly engaging the base plate 579, secures the base in its proper position. The various leads from the electrical components on the base 578 are fixed to terminals of two plugs 584, mounted on a bracket 585, secured to the base. Said plugs are arranged to engage mating plugs 584A, fixed to the media reader framework, to complete electrical connections between the components of the selector switch unit and the remainder of the recording system.

One of the components of the selector switch unit is a multiple-position, multiple-level selector switch 587. This switch is mounted between a flange 588 (Fig. 37), bent upwardly from the base 578, and a vertical portion 589 of a bracket 590, secured to the base 578. The selector switch comprises a plurality of sets of wafers and a plurality of rotatable wipers, one wiper cooperating with each set of wafers. Each set of wafers comprises a first wafer 591 (Fig. 40) and a second wafer 592 (Fig. 41). The first wafer 591 comprises a ring of non-conducting material, having four common sectors 593 mounted therein, each sector having a terminal 594, extending outwardly of the outer surface of the ring. Two diametrically-opposed ears 595 are formed on the ring, each ear having therein a bore to receive a bolt 596 for securing the switch in assembled relation and mounting it between the flange 588 and the bracket 590.

Each of the wafers 592 comprises a ring of non-conducting material, in which are mounted twelve equally-spaced short sectors 597 of conducting material, each sector having a terminal 598 extending outwardly from the outer surface of the ring. Two diametrically-opposed ears 599, having therein bores for reception of the bolts 596, are provided on the ring.

The wipers 600 (Figs. 38 and 39) are positioned between the wafers 591 and 592. Each wiper 600 includes a hub 601, fixed on a shaft 602 for rotation therewith. Attached to the hub 601 and spaced ninety degrees from each other are four sets of wiper blades 603, each set consisting of two wiper blades, the ends of which are curved in opposite directions, so that one of said wiper blades will coact with the conducting sectors 593 of one of the wafers 591, while the other blade 603 of the set will coact with the sectors 597 of an adjacent wafer 592. The shaft 602, on which all of the wipers 600 are mounted, is journaled in the vertical portion 589 of the bracket 590 and in the flange 588. The wafers 591 and 592 are mounted in their proper assembled relationship on the flange 588 and the vertical portion 589 of the bracket 590 by means of the bolts 596.

The shaft 602 extends through the vertical portion of the bracket 590, and a ratchet 604 (Figs. 37 and 42) is mounted on its end. A pawl 605, having a tooth 606 for coaction with the teeth of the ratchet 604, is provided for shifting said ratchet step by step to rotate the shaft 602 and the wipers 600, fixed thereto, relative to the assembled sets of wafers 591 and 592. Secured to a vertical portion 612 of a bracket 613, fixed to the base 578, is a solenoid SS20, of the rotary type, having an armature 607, in which is fixed a pin 608, which cooperates with a slot 609 in the pawl 605. The slot 609 is slightly longer than the diameter of the pin 608 to permit some lost motion between the two. Mounted adjacent the solenoid SS20 by means of a bracket 614, secured to the vertical portion 612 of the bracket 613, are a pair of snap-action switches comprising the contacts SS20*ac*1, SS20*bc*1, and SS20*b*2. These switches are controlled by a blade 610, operated by the solenoid SS20 through a member 611, which has an in-and-out movement during energization and deenergization of said solenoid.

Pivotally mounted on the vertical portion 589 of the bracket 590 by a stud 615 is an arm 616, having a stud 617 mounted at one end for cooperation with a curved stop surface 618 on the pawl 605. A limited extent of movement may be given to the arm 616 for precise positioning of the stud 617 with respect to the surface 618 on the pawl 605 by adjustment of an eccentric 619, mounted in the vertical portion 589 of the bracket 590 and cooperating with a slot 620 in said arm. A spring 622 is connected at one end to a stud 623, fixed to the arm 616, and at the other end to a stud 624, extending between two ears on the pawl 605, and urges the surface 618 of said pawl against the stud 617. Connected between the stud 624 and the armature pin 608 is a second spring 625, which urges the armature pin 608 to bear against the left edge of the slot 609, as viewed in Fig. 42.

A blade 626, fixed to a support 627, cooperates with teeth of the ratchet 604 to prevent retrograde movement of said ratchet. The support 627 is adjustably mounted on the vertical portion 589 of the bracket 590 by means of bolts 628 on the support, which ride in a horizontal slot 629 in the vertical portion 589 of the bracket 590.

Energization of the solenoid SS20 causes the pin 608 to move to the right, as viewed in Fig. 42. The pin 608, after traversing the slot 609, coacts with the right edge of said slot to shift the pawl 605 to the right against the force of the spring 622, thereby moving the tooth 606 on said pawl past one of the teeth on the ratchet 604, said ratchet being held by the blade 626 against clockwise or retrograde movement. When the solenoid SS20 is subsequently deenergized, the pawl 605 is shifted back to the left by the spring 622, and the tooth 606 on said pawl cooperates with the tooth on the ratchet 604 to step said ratchet one step counter-clockwise, as viewed in Fig. 42. In the same manner, each energization and subsequent deenergization of the solenoid SS20 is effective to step the ratchet 604 one counter-clockwise step.

It will be seen, from an examination of Figs. 40 and 41, that each set of wafers 591 and 592, together with the corresponding wiper 600, comprises four levels or sets of contacts of the selector switch. Each of the four sectors 593 on the wafer 591 constitutes a common for one of the levels, while each of the twelve short sectors 597 on the wafer 592 constitutes one of three positions of each level. Each of the sets of wiper blades 603 on the wiper, therefore conducts current from a common sector on a wafer 591 to one of the position sectors on a corresponding wafer 592, and, as the selector switch is stepped, the wiper blades 603 advance, so that the wiper blade which is in contact with the position sectors 597 of the wafer 592 advances from one sector to the next. As each set of wiper blades advances, it steps through one level and on to the first position sector 597 of an adjacent level, while a following set of wiper blades 603 steps to the No. 1 position of said one level. Therefore the effect is that an electrical circuit is completed in each level successively to position No. 1, then position No. 2, position No. 3, position No. 1, etc. In the illustrated embodiment, the selector switch contains four sets of wafers 591 and 592, with four levels in each set, for a total of sixteen levels. It is obvious, however, that a switch of this type might contain a different number of levels or a different number of positions in each level, if desired.

Also mounted on the base 578 is a relay K20, having a plurality of sets of contacts K20*bd*1, K20*a*2, K20*ad*1, K20*bd*1, K20*ac*12, K20*bc*12, and K20*ad*11, which are arranged to be opened or closed by energization or deenergization of said relay.

The manner in which the various electrical contacts controlled by the mechanism of the selector switch unit function in the operation of the recording system will be fully explained when the circuit diagram of Figs. 44A to 44C inclusive is described.

A cover 630 is provided for the selector switch unit to protect said unit against possible damage. The cover rests upon a gasket 631, fastened to the base 578, and is secured in place by a first bolt 632, which threadedly engages a bent-over ear 633, integral with the vertical portion 612 of the bracket 613, and by a second bolt 634, which threadedly engages the bracket 585.

*Circuit diagram*

As has been previously stated, the media reader of the present invention is disclosed herein as being embodied in a data-recording system comprising, in addition to the media reader, a recorder and a cash register. A diagrammatic representation of the manner in which the electrical components of the media reader, the recorder, and the cash register are arranged and connected to form a data-recording system is shown in Fig. 43. The circuit comprising the block designated as "Media Reader Operating Circuit" in Fig. 43 is shown in detail in the circuit diagram of Figs. 44A to 44C inclusive. Since the remainder of the recording system operating circuit shown broadly in Fig. 43 is substantially the same as that disclosed in detail in the previously-cited United States patent application Serial No. 622,591, such circuitry is not shown or described in detail herein, but reference may be had to the above-cited application for a detailed description thereof.

It is believed that the media reader operating circuit may best be explained by a description of it as it functions in performing various types of reading operations in connection with operation of the recording system. To begin this explanation, it will be assumed that the media reader, the cash register, and the recorder have previously been operated through a complete transaction and are in "home" position, ready to receive the entries of a new transaction.

Power is turned on by closing the main power switch 125 (Fig. 1), which is located on the cash register cabinet. The operation of the switch 125 closes its contacts (not shown) to complete a circuit to make the usual 117 volts 60-cycle A.C. available to the components listed in the "A.C. Section" block of Fig. 43, and, through the rectifier shown in Figs. 43 and 44A, to supply D.C. operating potential to the control circuits over conductors 650 and 651 (Fig. 44A).

Application of operating potential to the recording system causes a visual condition indicator (not shown) to light to indicate that operating potential is being applied. In addition, a contactor relay is energized in the recorder operating circuit to prepare the recorder for operation. A "Leader Advance" operation may be performed at this time by depression of a push button on the recorder, to produce a "Leader Advance" or "Run-In" code on the recording tape, as is customary to prepare it for use with a computer system, an auxiliary card punching equipment, or other data-processing apparatus. All of the above is fully shown and explained in the United States patent application Serial No. 622,591.

After the "Leader Advance" code has been punched the recording system is ready to record a transaction. For purposes of illustration, it will be assumed that the transaction to be described is a charge sale; that a single item of merchandise is involved; that tags will be used for clerk and customer identification; and that a tag will be used for merchandise description; and lastly it will be assumed that the selector switch 587 (Fig. 37) with its various sets, or levels, is in its first position.

Since this is a charge sale, a Charge control key on the cash register keyboard is depressed, which causes contacts SC61*a*1 (Fig. 44A) to close, contacts SC47*ac*1 (Fig. 44C) to close, and contacts SC47*bc*1 (Fig. 44C) to open.

A clerk identification tag, such as the tag 103 (Fig. 2), is then inserted into the media reader in order that a record of the identity of the clerk handling the transaction will be punched in the tape. Proper insertion of the tag causes contacts SC23*a*1 (Fig. 44A) to close, which completes an energizing circuit from the conductor 650 to the alining pin and reset solenoid L20 (Fig. 44A) through contacts (not shown) controlled by the recorder contactor relay; a conductor 652 (Fig. 44A); the contacts SP24*b*1; a conductor 653; the contacts SC21*b*1; a conductor 654; the contacts SS20*a*2 (position 1); SC23*a*1; SC37*b*1; the solenoid L20; the safety contacts TD20*b*1, which will be caused to open by the time delay relay TD20, which is connected in parallel with the solenoid L21, in the event the circuit through the solenoid L21 is maintained for an excessive length of time; the contacts SC61*a*1; and the normally-closed contacts SC60*b*1. The contacts SC60*b*1 are opened during the operation of the cash register to prevent simultaneous operation of the media reader, but are closed at this time, since the cash register has not been tripped for operation.

Energization of the alining pin and reset solenoid L20 causes contacts (not shown) in the operating circuit for the cash register to open, to prevent simultaneous operation of the cash register with the media reader, and also causes the alining pins to move forward for engagement with corresponding alining holes in the clerk tag, If the tag has been properly positioned in the media reader, the alining pins will move through the openings in said tag and cause the contacts SC20*bc*1 (Fig. 44C) in a reset energizing circuit to the media reader clutch solenoids L22A and L22B to open, and also cause the contacts SC20*ac*1 (Fig. 44C) to close, completing a circuit from the conductor 650 over the contacts SC20*ac*1; a conductor 671; the solenoid L21; and normally-closed contacts L21*b*1, thus applying potential to the clamp and sensing switch solenoid L21 (Fig. 44C) to energize said solenoid, which actuates the clamping block 150 (Fig. 14) to clamp the clerk tag, to hold it firmly in place, and also applying potential to the time-delay relay TD20, to simultaneously energize said relay. The contacts L21*b*2 are closed to complete a shunt circuit across a 200-ohm resistor 672, and thus provide a high energizing voltage for the solenoid L21. Energization of said solenoid L21 causes the contacts L21*b*2 to open, removing the shunt across the resistor 672, which allows the resistor to become effective to reduce the current through the solenoid L21 to the lesser value required to maintain it in energized condition, thereby minimizing the danger of overheating.

It will be recalled that the disabling bar 351 (Fig. 6) is shifted to free the cam arms of the cam line for movement upon energization of the solenoid L20, and that, upon energization of the solenoid L21, the ear 435 and the bail 438 (Fig. 21) are shifted out of blocking relation to the cam arms for the media identification section and the combination store identification and price field section to release all of the sensing pins for these sections. The sensing pins for the media identification section control the contacts SC25*a*1, SC26*a*1, SC27*a*1, SC28*a*1, and SC29*a*1 (Fig. 44A). The sensing pins for the combination store identification and price field section also control a plurality of contacts, but, since no perforations are made in a clerk tag in the combination store identification and price field section, release of the sensing pins for this section will have no effect at this time.

Energization of the clamp and sensing switch solenoid L21 causes the contacts L21*ac*1 (Fig. 44A) to close to complete a circuit over the contacts L21*ac*1; the contacts SC20*a*3, which are caused to close by energization of the solenoid L20; the normally-closed contacts SP24*b*1; the conductor 653; the contacts SC21*b*1; the conductor 654; the contacts SS20*a*2 (position 1); SC23*a*1; SC37*b*1; the solenoid L20; the contacts TD20*b*1; SC61*a*1; and SC60*b*1, for holding the solenoid L20 energized. Energization of the solenoid L21 also causes the contacts L21*bc*1 (Fig. 44C) to open, thereby interrupting a circuit over the contacts SC33*b*2 and a conductor 655 for energizing the previously-mentioned contactor relay in the recorder, to deenergize said relay. Deenergization of this relay (not shown) causes contacts (not shown) in the A.C. section of the system-operating circuit to close to supply power to the media reader and recorder motors, and also causes other contacts (not shown) to open to interrupt the original energizing circuit to the solenoid L20, which is now held energized through the contacts L21*ac*1. In addition, further contacts (not shown), controlled by this relay, close to prepare the recorder punch apparatus for operation.

To initiate operation of the media reader, therefore, the Charge key of the cash register must have been operated, the clerk tag must be properly inserted into the media reader, and said tag must have a perforation, such as the perforation 105, shown in Fig. 2, in the clerk position of its media identification section. Movement of the corresponding sensing pin through this hole causes the contacts SC29*a*1 to close, completing a circuit from the conductor 650 through the contacts L21*ac*1; SC20*a*3; SP24*b*1; the conductor 653; the contacts SC21*b*1; the contacts SC29*a*1; the contacts SS20*a*3 (position 1); the contacts SC33*b*1 of the media reader, which are closed in the home and the No. 1 positions of the media reader cam line; the contacts SC35*b*2; and the media reader clutch solenoids L22A and L22B, to energize said solenoids. The contacts SC35*b*2 are closed to complete a shunt circuit across a 2,000-ohm resistor 656 and thus provide a high energizing voltage for the solenoids L22A and L22B. Subsequent removal of the shunt from across the resistor 656 allows the resistor to become effective to reduce the current through the solenoids L22A and L22B to a lesser value required to maintain them in energized condition, thereby minimizing the danger of overheating of the solenoids.

In the event that the wrong tag is inserted into the media reader, the sensing pins for the contacts SC29*a*1 will not be able to come forward, since no hole will be positioned opposite said sensing pin in the identification section of the tag. Therefore the contacts SC29*a*1 will not close, and the media reader clutch solenoids L22A and L22B will not be energized for initiation of operation of the media reader. Means which will be described subsequently, and which are controlled by the push button 565 (Fig. 1), are provided to enable the release of erroneously-inserted tags.

Assuming now that the correct tag has been inserted into the media reader, and that the contacts SC29*a*1 have closed to complete an energizing circuit to the media reader clutch solenoids L22A and L22B, the clutch will be engaged to couple the cam line to the media reader motor. As has been stated, the clutch employed for coupling the media reader cam line to its operating motor 382 (Fig. 6) is of the single-revolution type and is tripped by solenoids L22A and L22B to cause the clutch to cycle for a single revolution to couple the cam line to the motor. Upon completion of the single revolution, the clutch is disengaged, to disengage the cam line from the motor, unless the solenoids L22A and L22B have been energized a second time. As has been explained previously, no reading operation of the media reader takes place on the first revolution of the cam line following insertion of a tag, since this is simply a delaying revolution to provide time for the various components of the media reader to assume their correct positions for the reading of the tag.

During the first cycle of operation of the clutch, the media reader cam line is moved from its home position to its No. 1 position. Since the contacts SC33*b*1 remain closed in both home and No. 1 positions of the media reader cam line, the circuit to the media reader clutch solenoids L22A and L22B remains completed and energizes said solenoids to cause the clutch to cycle again to engage the media reader motor with the media reader cam line for another revolution of said cam line.

During the second clutch cycle, in which the media reader cam line is moved from its No. 1 position to its No. 2 position, a symbol is customarily punched in the recording tape to identify the type of tag being read. The punching of this symbol may be accomplished through one or both of two different means, depending upon the type of application in which the recording system is being used. Customarily, only one of these two means will be used for the punching of a tag identification symbol in the recording tape, and the other of the means may then be used for some other purpose. One example of the purpose for which the other of the two means might be adapted is that of punching supplementary special symbols at desired points during the reading of the tag. These supplementary symbols could, for example, constitute intermediate reset signals in a tape-to-card converting system. Also, if desired, one of the two means could be used to cause the punching of an end-of-frame symbol in the tape, while the other was used for the punching of a tag identification symbol, or for some other purpose if the tag identification were deemed unnecessary.

One of the two available means for causing punching of a media identification symbol in the tape includes the contacts SC34*a*1 (Fig. 44B), which close at approximately fifteen degrees of movement before the end of the first revolution of the media reader clutch. These contacts are effective, in cooperation with the actuating contacts SC35*a*1 (Fig. 44B), which are closed from five degrees to one hundred and thirty degrees of revolution of the media reader clutch, to apply potential to the wiper of the selector switch contacts SS20*a*11 (Fig. 44B). At this point in the transaction, the wiper is in its No. 1 position, and the circuit therefore extends through a corresponding terminal 657, which may be located in a program board (not shown) in the recording system, whence a circuit may be completed to an encoding board electrically connected to the recorder punch mechanism for the punching of an appropriate identification symbol for the clerk tag. For a detailed description of the circuitry used in performing this punching operation, reference may be had to the previously-described United States patent application Serial No. 622,591.

The second of the two available means for causing the punching of a media identification symbol in the recording tape includes the media identification contacts SC25*a*2, SC26*a*2, SC27*a*2, SC28*a*2, and SC29*a*2 (Fig. 44B). These contacts are under the joint control of the five previously-described sensing wires, which control the contacts SC25*a*1 to SC29*a*1 inclusive (Fig. 44A), and of the adjustable cam 367 (Fig. 24) on the media reader cam line. As has been described, the cam 367 may be so adjusted on the media reader cam line that the dwell portion of said cam can be changed in relative position to the remainder of the cam line. Therefore, for any of the contacts SC25*a*2 to SC29*a*2 inclusive to close, the corresponding sensing pin must be permitted to shift forward by having a hole in the tag which is being read positioned opposite said sensing pin, and the dwell portion of the cam 367 must be in operative relation to the actuating means for the contacts SC25*a*2 to SC29*a*2 inclusive. It will be seen that the cam 367 may be adjusted on the cam line so that this dwell portion will come into operative engagement with the actuating means for the contacts at any desired time in the reading operation. For purposes of illustration, it will be assumed that the cam 367 is so positioned on the media reader cam line that the appropriate one of the contacts SC25*a*2 to SC29*a*2 will close to initiate an identification symbol punching operation during the second revolution of the media reader clutch.

In the operation being described, in which a clerk tag has been inserted into the media reader, the contacts SC29*a*2 will, therefore, be closed. These contacts are effective, in cooperation with the actuating contacts SC35*a*1 (Fig. 44B), which, as has been stated, are closed from five degrees to one hundred and thirty degrees of revolution of the media reader clutch, to apply potential to a terminal 658 (Fig. 44B), which may be located on a program board (not shown) in the data-recording system. The terminal 658 may be connected through the program board and an encoding board to the recorder punching mechanism, to cause the punching in the recording tape of an appropriate identification symbol for the clerk tag. For a detailed description of the circuitry employed in the above operation in a recording system, reference may be had to the previously-cited United States patent application Serial No. 622,591.

After the second clutch revolution has been initiated, the contacts SC33*b*1 (Fig. 44A), which are closed in the "home" and No. 1 positions of the media reader cam line, will open, and the contacts SC33*a*3 (Fig. 44C), which are open in the "home" and No. 1 positions of the media reader cam line, will close. The contacts SC4*a*1 (Fig. 44C), which are positioned on the cam line of the recorder, are closed between two hundred and fifteen degrees and three hundred and ten degrees of the punching cycle, and are thus closed at the completion of the actual punching cycle. A circuit is completed from the conductor 650 through the contacts SC4*a*1; the now-closed contacts SC33*a*3 (Fig. 44C); a conductor 659; and the contacts SC35*b*2 (Fig. 44A), to the media reader clutch solenoids L22A and L22B, to trip the media reader clutch to make a third cycle. The third and following cycles of the media reader clutch effect rotation of the media reader cam line through successive increments, so that successive cams 352 for the first data section of the cam line release their corresponding sets of four sensing pins for the reading of successive data characters on the tag. The holes in each data character position of the first data section of the tag permit corresponding sensing pins to come forward and close the corresponding ones of the reader contacts SC36*a*1 to SC36*a*4 inclusive (Fig. 44B) of the first data section. As the actuating contacts SC35*a*1 (Fig. 44B) close at five degrees of each revolution of the media reader clutch, a circuit is completed from the conductor 650, over the contacts SC35*a*1 (Fig. 44B); a first conductor 660; a second conductor 661; and the ones of the contacts SC36*a*1 to SC36*a*4 which are closed, to terminals 662, which may be positioned in a program board (not shown) in the recording system. The circuit may be completed from the terminals 662 in the program board through an encoding board to the recorder punching mechanism to perforate the recording tape according to the perforations sensed in the tag and the predetermined code employed. For a detailed description of the manner in which the contacts SC36*a*1 to SC36*a*4 inclusive control the operation of the recorder punching mechanism, reference may be had to the previously-cited United States patent application, Serial No. 622,591.

A punching cycle is thus effected, and the contacts SC4*a*1 (Fig. 44C) are closed at two hundred and fifteen degrees of the operation of the punching mechanism to complete an energizing circuit to energize the media reader clutch solenoids L22A and L22B, to trip the media reader clutch for a further cycle of operation.

The cams on the cam line of the media reader are so designed that the notched dwell portion of each cam, which causes release of the sensing pins of the digit to be read, comes into sensing-pin-releasing position shortly before the end of the previous revolution of the media reader clutch, so that the reader contacts SC35*a*1 will close to complete the proper circuits at the beginning of the clutch revolution in which the digit is read. Since each clutch cycle is initiated by completion of the circuit to the media reader clutch solenoids L22A and L22B, through the contacts SC4*a*1 on the recorder cam line, each subsequent reading operation must await the proper recording of the preceding reading operation. This reading process continues until all of the desired information upon the tag has been read by the media reader and recorded by the recorder.

Upon completion of the reading of the first data section of the tag, a reset operation is employed to rotate the media reader cam line back to its "home" position, in preparation for the next tag-reading operation. A reset operation is initiated by the opening of the end-of-tag contacts for the tag which has just been read. In this case, it is the clerk tag which has just been read, and therefore the clerk end-of-tag contacts SC21*b*1 (Fig. 44A) will be opened. The end-of-tag contacts are located on the media reader cam line and are designed to open at a particular time in the reading cycle, depending upon the predetermined length of the tag being read. Opening of the contacts SC21*b*1 interrupts the circuit to the alining pin and reset solenoid L20, causing said solenoid to be deenergized. This causes the alining pins to be withdrawn from the alining holes in the clerk tag, to permit said tag to be ejected from the media reader. Withdrawal of the alining pins also causes the contacts SC20*ac*1 (Fig. 44C) to open and the contacts SC20*bc*1 (Fig. 44C) to close. Opening of the contacts SC20*ac*1 interrupts the circuit to the clamp and sensing switch solenoid L21, thus causing said solenoid to deenergize. Deenergization of the solenoid L21 causes the contacts **L21*ac*1 (Fig. 44A) in an energizing circuit for the solenoid L20 to open and causes the contacts L21*bc*1** (Fig. 44C) to close.

When the contacts SC4*a*1 (Fig. 44C) close near the end of the operation in which the punching of the last digit or symbol to be recorded takes place, an energizing circuit is completed through the contacts SC4*a*1; the contacts SC33*a*3, which are closed except in "home" and No. 1 positions of the media reader cam line; the conductor 659; and the contacts SC35*b*2 (Fig. 44A) to the media reader clutch solenoids L22A and L22B. Energization of these solenoids causes the contacts L22*a*1 (Fig. 44C) to close. These contacts, together with the now-closed contacts SC20*bc*1 and the contacts SC33*a*3, complete a holding circuit over the conductor 659 and the contacts SC35*b*2, or alternatively the resistor 656, through the solenoids L22A and L22B, to retain said solenoids in an energized condition after the contacts SC4*a*1 open, as the punch mechanism of the recorder completes its cycle. The media reader clutch is thereby held in an engaged condition, so that the motor and the cam line of the media reader remain coupled until the cam line has moved sequentially to its thirty-sixth position. During the thirty-sixth revolution of the media reader clutch, the contacts SC33*a*3, which, it will be recalled, are open in "home" and No. 1 positions of the media reader cam line, open to deenergize the solenoids L22A and L22B, and the media reader thus disengages the media reader cam line from the motor at the end of the thirty-sixth revolution, which positions the media reader cam line in its so-called 'home" position. Deenergization of the solenoids L22A and L22B also causes the contacts L22*a*1 to open.

In order to enforce a certain sequence of operation in the recorded transaction, it is necessary to move the sequence selector switch 587 (Fig. 37) to its next position following reading of the clerk tag. During the recording of the data from the clerk tag, when the contacts SC33*a*4 (Fig. 44C), which were open only in "home" and No. 1 positions of the media reader cam line, closed, they completed a circuit through the contacts SC20*ac*1 (Fig. 44C), which were closed by movement of the alining pins into the alining holes in the clerk tag; the contacts SC33*a*4; the selector switch contacts SS20*a*16 (position 1); the normally-closed contacts SC46*bc*1, which are controlled by the cash register; the selector switch contacts SS20*a*9 (position 1); and the selector switch solenoid SS20, to energize said selector switch solenoid. When the alining pin and reset solenoid L20 was deenergized upon completion of the reading of the clerk tag, thus causing the contacts SC20*ac*1 to open, the circuit to the sequence selector switch solenoid SS20 was interrupted. As has been described, the sequence selector switch 587 (Fig. 37), comprising the various sets or levels of contacts SS20*a*1 to SS20*a*16 inclusive employed in the present invention, is of the type which is caused to step to its next position upon deenergization of its solenoid. Therefore, deenergization of the solenoid SS20 caused the selector switch to step to its next position, which in this case is position No. 2.

In the event that the clerk number is entered by means of the cash register rather than by means of the media reader for recording, as disclosed in the above-cited United States patent application Serial No. 622,591, operation of the cash register causes the contacts SC46*ac*1 (Fig. 44C) to close and the contacts SC46*bc*1 to open. The closing of the contacts SC46*ac*1 completes a circuit from the conductor 650 through the contacts SS20*bc*1; the contacts SC44*b*2, controlled by the total lever; the contacts SC46*ac*1; the contacts SS20*a*9 (position 1); and the solenoid SS20, to energize said solenoid. This causes the interrupter contacts SS20*bc*1 to open, thereby deenergizing the solenoid SS20 and causing the selector switch 587 to step to position 2. The previously-mentioned opening of the contacts SC46*bc*1 prevents a circuit from being completed through the contacts SC46*ac*1, SC46*bc*1, and SC47*ac*1 to position 2 of the contacts SS20*a*9 for reenergization of the solenoid SS20 at this time.

As the next step in the operating sequence being described, a customer identification tag is inserted into the media reader in order that a record of the account number of the customer in this transaction will be punched on the tape. Proper insertion of the customer tag causes the contacts SC23*a*1 (Fig. 44A) to close, which completes an energizing circuit from the conductor 650 to the alining pin and reset solenoid L20 (Fig. 44A) through contacts (not shown) controlled by the recorder contactor relay; the conductor 652 (Fig. 44A); the contacts SP24*b*1; the conductor 653; a conductor 663; contacts SC22*b*1; a conductor 664; the contacts SS20*a*2 (position 2); SC23*a*1; SC37*b*1; the solenoid L20; the safety contacts TD20*b*1; the contacts SC61*a*1; and the normally-closed contacts SC60*b*1. The customer end-of-tag contacts SC22*b*1, referred to above, will remain closed until the reading of the customer tag has been completed.

As has been previously described in connection with the description of the reading of the clerk tag, energization of the alining pin and reset solenoid L20 causes the alining pins to move forward and engage corresponding alining holes in the customer tag. The clamp and sensing switch solenoid L21 is then energized to clamp the customer tag to hold it firmly in place, and also to permit release of the sensing pins for the media identification section and the sensing pins for the combination store identification and price field section. Also, as has been described previously, power is supplied to the media reader and recorder motors at this time.

Two conditions must be met before the customer tag will be accepted for reading by the media reader. First, the customer tag must be identified as a customer tag by a perforation such as that shown at 111 in the tag 109 (Fig. 3), in the "customer" position of the media identification sensing area. Second, the tag must have the proper store identification perforation, such as that shown at 115 in the tag 109, in the combination store identification and price field section of the tag. These two perforations are sensed for by sensing pins of the corresponding sections of the sensory means of the media reader.

The "customer" position customarily is the second of five available positions in the media identification area, as shown in Fig. 3, and the sensing pin for this position controls the contacts SC28*a*1 (Fig. 44A).

The store identification position may be located in either the first channel or the third channel in any one of the six columns of the combination store identification and price field section of the sensory means in the illustrated embodiment of the media reader, as has been described previously. The contacts corresponding to the selected location are electrically isolated from the other contacts of the combination store identification and price field section, and are shown in the circuit diagram as located in the first channel, and designated as SC36*a*1X (Fig. 44B). It will be understood that the store identification contacts could also be selected from the third channel, if desired, in the illustrated embodiment. Also, if desired, the store identification feature may be omitted from the media reader, in which event there are no isolated contacts in the price field section, conductor 665 (Fig. 44B) is extended to the wiper of the contacts SS20*a*6, and the connection between the conductor 670 and the contacts SS20*a*6 (position 3) is opened.

If the correct tag—that is, the customer tag bearing a correctly-located store identification perforation—has been inserted into the media reader, an energizing circuit for the media reader clutch solenoids L22A and L22B will now be completed. This circuit will extend from the conductor 650 through the contacts L21*ac*1 (Fig. 44A); SC20*a*3; SP24*b*1; the conductor 653; the conductor 663; the contacts SC22*b*1; the contacts SC28*a*1; the contacts SS20*a*5 (position 2); the conductor 665; the contacts SC36*a*1X (Fig. 44B); the contacts SS20*a*6 (position 2); the contacts SS20*a*7 (position 2); a conductor 666; the contacts SS20*a*3 (position 2) (Fig. 44A); the contacts SC33*b*1; the contacts SC35*b*2; and the solenoids L22A and L22B, to energize said solenoids.

In the event that the wrong tag is inserted into the media reader, either the sensing pins for the contacts SC28*a*1 or the sensing pins for the contacts SC36*a*1X, or both, will not be able to come forward, since no hole in the tag will be positioned opposite them. Therefore these contacts will not close, and the media reader clutch solenoids L22A and L22B will not be energized for initiation of operation of the media reader. The push button 565 (Fig. 1) may be pressed to release such an erroneously-inserted tag, as will be described subsequently.

Assuming that the correct tag has been inserted into the media reader, and the solenoids L22A and L22B have been energized, the clutch is tripped to couple the media reader motor with the media reader cam line. The punching of an identification symbol and the reading of the data section of the customer tag will then take place in the same manner as has been described for the reading of the clerk tag, and will continue until the reading of the customer tag has been completed. Isolating diodes 667 (Fig. 44B) are provided in the data reading circuits to prevent back-currents which might cause erroneous punching, as, for example, when a customer tag adapted for use in a number of different stores is perforated in more than one location in the combined store identification and price field section.

Upon the completion of the reading of all of the information on the customer tag and the punching of this information on the tape, a resetting operation takes place, which is initiated by the opening of the customer end-of-tag contacts SC22*b*1 (Fig. 44A). This interrupts the circuit to the alining pin and reset solenoid L20, causing said solenoid to be deenergized. The resetting operation is then carried out in a manner which has previously been described in connection with the reading of the clerk tag.

In order to enforce the correct sequence of operation following the reading of the customer tag, it is necessary to move the selector switch 587 (Fig. 37) to its next position, which in this case is its third position. During the reading of the customer tag, when the contacts SC33*a*4 (Fig. 44C), which were open only in "home" and No. 1 positions of the media reader cam line, closed, this completed a circuit through the contacts SC20*a*1 (Fig. 44C), which were closed by movement of the alining pins into the alining holes in the customer tag; the contacts SC33*a*4; the contacts SS20*a*16 (position 2); the contacts SC47*ac*1, which are closed as a result of depression of the Charge key on the cash register keyboard; the contacts SS20*a*9 (position 2); and the selector switch solenoid SS20, to energize said solenoid. When the alining pin and reset solenoid L20 was deenergized upon completion of the reading of the customer token, thus causing the contacts SC20*ac*1 (Fig. 44C) to open, the circuit to the selector switch solenoid SS20 was interrupted. This caused the selector switch 587 (Fig. 37) to step to its next position, which in this case was position 3, in the manner described previously.

In the event that the customer number is entered by means of the cash register rather than the media reader for recording, as disclosed in the above-cited United States Patent application Serial No. 622,591, operation of the cash register causes the contacts SC43*a*2 to close, which completes a circuit from the conductor 650 through the contacts SS20*bc*1; SC44*b*2; SC43*a*2; SS20*a*9 (position 2); and the solenoid SS20 to energize said solenoid. This in turn causes the interrupter contacts SS20*bc*1 to open, thereby deenergizing the solenoid SS20 and causing the selector switch 587 to step from position 2 to position 3.

As the next step in the operating sequence being described, a merchandise tag is inserted into the media reader in order that a description of the merchandise being sold will be punched on the tape following the clerk and customer data. Proper insertion of the merchandise tag causes the contacts SC23*a*1 (Fig. 44A) to close, which completes an energizing circuit from the conductor 650 to the alining pin and reset solenoid L20 (Fig. 44A) through contacts (not shown) controlled by the recorder contactor relay; the conductor 652 (Fig. 44A); the contacts SP24*b*1; the normally-closed contacts K20*bd*1; the contacts SS20*a*2 (position 3); the contacts SC23*a*1; the contacts SC37*b*1; the solenoid L20; the contacts TD20*b*1; the contacts SC61*a*1; and the normally-closed contacts SC60*b*1.

As has been described previously in connection with the description of the reading of the clerk and customer tags, energization of the alining pin and reset solenoid L20 causes the aligning pins to move forward and engage corresponding alining holes in the merchandise tag, and also causes the contacts SC20*ac*1 (Fig. 44C) to be closed. The clamp and sensing switch solenoid L21 is energized over the contacts SC20*ac*1 to clamp the merchandise tag to hold it firmly in place, and also permits release of the sensing pins which control the contacts for the media identification section and for the combination store identification and price field section. Also, as has been previously described, power is supplied to the media reader and recorder motors at this time.

The merchandise tag may have any one of three different predetermined digit lengths, which shall be designated herein as No. 1, No. 2, or No. 3. Each of the three types of tags is identified by a hole in one of three different places in the media identification section of the tag. Therefore, when the five identification sensing pins are released for sensing movement, the pin positioned opposite the hole in an inserted merchandise tag will pass through the hole identifying the particular type of tag and cause its corresponding contacts to close. The contacts SC27*a*1 are controlled by the sensing wire which will sense an identification hole in the merchandise tag of No. 1 digit length; the contacts SC26*a*1 are controlled by the sensing pin which will sense an identification hole in the merchandise tag of No. 2 digit length; and the contacts SC25*a*1 are controlled by the sensing pin which will sense an identification hole in the merchandise tag of No. 3 digit length.

It will be assumed for purposes of illustration that the merchandise tag being read is similar to the tag shown in Fig. 4, in which all twenty-four character positions of the first data section and all six character positions of the combination store identification and price field section are utilized, and it will also be assumed that said tag is of No. 1 digit length. When this tag is inserted into the media reader, the sensing pins SC25*a*1 to SC29*a*1 will be released, and the contacts SC27*a*1 will close. A circuit will then be completed through the contacts SC27*a*1; the merchandise end-of-tag contacts SC30*b*1; the contacts SS20*a*3 (position 3); the contacts SC33*b*1, which are closed in "home" and No. 1 positions of the media reader cam line; the contacts SC35*b*2; and the media reader clutch solenoids L22A and L22B, to energize said solenoids to trip the clutch for a cycle of operation to effect coupling of the media reader cam line to the media reader motor 382.

The sensing pins for the combination store identification and price field section are released simultaneously with the sensing pins for the media identification section, and those pins located opposite encoding holes in the price field area of the tag will pass through said holes and cause their corresponding contacts SC36*a*1 to SC36*a*4 to close. These contacts will be ineffective to control the recorder punching mechanism to cause punching of the recording tape, however, since no potential is supplied to them at this time.

At the same time that the clutch solenoids L22A and L22B are energized, a circuit will be completed from the conductor 650 through the contacts SC27*a*1 (Fig. 44A); SC30*b*1; K20*bd*11; SS20*a*4 (position 3); and a merchandise interlock relay K20, to energize said relay, which causes the contacts K20*ad*11 (Fig. 44A) to close, after which the contacts K20*bd*11 are caused to open. This completes a holding circuit for the relay K20 from the conductor 650 over contacts (not shown) controlled by a stepping switch in the recorder; a conductor 675 (Fig. 44A); the contacts K20*ad*11; the contacts SS20*a*4 (position 3); and the relay K20, to maintain said relay in an energized condition. A relay K40 is connected in parallel with the relay K20 for energization and deenergization simultaneously with the relay K20, and operates to exert controls over certain visual condition indicators (not shown) in the cash register.

It will be recalled that, in the reading of the merchandise tag, the alining pin and reset solenoid L20 was initially energized through contacts (not shown) controlled by the recorder contactor relay; the conductor 652 (Fig. 44A); the contacts SP24*b*1; the contacts K20*bd*1; SS20*a*2 (position 3); SC23*a*1; SC37*b*1; the solenoid L20; the contacts TD20*b*1; SC61*a*1; and SC60*b*1. Upon the energization of the relay K20, the contacts K20*bd*1 open, to interrupt the original energizing circuit, as has been previously stated, and the contacts K20*ad*1 close, thus causing an energizing circuit for the solenoid L20 to be completed through the contacts SC27*a*1 and SC30*b*1. The reading and recording operations performed under control of the merchandise tag are completed with solenoid L20 energized through this circuit.

With regard to the punching of an identification symbol for the merchandise tag being read, it will be noted that, if the encoding means is employed which includes the contacts SS20*a*11 (Fig. 44B), the same identification symbol will be used, regardless of which of the three possible digit lengths the merchandise tag being read may be. On the other hand, if the encoding means is employed which includes the media identification encoding contacts SC25*a*2 through SC29*a*2 (Fig. 44B), it is possible to punch different identification symbols for different lengths of merchandise tags being read, and thus identify the particular digit length of the tag being read.

After the punching of an identification symbol during the second clutch cycle, if desired, reading of the first data section of the merchandise tag is commenced and continues for the reading of successive columns in the tag, in the manner previously described for the clerk and customer tags. During a portion of the time during which the first data section is read, the contacts in the combination store identification and price field section corresponding to the holes in the price field of the tag being read will also be closed. However, the isolating diodes 667 (Fig. 44B), as previously described, prevent back-currents through these contacts, which could otherwise cause erroneous punching during reading of the first data section of the merchandise tag.

Shortly before the reading of the first data section is completed, the cams 369 to 374 inclusive (Fig. 24) will cause the sensing pins for the combination store identification and price field section to be retracted, as has been previously described. At the conclusion of the reading of the first data section, the contacts SC33*a*5 (Fig. 44B), located on the media reader cam line, close to prepare a circuit for supplying potential to the contacts SC36*a*1 to SC36*a*4 of the combination store identification and price field section. This circuit extends from the conductor 650 through the contacts SC35*a*1, which close at five degrees of revolution of the media reader clutch; the conductor 660; the contacts SC33*a*5; a conductor 669; the various ones of the contacts SC36*a*1 to SC36*a*4 inclusive; and conductor 670 to the terminal 662. A branch of the above circuit extends over the conductor 668; the contacts SS20*a*5 (position 3) (Fig. 44A); the conductor 665; the contacts SC36*a*1X (Fig. 44B); the contacts SS20*a*6 (position 3); and the conductor 670 to the terminal 662 to permit the contacts SC36*a*1X, which were electrically isolated for store identification purposes in the reading of a customer tag, to also function with the other contacts in its channel in the reading of the price field of a merchandise tag.

As the cam line continues its incremental rotation, the notched dwell portions on the cams 369 to 374 inclusive release their corresponding sets of four sensing pins for each of the six columns of the combination store identification and price field section one by one in a serial manner. The holes in each of the columns of the price field of the merchandise tag being read permit corresponding sensing pins to come forward and close the corresponding ones of the reader contacts SC36*a*1 to SC36*a*4. As the actuating contacts SC35*a*1 (Fig. 44B) close at five degrees of revolution of the media reader clutch each operation of said clutch, the circuit described above is completed over the ones of the contacts SC36*a*1 to SC36*a*4 which are closed, to the corresponding terminals 662. As has been stated, the terminals 662 are connected, by means fully described in the previously-cited United States patent application Serial No. 622,591, to the recorder punching mechanism for control of said mechanism by the contacts SC36*a*1 to SC36*a*4 inclusive.

Upon completion of the reading of the price field from the merchandise tag and the punching of this information on the tape, a resetting operation takes place, which is initiated by the merchandise end-of-tag contacts corresponding to the particular length of tag being read. As may be seen in Fig. 44A, the merchandise end-of-tag contacts for each digit length are in series with the corresponding contacts controlled by the tag identification sensing pins. That is to say, the merchandise end-of-tag contacts SC30*b*1 for merchandise tags of No. 1 digit length are in series with the contacts SC27*a*1, the merchandise end-of-tag contacts SC31*b*1 for merchandise tags of No. 2 digit length are in series with the contacts SC26*a*1, and the merchandise end-of-tag contacts SC32*b*1 for merchandise tags of No. 3 digit length are in series with the contacts SC25*a*1. Each of the sets of contacts SC30*b*1, SC31*b*1, and SC32*b*1 is controlled by the position of the media reader cam line and is designed to open at a certain point in rotation of said cam line, depending upon the predetermined digit length of each of the three types of merchandise tags. Opening of the merchandise end-of-tag contacts corresponding to the digit length of the tag being read interrupts the circuit to the alining pin and reset solenoid L20, causing said solenoid to be deenergized. The resetting operation is then carried out in the manner which has been previously described in connection with the clerk and customer tags.

It will be recalled that the cams controlling sensing of the character positions of the first data section and the combination store identification and price field section are so arranged on the cam line that the sensing of the first character position of the combination store identification and price field section will immediately follow the sensing of the last character position of the first data section which it is desired to read. The end-of tag contacts for the merchandise tags of shorter digit lengths may therefore be so set as to terminate reading of those tags at a point in the rotation of the cam line corresponding to the predetermined digit lengths of said tags. If the merchandise tags of No. 1 (or longest) length utilize all twenty-four character positions of the first data section, plus all six of the character positions of the price field, the merchandise tags of shorter digit lengths may utilize all of the twenty-four positions of the first data section, plus, if desired, one or more of the six positions of the price field in sequential order, beginning with the first. Alternatively, the shorter digit length tags may use only, say, the first ten or fifteen positions of the first data section, in which event these shorter digit length tags cannot utilize any of the positions of the price field, since this would involve skipping part of the first data section, which is not possible with this arrangement of the cam line. However, if the cam line is so arranged that the merchandise tags of No. 1 digit length utilize less than the maximum capacity of the first data section, plus all six of the character positions of the price field, then corresponding merchandise tags of shorter digit length which utilize any portion of the capacity of the price field must also skip that portion of the first data section which was omitted in the tag of No. 1 digit length by the arrangement of the cam line.

The function of the merchandise interlock relay K20 is to enforce the use of the cash register component of the recording system following each merchandise-tag-reading operation for the registering and recording of data, such as sale price, pertaining to the merchandise. Upon the completion of a register operation, another merchandise tag may be read, so that a transaction may include any desired number of merchandise items. When all of the desired merchandise tags have been read and their corresponding sales prices have been registered by the cash register, a total may be taken, which will cause the selector switch 587 (Fig. 37) to be reset to its No. 1 position in a manner to be described subsequently.

The reading of more than one merchandise tag without first performing an operation of the cash register is precluded by the opening of the contacts K20*bd*1 (Fig. 44A), which are caused to open by energization of the relay K20. When the contacts K20*bd*1 are opened, the alining pin and reset solenoid L20 cannot be reenergized after it has once been deenergized, following completion of the reading of the first merchandise tag. This condition is maintained until such time as the relay K20 is deenergized during the recording of the data, which results from a cash register operation.

Energization of the relay K20 also operates certain contacts (not shown) in the cash register control circuit. This conditions the circuit so that the only key on the cash register keyboard whose depression will effect operation of the cash register is a Merchandise key.

In a merchandise operation of a cash register, the sale price or other desired data is set up on the amount section of the cash register keyboard, and the Merchandise key is depressed. For a detailed description of the manner in which the cash register is operated and the manner in which the data thus set up is recorded by the recording system on the tape, reference may be had to the previously-cited United States patent application, Serial No. 622,591.

Deenergization of the merchandise interlock relay K20 (Fig. 44A) takes place following initiation of the operation for the recording of information entered into the cash register. Operation of the recorder stepping switch (not shown) causes the opening of certain contacts (not shown) controlled by it, in the previously-described holding circuit for the relay K20, thereby interrupting said circuit and deenergizing the relay K20.

The contacts K20*bd*1 (Fig. 44A) close upon deenergization of the relay K20, and an additional merchandise tag may be read by the media reader, if desired, upon completion of the recording of the information entered into the cash register. Also, certain contacts in the cash register control circuit (not shown) close to permit certain other cash register operations, controlled by the Deposit, Discount, Tax, and Miscellaneous control keys, to be initiated, as fully described in the previously-cited United States patent application, Serial No. 622,591.

It will be seen that, in a transaction which includes more than one merchandise item, the merchandise-tag-reading operation and the associated cash register operation will cause the appropriate information for each subsequent merchandise item to be recorded in the same manner as previously described for the single item of merchandise.

The charge transaction being described is concluded by the taking of a total of the one or more merchandise items of the transaction. The taking of a total in a charge operation also causes the sequence selector switch 587 (Fig. 37) to be moved back to position 1, so that it is properly positioned for the beginning of the next transaction. For a detailed description of the manner in which the cash register is operated for a total-taking operation, and the manner in which appropriate data pertaining to said operation is recorded by the recording system in the tape, reference may be had to the previously-cited United States patent application, Serial No. 622,591.

Depression of an operating bar on the cash register for the initiation of a total-taking operation also closes contacts SC45*a*2 (Fig. 44C) to complete a circuit from the conductor 650 through the contacts SS20*a*10 (position 3); SC44*b*2; SC45*a*2; SS20*a*9 (position 3); and the selector switch solenoid SS20, to energize said solenoid. Subsequent release of the operating bar opens the contacts SC45*a*2 to interrupt the previously-mentioned circuit, thereby deenergizing the rotary selector switch solenoid SS20, which causes the selector switch 587 to step on to its No. 1 position.

In some applications of the recording system, it is possible that it would be desired to omit any recording of a customer number by means of a customer tag or manual indexing of the customer number on the cash register keyboard. Such an application might, for example, be used in an establishment where customer identification is established by writing or mechanical printing on a sales slip and where the punched tape is used merely for inventory purposes. The enforcement of the recording of a customer number can be eliminated in the present system by connecting two terminals 676 and 677 (Fig. 44C) by means of a plug board connector such as the connector 678. The terminals 676 and 677 may, if desired, be located on a program board in the recording system. Connection of the terminals 676 and 677 by the connector 678 completes a circuit from the conductor 650 through interrupter contacts SS20*bc*1; the contacts SC44*b*2; the contacts SS20*a*1 (position 2); the connector 678; the contacts SS20*a*9 (position 2); and the selector switch solenoid SS20, for energization of said solenoid. Therefore it will be seen that, when the selector switch 587 is stepped from position 1 to position 2, said solenoid will be reenergized, causing the interrupter contacts SS20*bc*1 to open, and causing the selector switch 587 to step immediately to position 3 for a merchandise recording operation. A customer-number-recording operation is, therefore, eliminated when the connector 678 is connected between the terminals 676 and 677.

With the selector switch in position 3, the recording of the charge transaction is completed in the same manner as has been previously described, by the reading of one or more merchandise tags and entry of the corresponding sale prices for each through the cash register, any necessary deposit, discount, tax, or miscellaneous operations, and a subsequent total-taking operation, which is effective to step the selector switch 587 back to position 1 in preparation for the commencement of the next complete transaction.

Position 2 of the selector switch 587 is also stepped past in a cash transaction involving the recording system, because in such a transaction there is no need for customer identification. In a cash transaction, the contacts SC47*bc*1 (Fig. 44C), which are opened by depression of the Charge key on the cash register keyboard in a charge transaction, remain closed. Therefore, when the wiper of the contacts SS20*a*9 reaches position 2, a circuit is completed from the conductor 650 through the interrupter contacts SS20*bc*1 (Fig. 44C); the contacts SC44*b*2; SC47*bc*1; SS20*a*9 (position 2); and the solenoid SS20, to reenergize said solenoid. This causes the interrupter contacts SS20*bc*1 to open, to deenergize said solenoid and step the selector switch 587 to position 3. With the selector switch 587 in position 3, merchandise data is recorded in the same manner as has been described for a charge transaction.

*Tag release and homing means*

Manually-controlled push button means are provided on the media reader for the release of any tag which has been inserted into the machine, engaged and alined by the alining pins, and clamped by the clamp and sensing switch solenoid L21, but which has been placed in the media reader in an improper sequence of operation, as, for example, where a merchandise tag is placed in the media reader before a clerk or customer tag has been placed therein for reading, or where a customer tag has been placed in the media reader in the correct sequence of operation but does not have the correct store identification perforation thereon. In such an event, the clutch solenoids L22A and L22B will not be energized, and the tag will not be read. Depression of the push button 565 (Fig. 1) causes the contacts SP24*b*1 (Fig. 44A) to open, thus interrupting the energizing circuits for the alining pin and reset solenoid L20. This deenergizes the solenoid L20, which causes the alining pins of the media reader to be withdrawn from the tag. Withdrawal of these alining pins causes the contacts SC20*ac*1 (Fig. 44C) to open, thereby deenergizing the clamp and sensing switch solenoid L21, which in turn releases the tag, so that it may be removed from the media reader and the correct tag inserted for reading. However, once reading of the tag has been commenced, as it will be automatically when the correct tag is inserted into the media reader, the push button 565, which controls the contacts SP24*b*1, is ineffective to cause release of the tag, since the energizing circuit for the solenoid L20 bypasses the contacts SP24*b*1 through the contacts SS20*ac*1 (Fig. 44A) when the selector switch is in position 1 or 2. The opening of the contacts SP24*b*1 at such a time, therefore, will not interrupt the circuit to the alining pin and reset solenoid L20, since this circuit will be completed through the contacts SS20*ac*1; the conductor 653; and either the contacts SC21*b*1 in combination with the conductor 654 or the conductor 663 and the contacts SC22*b*1 in combination with the conductor 664; position 1 or 2 of the contacts SS20*a*2; the contacts SC23*a*1; SC37*b*1; the solenoid L20; the contacts TD20*b*1; SC61*a*1; and SC60*b*1. When the selector switch 587 is in position 3, the push button control contacts SP24*b*1 will be bypassed through one of the three paths extending through one of the three sets of sensing contacts SC25*a*1, SC26*a*1, or SC27*a*1, and the corresponding end-of-tag contacts SC32*b*1, SC31*b*1, or SC30*b*1; the contacts K20*ad*1; SS20*a*2 (position 3); SC23*a*1; SC37*b*1; the solenoid L20, the contacts TD20*b*1; SC61*a*1; and SC60*b*1.

The same push button 565 which controls the contacts SP24*b*1 is also used for returning the media reader to "home" position in the event the power source for the recording system has failed during a previous tag-reading operation before the reading of the tag in said operation was completed. Depression of the above-mentioned push button 565 closes the contacts SP24*a*2 (Fig. 44C), thus completing a circuit to the media reader clutch solenoids L22A and L22B. The circuit is completed from the positive conductor 650 through the contacts L21*bc*1 (Fig. 44C), which will be closed, since the tag which the media reader had been reading before the power failure will have been ejected from the media reader upon occurrence of the power failure, thereby deenergizing the clamp and sensing switch solenoid L21; the contacts SP24*a*2; a conductor 679; the contacts SC33*a*3 (Fig. 44C), which will be closed, since the media reader cam line in this contingency will not be in either "home" or No. 1 position; the conductor 659; the contacts SC35*b*2 (Fig. 44A); and the clutch solenoids L22A and L22B. Energization of the clutch solenoids L22A and L22B, through the above circuit, causes the contacts L22*a*1 (Fig. 44C) to close, thus completing a holding circuit from the conductor 650 through the contacts SC20*bc*1 (Fig. 44C), which will be closed due to the fact that no tag will be present in the media reader; the contacts L22*a*1; the contacts SC33*a*3; the conductor 659; the contacts SC35*b*2 (Fig. 44A); and solenoids L22A and L22B. The solenoids L22A and L22B will remain energized through this circuit, even though the contacts SP24*a*2 are caused to open once more by release of the push button 565 controlling said contacts. The circuits through the contacts L22*a*1 to the solenoids L22A and L22B will remain closed until the media reader cam line has been cycled to "home" position, at which time the contacts SC33*a*3 will open, thereby deenergizing the solenoids L22A and L22B. The resetting of the media reader cam line to "home" position may thus be accomplished by depression of the push button 565 after a power failure has interrupted the reading of a tag and has caused the partially-read tag to be ejected from the media reader.

In order for a resetting operation of the media reader cam line to take place, the energizing circuit for the media reader motor must be completed by the closing of contacts (not shown) controlled by the recorder contactor relay. These contacts are closed during a media reader cam line resetting operation, due to the fact that the contactor relay is in a deenergized condition, since the contacts SC33*b*2 (Fig. 44C), which are in the energizing circuit for said relay, are open except when the media reader cam line is in home or No. 1 position, and therefore will remain open until a resetting operation of the media reader cam line is completed.

*Selector switch homing by total-taking*

In the event that, through error or inadvertence of the operator, an erroneous tag reading has been made and the selector switch 587 has been stepped to position 2, said switch may be stepped through position 3 to position 1, or "home" position, by use of the total-taking means in the cash register component of the recording system. In order to accomplish the stepping of the selector switch 587, the operating bar of the cash register is depressed, thus closing the contacts SC45*a*3 (Fig. 44C). The closing of the contacts SC45*a*3 completes a circuit to the selector switch solenoid SS20 through the interrupter contacts SS20*bc*1 (Fig. 44C); the contacts SC44*b*2; the contacts SC45*a*3; the contacts SS20*a*9 (position 2); and the solenoid SS20. As the solenoid SS20 is energized, it causes the interrupter contacts SS20*bc*1 to open, thereby deenergizing said solenoid and causing the selector switch to be stepped to position 3. A circuit is then completed through position 3 of the contacts SS20*a*10; the contacts SC44*b*2; the contacts SC45*a*2, which are closed by depression of the operating bar in the same manner as the previously-mentioned contacts SC45*a*3; the contacts SS20*a*9 (position 3); and the solenoid SS20, to energize said solenoid. The solenoid SS20 will remain energized until the operator releases the operating bar, thus causing the contacts SC45*a*2 to open, which will interrupt the circuit to the solenoid SS20, to cause deenergization of said solenoid, with the consequent result of the stepping of the selector switch 587 to its No. 1 or "home" position.

*Interchangeable sequence selector unit*

As has been described in the section of the specification devoted to the mechanical construction of the media reader, certain components of the media reader, including the selector switch 587 (Fig. 37), the selector switch solenoid SS20, certain contacts controlled by energization of said solenoid, etc., are contained in a plug-in unit which may be removed from the media reader and replaced by another unit having components designed to effect a different sequence of operation of the recording system.

In the embodiment of the recording system shown in the circuit diagram as described in the preceding pages, the plug-in unit contains a three-position selector switch 587, so that any complete transaction will include a clerk number operation, a customer number operation, and a merchandise operation, except that the customer number operation may be omitted if desired, by connecting the terminals 676 and 677 (Fig. 44C) in the manner previously described.

In the event that it is desired to apply the recording system to a particular application in which only two distinct operations, such as, for example, customer number and merchandise, are desired in each transaction, the original plug-in unit may be removed, and a plug-in unit containing a selector switch having only two effective positions may be substituted. The sequence of operations using such a switch will be from position 1 to position 2 and back to position 1, thereby providing sequence enforcement for two separate operations of whatever character is required in the particular application.

Also it might be desired to use the recording system in an application, such as inventory, in which only one operation is desired in each transaction. Here again, the original plug-in unit may be removed and replaced by one designed for the contemplated application. In this last case, the selector switch may be altogether dispensed with, and the plug-in unit will serve primarily as means for connecting certain of the various leads thereto.

It will be seen that the provision of interchangeable plug-in units, of which the three described above are merely exemplary, permits great flexibility in the uses of the media reader and enables a single media reader to be adapted to a variety of uses merely by changing plug-in units.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In an apparatus for reading different classes of data, the combination comprising means for performing sensing operations on each class of data; a plurality of switches controlled by said sensing means; first circuit means including one of said switches; sequence control means for enforcing a certain sequence of reading of the different classes of data; control means operated by insertion of a record member bearing data of one of said classes into the apparatus; identification sensing means to identify the class of data on the record member by sensing distinctive identification marking associated with the class of data, said identification sensing means being rendered effective in response to an operation of the member-operated control means; and second circuit means normally controlled by the identification sensing means and the sequence control means for initiating operation of the apparatus, said first circuit means being connected into the second circuit means by the sequence control means during reading of one of the different classes of data so that said one of said switches must close to initiate operation of the apparatus, said first circuit means being isolated from the second circuit means by the sequence control means during the reading of the other different classes of data.

2. In an apparatus for reading different classes of data from different record members, the combination comprising means for performing sensing operations on each class of data; a plurality of switches controlled by said sensing means; first circuit means including one of said switches; sequence control means for enforcing a certain sequence of reading of the different classes of data from different record members; and second circuit means for initiating operation of the reading device, said first circuit means being connected into the second circuit means by the sequence control means during the reading of one of the different classes of data from a first record member so that said one of the switches must close to initiate operation of the reading device, said first circuit means being isolated from the second circuit means during the reading of the other different classes of data from other record members.

3. In an apparatus for reading different classes of data from different record members, the combination comprising sensing means for performing sensing operations on all of the classes of data; a plurality of switches controlled by said sensing means; first circuit means including one of said switches; sequence control means for enforcing a certain sequence of reading of the different classes of data from different record members; second circuit means for initiating operation of the apparatus, said first circuit means being connected into the second circuit means by the sequence control means during the reading of a first one of the different classes of data from a first record member so that said one of the switches must close to initiate operation of the apparatus; and third circuit means for causing the switches to transmit signals to a utilizing device according to the data sensed by the sensing means, said first circuit means being connected into the third circuit means by the sequence control means during the reading of a second one of the different classes of data from a second record member.

4. In an apparatus for reading different classes of data from different record members, the combination comprising sensing means for performing two different types of sensing operations; a plurality of switches controlled by said sensing means; first circuit means including one of said switches; sequence control means for enforcing a certain sequence of reading of the different classes of data from different record members; second circuit means for initiating operation of the apparatus, said first circuit means being connected into the second circuit means by the sequence control means during the reading of a first one of the different classes of data from a first record member so that said one of the switches must close during one of the two types of sensing operations of the sensing means to initiate operation of the apparatus; and third circuit means for causing the switches to transmit signals to a utilizing device according to the data sensed by the sensing means during the other of the two types of sensing operations of the sensing means, said first circuit means being connected into the third circuit means by the sequence control means during the reading of a second one of the different classes of data from a second record member.

5. In an apparatus for reading data from a record member, the combination comprising a plurality of sensing pins; first control means for enabling the sensing pins to sense simultaneously a plurality of data columns on the record member in a first sensing operation; and second control means for controlling the same sensing pins to enable them to sense the same data columns on the record member one after another in sequence in a second sensing operation.

6. In an apparatus for reading data from a record member, the combination comprising a plurality of sensing pins; first control means for enabling the sensing pins to sense simultaneously a plurality of data columns on the record member in a first sensing operation; second control means for controlling the same sensing pins to enable them to sense the same data columns on the record member one after another in sequence in a second sensing operation; and third control means capable of selective adjustment to effect the omission of all or part of the second sensing operation.

7. In an apparatus for reading data from a record member, the combination comprising a plurality of sensing pins; first control means for enabling the sensing pins to sense simultaneously a plurality of data columns on the record member in a first sensing operation; second control means for controlling the same sensing pins to enable them to sense the same data columns on the record member one after another in sequence in a second sensing operation; means responsive to the first sensing operation for controlling further operation of the apparatus; and means responsive to the second sensing operation to provide signals according to the data read from the record member.

8. In an apparatus for reading different classes of data from record members, the combination comprising a plurality of sensing pins; means normally urging the sensing pins to sensing position; control means normally allowing all of the pins to move to sensing position, and operable to remove the pins from sensing position and then release them for sequential movement to sensing position; further control means for retaining the pins against movement into sensing position; means operable by insertion of a record member into the apparatus for causing the further control means to release the pins for simultaneous movement into sensing position; sequence control means enabling a predetermined one of said sensing pins to initiate a reading operation upon sensing predetermined data from a record member when the sensing pins are released by said further means in a certain type of operation; and circuit means for causing signals to be produced by the sensing pins during the sequential release of said pins, in response to data on the record member, in another type of operation, for transmission to a utilizing device, said sequence control means causing said one of said pins to be effective with the remainder of the pins to produce signals, in response to data on the record member, in said other type of operation.

9. In an apparatus for reading different classes of data, the combination comprising a plurality of sensing pins; means normally urging the sensing pins to sensing position; control means normally allowing all of the pins to move to sensing position, and operable to remove the pins from sensing position and then release them sequentially; further control means for retaining the pins against movement into sensing position; means operable by insertion of a record member into the apparatus for causing the further control means to release the pins for movement into sensing position; and sequence control means enabling one of said sensing pins to initiate a reading operation when released by said further means in a certain type of operation, said sequence control means rendering control of initiation of a reading operation by said one of said sensing pins ineffective in other types of operation.

10. The apparatus of claim 9 also including ejecting means for ejecting the record member from the apparatus upon completion of a reading operation; means for removing all of the sensing pins from sensing position; and blocking means controlled by the further control means for preventing ejection of a record member unless all of the sensing pins have been removed from sensing position.

11. In an apparatus for reading data, the combination comprising means for receiving a record member to be read; an ejecting plate for ejecting the record member from the apparatus at the conclusion of a reading operation; shifting means for shifting the ejecting plate in an ejecting movement and in a resorting movement; first slidable means operatively connected to said shifting means; coupling means fixed to the first slidable means; spring means for normally retaining said first slidable means, said shifting means, and said ejecting plate in restored position; second slidable means including engaging means for engagement with the coupling means to cause the first and second slidable means to be coupled together for unitary movement; operating means for moving the second slidable means in one direction to a position in which said engaging means engages the coupling means to couple the first and second slidable means together; control means for rendering the operating means effective at the beginning of a reading operation and rendering said operating means ineffective at the conclusion of a reading operation; and spring means for moving the coupled first and second slidable members in the opposite direction at the conclusion of a reading operation to cause the shifting means to shift the ejecting plate in an ejecting movement to eject the record member.

12. The apparatus of claim 11 also including means for shifting the engaging means out of engagement with the coupling means near the end of travel of the first and second slidable means in said opposite direction to uncouple said first and second slidable means.

13. In an apparatus for reading different classes of data, the combination comprising means for receiving a record member to be read; a plurality of alining pins for properly alining said record member in reading position; shifting means rotatably mounted in the apparatus and including a plurality of arms operatively connected to said pins, and a further arm; a rotatable member rotatably mounted in the apparatus and operatively connected to said further arm; a link pivotally connected at one end to the rotatable member; a lever rotatably mounted in the apparatus; spring means connecting the lever and the link; and operating means operatively connected to said lever for movement of the lever and the spring means, said spring means operating through the link, the rotatable member and the shifting means for moving the alining pins in and out of alining position, the point of pivotal connection between the rotatable member and the link, and the point of the center of rotation of said rotatable member, defining a line nearly coincident with the direction of the force applied by the spring means to the link, so that only a small component of the force applied by said spring means is initially available for operation of the alining pins, said line shifting angularly with respect to the direction of applied force as the rotatable member moves from unoperated position to increase the component of force available for moving said alining pins.

14. In an apparatus for reading data, the combination comprising means for receiving the record member to be read; means operable to properly aline said record member in reading position; first rotatable means for moving the alining means into and out of alining positions; second rotatable means operatively connected to the first rotatable means; link means pivotally connected at one end to the second rotatable means; third rotatable means pivotally mounted in the apparatus; spring means connecting the lever and the link; and operating means operatively connected to the third rotatable means for movement of said third rotatable means and the spring means, said spring means effective through the first and second rotatable means and the link means to drive the alining means in and out of alining position, the point of pivotal connection between the second rotatable means and the link means being arranged and located with respect to the center of rotation of the second rotatable means so that, in unoperated position of the alining means, a small component of the total force of the spring means is available for moving the alining means, and so that, as the second rotatable means moves farther from unoperated position, the available component of the total force of the spring means increases.

15. In an apparatus for reading data, the combination comprising means for receiving a record member to be read; means operable to properly aline said record member in reading positions; shifting means for moving the alining means into and out of alining positions; rotatable means operatively connected to the shifting means; link means pivotally connected at one end to the rotatable means; coupling means pivotally mounted in the apparatus; spring means connecting the coupling means and the link means; and operating means operatively connected to the coupling means for movement of the coupling means and the spring means, said spring means effective through the rotatable means to drive the alining means into and out of alining position, the point of pivotal connection between the link means and the rotatable means, and the point of the center of rotation of the rotatable means in unoperated position of the alining means, defining a line substantially coincident with the direction of the force applied by the spring means to the link means, so that only a small component of the force applied by said spring means is initially available for operation of the alining means, said line shifting angularly with respect to the direction of applied force as the rotatable means moves from unoperated position to increase the component of force available for moving the alining means.

16. In an apparatus for reading different classes of data from different record members, the combination comprising sequence control means for enforcing a certain sequence for reading different classes of data from different record members; sensing means capable of performing two separate data-sensing operations; first control means for enabling the sensing means to sense simultaneously a plurality of data columns on a record member in a first sensing operation; second control means for controlling said sensing means to sense sequentially a plurality of data columns on a record member in a second sensing operation; driving means to drive the apparatus through a reading operation; means controlled by the sequence control means to enable the sensing means to initiate operation of the driving means in the event that certain predetermined data is sensed during said first sensing operation; and means to enable the sensing means to provide signals according to the data read in said second sensing operation.

17. In an apparatus for reading different classes of data from different record members, the combination comprising sensing means capable of performing two separate data-sensing operations; first control means for enabling the sensing means to sense simultaneously a plurality of data columns on a record member in a first sensing operation; second control means for controlling said sensing means to sense sequentially a plurality of data columns on a record member in a second sensing operation; driving means to drive the apparatus through a reading operation; means to enable the sensing means to initiate operation of the driving means in the event that certain predetermined data is sensed during said first sensing operation; and means to enable the sensing means to provide signals according to the data read in said second sensing operation.

References Cited in the file of this patent

UNITED STATES PATENTS

| | | |
|---|---|---|
| 2,496,138 | Thomas et al. | Jan. 31, 1950 |
| 2,516,013 | Mixer | July 18, 1950 |